US011769225B2

(12) United States Patent
Miyamaki et al.

(10) Patent No.: US 11,769,225 B2
(45) Date of Patent: *Sep. 26, 2023

(54) IMAGE PROCESSING APPARATUS, IMAGE PROCESSING METHOD, AND PROGRAM

(71) Applicant: Sony Group Corporation, Tokyo (JP)

(72) Inventors: Hideo Miyamaki, Tokyo (JP); Masatoshi Takashima, Tokyo (JP); Yu Kitamura, Kanagawa (JP); Hiroshi Mori, Tokyo (JP)

(73) Assignee: Sony Group Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/694,429

(22) Filed: Mar. 14, 2022

(65) Prior Publication Data

US 2022/0277419 A1 Sep. 1, 2022

Related U.S. Application Data

(63) Continuation of application No. 16/633,661, filed as application No. PCT/JP2018/026826 on Jul. 18, 2018, now Pat. No. 11,328,388.

(30) Foreign Application Priority Data

Aug. 1, 2017 (JP) ................... 2017-148858

(51) Int. Cl.
*G06T 3/40* (2006.01)
*G06T 7/11* (2017.01)
*G06T 7/174* (2017.01)

(52) U.S. Cl.
CPC .............. *G06T 3/4038* (2013.01); *G06T 7/11* (2017.01); *G06T 7/174* (2017.01); *G06T 2207/10036* (2013.01); *G06T 2207/20021* (2013.01)

(58) Field of Classification Search
CPC ......... G06T 3/4038; G06T 7/11; G06T 7/174; G06T 2207/10036; G06T 2207/20021;
(Continued)

(56) References Cited

U.S. PATENT DOCUMENTS 8,600,194 B2 * 12/2013 Doepke ................ H04N 5/2628
382/284
8,811,764 B1   8/2014 Hsu
(Continued)

FOREIGN PATENT DOCUMENTS

CN      102025918 A    4/2011
JP    2012-163482 A    8/2012
(Continued)

OTHER PUBLICATIONS

Extended European Search report dated Jul. 9, 2020 for corresponding European Application No. 18841076.5. **

(Continued)

*Primary Examiner* — Vu Le
*Assistant Examiner* — Winta Gebreslassie
(74) *Attorney, Agent, or Firm* — Michael Best & Friedrich LLP

(57) ABSTRACT

The present technique relates to an image processing apparatus, an image processing method, and a program that can easily execute a stitching process.
Provided are: an image generation unit that generates a first reference image regarding a first imaging region on the basis of a plurality of first images regarding the first imaging region and that generates a second reference image regarding a second imaging region at least partially overlapping with the first imaging region on the basis of a plurality of second images regarding the second imaging region; and a processing unit that generates positioning information indicating a correspondence between the first imaging region
(Continued)

and the second imaging region on the basis of the first reference image and the second reference image. The present technique can be applied to, for example, an image processing apparatus that executes a stitching process of a plurality of images.

19 Claims, 34 Drawing Sheets

(58) Field of Classification Search
CPC ............ G06T 7/30; G06T 2207/20016; G06T 2207/30188; G06T 3/00; G06T 7/33; A01G 7/00; H04N 5/232
See application file for complete search history.

(56) References Cited

U.S. PATENT DOCUMENTS

| | | | |
|---|---|---|---|
| 2015/0326769 A1 | 11/2015 | Richarte et al. | |
| 2016/0286138 A1 | 9/2016 | Kim | |
| 2016/0292838 A1* | 10/2016 | Kobayashi | G06T 5/50 |
| 2017/0138733 A1* | 5/2017 | Michiels | G01J 3/2823 |
| 2017/0353710 A1* | 12/2017 | Sasaki | G06T 7/55 |
| 2018/0012336 A1* | 1/2018 | Cao | G06T 7/32 |

FOREIGN PATENT DOCUMENTS

| | | |
|---|---|---|
| JP | 2015532714 A | 11/2015 |
| JP | 2016208306 A | 12/2016 |

OTHER PUBLICATIONS

European Patent Office Communication Pursuant to Article 94(3) EPC dated Nov. 24, 2021 for corresponding European Application No. 18841076.5. **

Edgardo Molina, Student Member, IEEE, and Zhigang Zhu, Senior Member, IEEE, "Persistent Aerial Video Registration and Fast Multi-View Mosaicing" IEEE Transactions On Image Processing, vol. 23, No. 5, May 2014. **

* cited by examiner

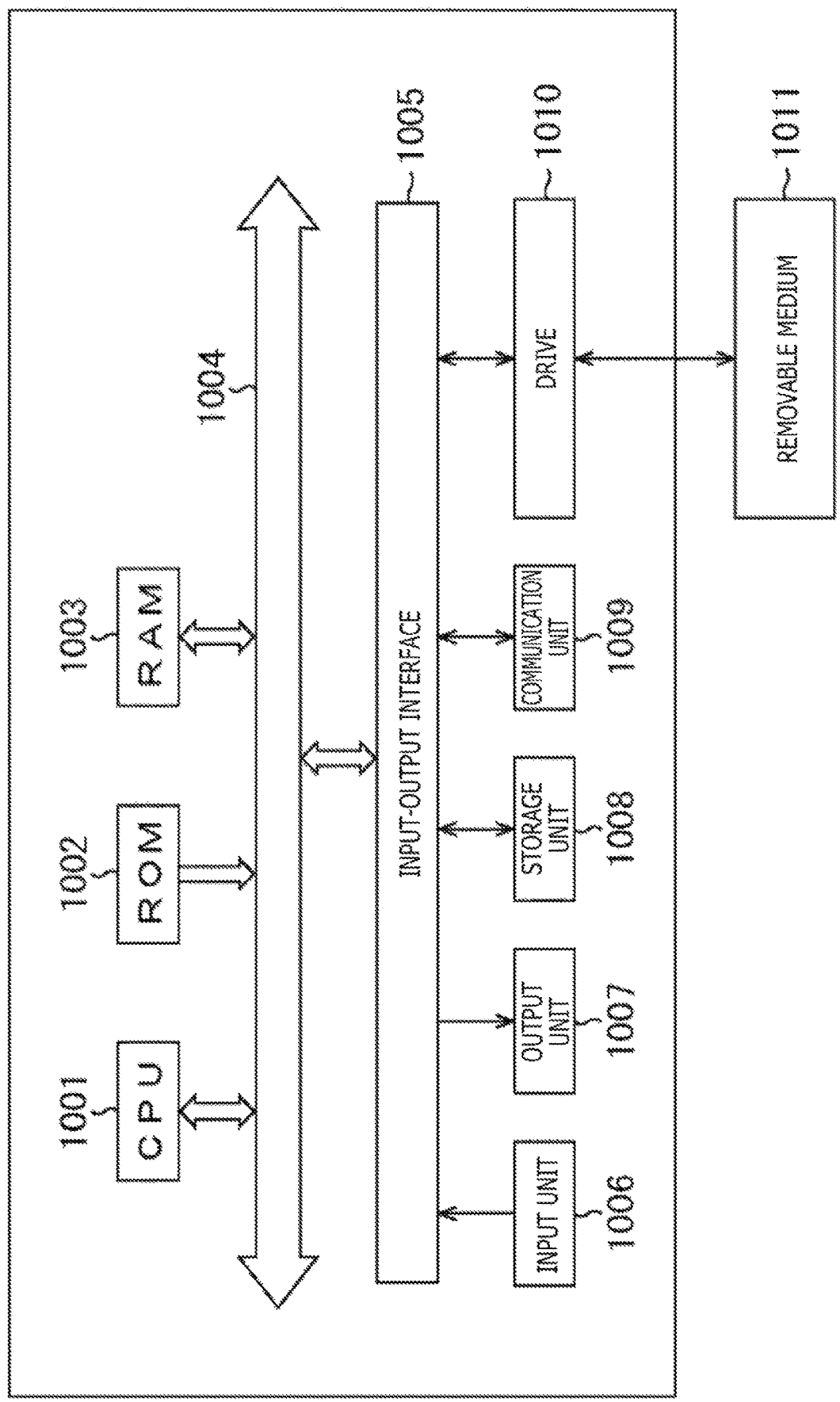

IMAGE PROCESSING APPARATUS, IMAGE PROCESSING METHOD, AND PROGRAM

CROSS REFERENCE TO RELATED APPLICATIONS

This application is a continuation application of U.S. application Ser. No. 16/633,661, filed Jan. 24, 2020, which is a U.S. Nationalization stage entry of International Application No. PCT/JP2018/026826, filed Jul. 18, 2018, which claims the benefit of Japanese Priority Patent Application No. JP 2017-148858 filed with the Japan Patent Office on Aug. 1, 2017, the entire contents of which are incorporated herein by reference.

TECHNICAL FIELD

The present technique relates to an image processing apparatus, an image processing method, and a program, and for example, relates to an image processing apparatus, an image processing method, and a program that can conveniently execute a stitching process.

BACKGROUND ART

Images obtained by aerial photography using a Cessna, a drone, or the like are stitched and mapped.

In addition, it is also proposed to sense a growth condition of a plant. It is known that the photosynthesis of a plant is affected by the number of photons, which are particles of light, instead of the energy of light. It is proposed to sense the growth condition of a plant by measuring the photon flux density that is effective for the photosynthesis of the plant (for example, see PTL 1).

CITATION LIST

Patent Literature

[PTL 1]
JP 2012-163482A

SUMMARY

Technical Problem

Feature values can be easily extracted from aerial images of a place with many buildings, such as an urban area, and the images can be relatively easily stitched and mapped. However, it is difficult to extract the feature values of the images in farms, forests, and the like with few buildings, and it is difficult to stich or map the images.

For example, in a case where aerial photography of a field is performed to sense the growth of a plant, and the aerial images are stitched or mapped, it is difficult to extract the feature values from the aerial images, and it is difficult to stitch or map the images.

The present technique has been made in view of the circumstances, and the present technique facilities to extract feature values and allows to easily perform stitching or mapping.

Solution to Problem

An aspect of the present technique provides an image processing apparatus including: an image generation unit that generates a first reference image regarding a first imaging region on the basis of a plurality of first images regarding the first imaging region and that generates a second reference image regarding a second imaging region at least partially overlapping with the first imaging region on the basis of a plurality of second images regarding the second imaging region; and a processing unit that generates positioning information indicating a correspondence between the first imaging region and the second imaging region on the basis of the first reference image and the second reference image.

An aspect of the present technique provides an image processing method including the steps of: generating a first reference image regarding a first imaging region on the basis of a plurality of first images regarding the first imaging region and generating a second reference image regarding a second imaging region at least partially overlapping with the first imaging region on the basis of a plurality of second images regarding the second imaging region; and generating positioning information indicating a correspondence between the first imaging region and the second imaging region on the basis of the first reference image and the second reference image.

An aspect of the present technique provides a program causing a computer to execute a process including the steps of: generating a first reference image regarding a first imaging region on the basis of a plurality of first images regarding the first imaging region and generating a second reference image regarding a second imaging region at least partially overlapping with the first imaging region on the basis of a plurality of second images regarding the second imaging region; and generating positioning information indicating a correspondence between the first imaging region and the second imaging region on the basis of the first reference image and the second reference image.

In the image processing apparatus, the image processing method, and the program according to an aspect of the present technique, the first reference image regarding the first imaging region is generated on the basis of the plurality of first images regarding the first imaging region, and the second reference image regarding the second imaging region at least partially overlapping with the first imaging region is generated on the basis of the plurality of second images regarding the second imaging region. The positioning information indicating the correspondence between the first imaging region and the second imaging region is generated on the basis of the first reference image and the second reference image.

Note that the image processing apparatus may be an independent apparatus or may be an internal block included in one apparatus.

In addition, the program can be provided by transmitting the program through a transmission medium or by recording the program in a recording medium.

Advantageous Effects of Invention

According to an aspect of the present technique, the feature values can be easily extracted, and stitching and mapping can be easily performed.

Note that the advantageous effects described here may not be limited, and the advantageous effects may be any of the advantageous effects described in the present disclosure.

BRIEF DESCRIPTION OF DRAWINGS

FIG. 38 is a diagram for describing a recording medium.

DESCRIPTION OF EMBODIMENTS

Hereinafter, modes for carrying out the present technique (hereinafter, referred to as embodiments) will be described.
<Image Processing System>

Figure 1:
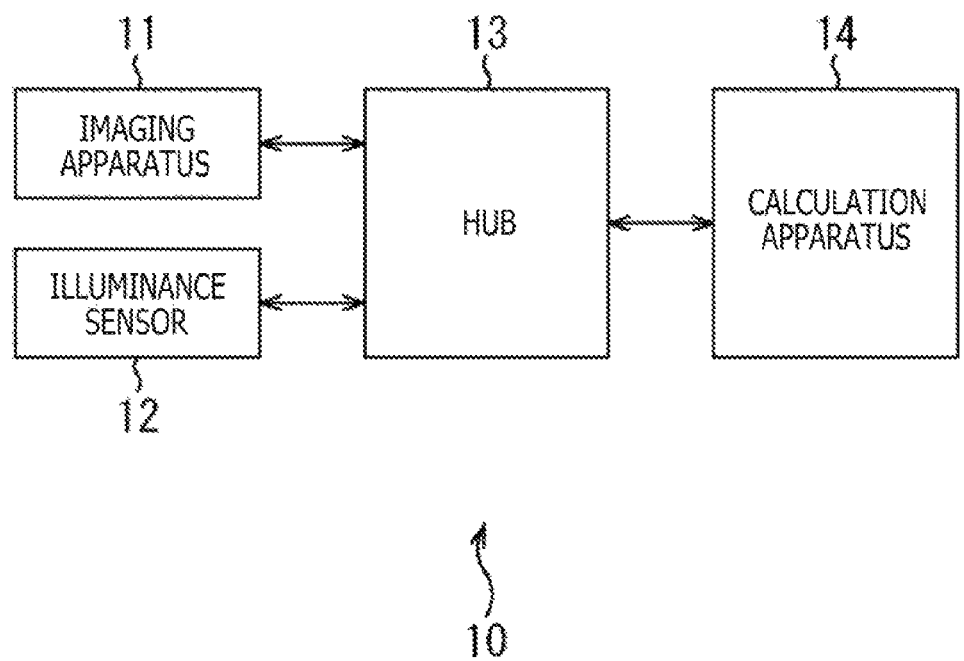
FIG. 1 is a diagram illustrating a configuration of an embodiment of an image processing system according to the present technique.

FIG. 1 is a diagram illustrating a configuration of an embodiment of an image processing system including an image processing apparatus according to the present technique.

An image processing system 10 is a system that images a subject and executes a stitching process to create a desirable image. For example, the image processing system 10 sets a plant (vegetation) as a subject and creates a map (image) indicating a growth state of the plant.

In FIG. 1, the image processing system 10 includes an imaging apparatus 11, an illuminance sensor 12, a hub 13, and a calculation apparatus 14. The imaging apparatus 11, the illuminance sensor 12, and the calculation apparatus 14 are connected to each other through the hub 13.

The imaging apparatus 11 images an object to be measured. The illuminance sensor 12 is an apparatus that measures the illuminance of a light source, such as sunlight, and the illuminance sensor 12 supplies the measured illuminance information (illuminance value) to the imaging apparatus 11.

For example, the imaging apparatus 11 is installed on the lower side (ground side) of a remotely-controlled or autonomous unmanned aerial vehicle called a drone or the like, and the illuminance sensor 12 is installed on the upper side (sky side) of the unmanned aerial vehicle.

Note that although the description will be continued here by assuming that the imaging apparatus 11 and the illuminance sensor 12 are different bodies, the imaging apparatus 11 and the illuminance sensor 12 may be provided in the same housing. In addition, the imaging apparatus 11 and the illuminance sensor 12 may be included in the unmanned aerial vehicle.

Note that although the description will be continued here by illustrating an example of a case of processing an image obtained by aerial photography using the unmanned aerial vehicle, the present technique can also be applied to cases of processing images obtained by photography other than the aerial photography, such as an image obtained by panoramic photography.

The imaging apparatus 11 images a subject and outputs data obtained by the imaging to the calculation apparatus 14 through the hub 13. The illuminance sensor 12 is a sensor for measuring the illuminance, and the illuminance sensor 12 outputs an illuminance value as a measurement result to the calculation apparatus 14 through the hub 13.

The calculation apparatus 14 is an apparatus with a calculation function of a circuit, such as a CPU (Central Processing Unit) and an FPGA (Field Programmable Gate Array). For example, the calculation apparatus 14 is configured as a personal computer, a dedicated terminal apparatus, or the like.

Although the calculation apparatus 14, such as a personal computer, executes image processing in a local environment through the hub 13 in the image processing system 10 illustrated in FIG. 1, the image processing may be executed in a cloud environment through a network.

Figure 2:
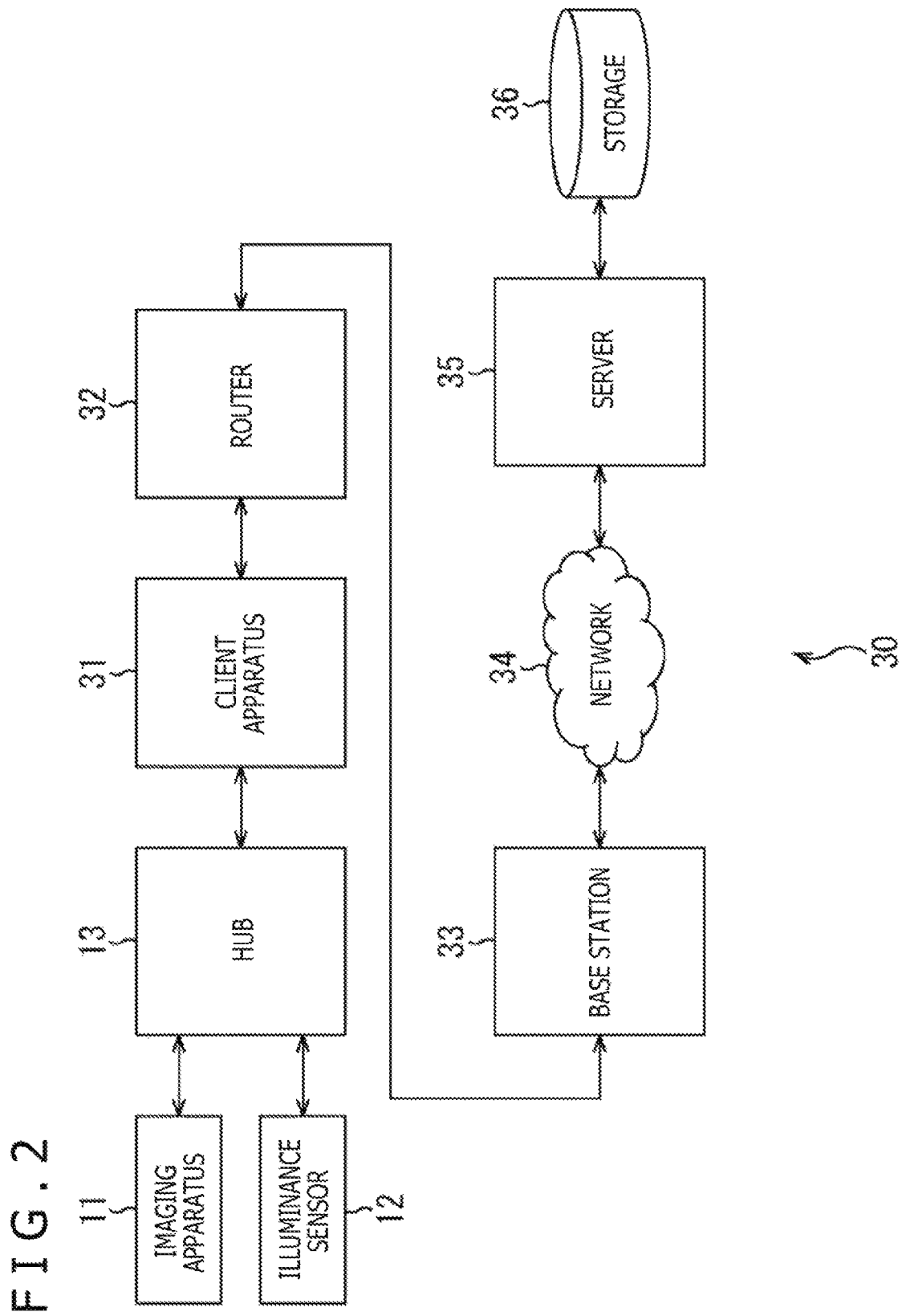
FIG. 2 is a diagram illustrating a configuration of another embodiment of the image processing system according to the present technique.

FIG. 2 illustrates a configuration example of an image processing system 30 corresponding to the cloud environment that is another configuration example of the image processing system.

In the image processing system 30 of FIG. 2, the imaging apparatus 11 and the illuminance sensor 12 output the image data and the illuminance value to a client apparatus 31 through the hub 13, just like the imaging apparatus 11 and the illuminance sensor 12 of FIG. 1.

The client apparatus 31 includes a personal computer or the like and outputs the image data and the illuminance value input from the imaging apparatus 11 and the illuminance sensor 12 to a router 32 through the hub 13. That is, although the client apparatus 31 corresponds to the calculation apparatus 14 of FIG. 1, the client apparatus 31 is provided as an apparatus that does not execute or just partially executes the image processing.

The router 32 is, for example, a mobile router, and the router 32 can be connected to a network 34, such as the Internet, through a base station 33. The router 32 transmits the image data and the illuminance value input from the client apparatus 31 to a server 35 through the network 34.

The server 35 receives the image data and the illuminance value transmitted from the client apparatus 31 through the network 34. Here, the server 35 has a function equivalent to the function of the calculation apparatus 14 illustrated in FIG. 1 or at least part of the function.

A storage 36 is connected to the server 35. The image data or the illuminance value supplied to the server 35 are stored in the storage 36 as necessary, or the data necessary to execute the stitching process or the like is appropriately read.

Figure 3:
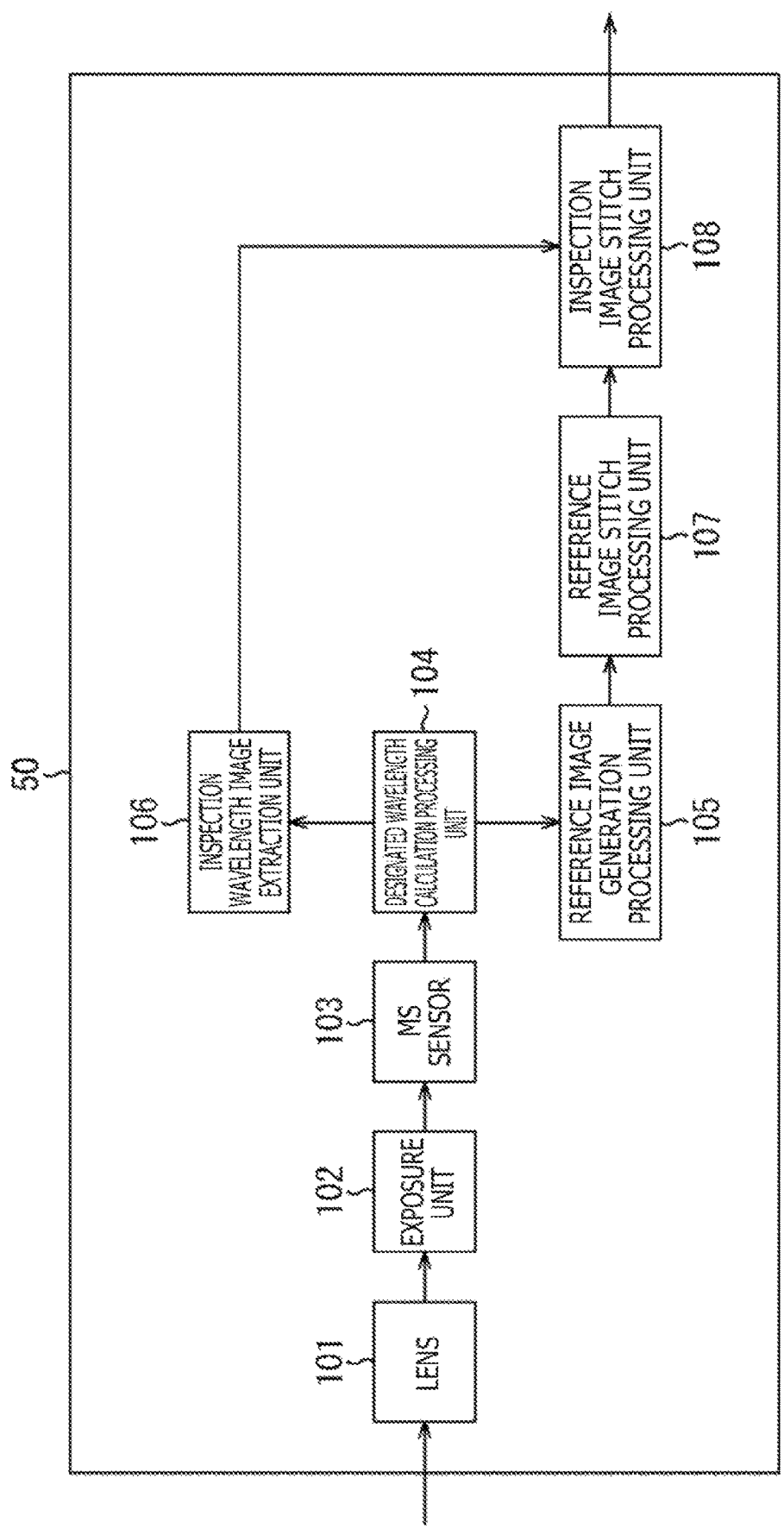
FIG. 3 is a diagram illustrating a configuration example of an image processing system.

The image processing system 10 (or the image processing system 30) has a configuration (including function) as illustrated in FIG. 3. Here, to distinguish the image processing system from the image processing system 10 and the image processing system 30, the image processing system illustrated in FIG. 3 will be referred to as an image processing system 50.

The image processing system 50 includes a lens 101, an exposure unit 102, MS sensors 103, a designated wavelength calculation processing unit 104, a reference image generation processing unit 105, an inspection wavelength image extraction unit 106, a reference image stitch processing unit 107, and an inspection image stitch processing unit 108.

A case in which the image processing system 50 illustrated in FIG. 3 includes the image processing system 10 illustrated in FIG. 1 or the image processing system 30 will be described with reference to FIG. 4.

Figure 4:
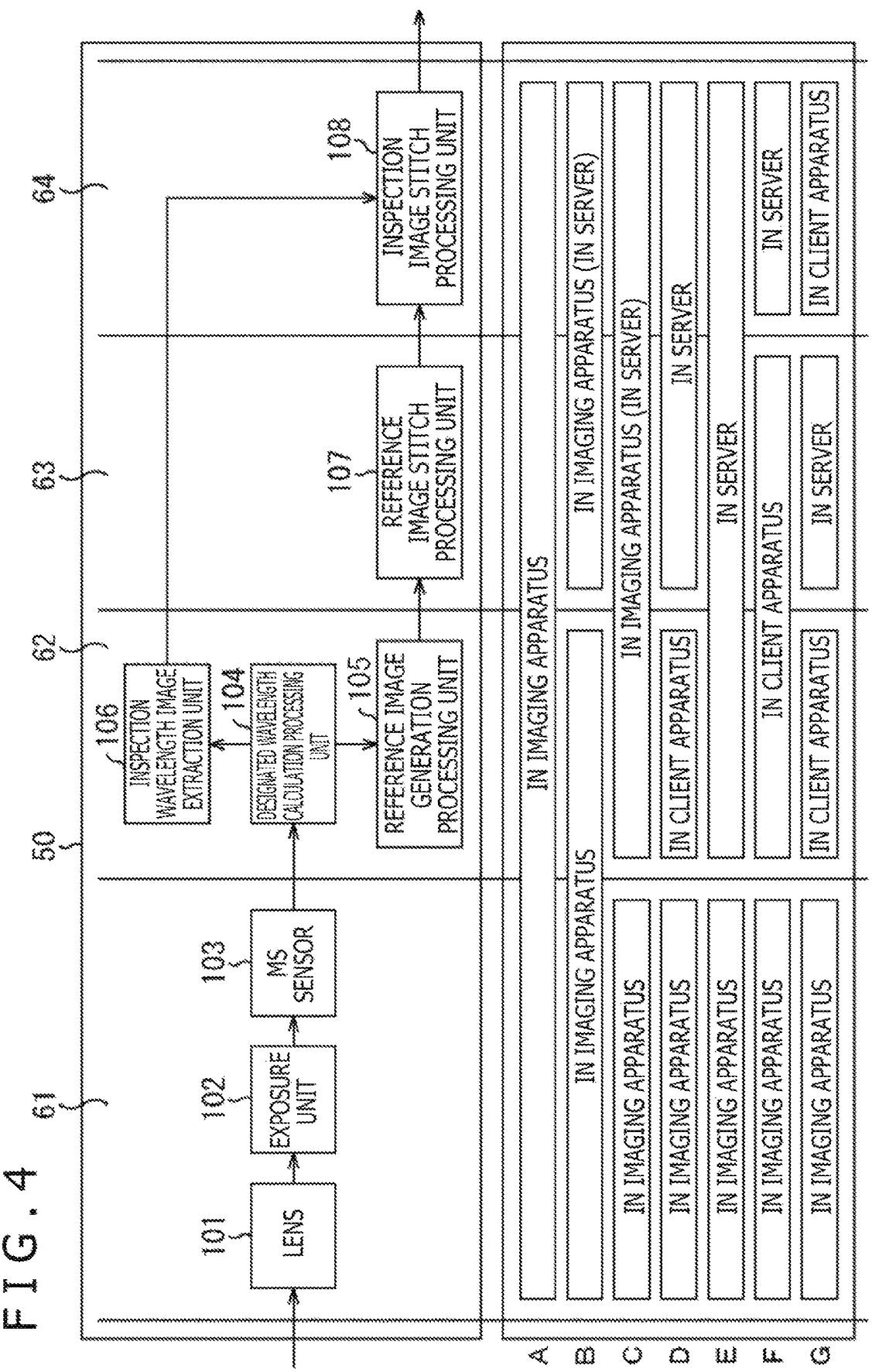
FIG. 4 is a diagram illustrating a configuration example of the image processing system.

An upper part of FIG. 4 depicts the image processing system 50 illustrated in FIG. 3. A lower part depicts configuration examples, and configuration examples A to G are illustrated here. First, as illustrated in the upper part of FIG. 4, the image processing system 50 is divided into four parts. The lens 101, the exposure unit 102, and the MS sensors 103 are included in an imaging unit 61 that images a subject.

The designated wavelength calculation processing unit 104, the reference image generation processing unit 105, and the inspection wavelength image extraction unit 106 are included in an image generation unit 62 that generates an image, such as a reference image and an inspection wavelength image. The reference image stitch processing unit 107 is included in a first stitch processing unit 63 that executes a stitching process. The inspection image stitch processing unit 108 is included in a second stitch processing unit 64 that executes a stitching process.

The configuration example A is a configuration of a case in which the image processing system 50 completes in the imaging apparatus 11, and all of the imaging unit 61, the image generation unit 62, the first stitch processing unit 63, and the second stitch processing unit 64 are included in the imaging apparatus 11. Although not illustrated in FIGS. 1 and 2, the imaging apparatus 11 can be configured to execute the processes alone, including the stitching processes.

The configuration example B is a configuration example in which the imaging unit 61 and the image generation unit 62 of the image processing system 50 are provided in the imaging apparatus 11, and the first stitch processing unit 63 and the second stitch processing unit 64 are provided in the calculation apparatus 14 (FIG. 1) or the server 35 (FIG. 2).

The configuration example C is a configuration example in which the imaging unit 61 of the image processing system 50 is provided in the imaging apparatus 11, and the image generation unit 62, the first stitch processing unit 63, and the second stitch processing unit 64 are provided in the calculation apparatus 14 (FIG. 1) or the server 35 (FIG. 2).

The configuration example D is a configuration example in which the imaging unit 61 of the image processing system 50 is provided in the imaging apparatus 11, the image generation unit 62 is provided in the client apparatus 31 (FIG. 2), and the first stitch processing unit 63 and the second stitch processing unit 64 are provided in the server 35 (FIG. 2).

The configuration example E is a configuration example in which the imaging unit 61 of the image processing system 50 is provided in the imaging apparatus 11, and the image generation unit 62, the first stitch processing unit 63, and the second stitch processing unit 64 are provided in the server 35 (FIG. 2).

The configuration example F is a configuration example in which the imaging unit 61 of the image processing system 50 is provided in the imaging apparatus 11, the image generation unit 62 and the first stitch processing unit 63 are provided in the client apparatus 31 (FIG. 2), and the second stitch processing unit 64 is provided in the server 35 (FIG. 2).

The configuration example G is a configuration example in which the imaging unit 61 of the image processing system 50 is provided in the imaging apparatus 11, the image generation unit 62 is provided in the client apparatus 31 (FIG. 2), the first stitch processing unit 63 is provided in the server 35 (FIG. 2), and the second stitch processing unit 64 is provided in the client apparatus 31 (FIG. 2).

The image processing system 50 may have any configuration of the configuration examples A to G. The image processing system 50 may be provided as a single apparatus or may include a plurality of apparatuses. According to the present technique, the process can be reduced in any configuration, as will be apparent below. The time required for processing can be shortened, and the processing load can be reduced.

The image processing system 50 illustrated in FIG. 3 will be further described. The lens 101, the exposure unit 102, and the MS sensors 103 are included in the imaging apparatus 11 in all configurations of the configuration examples A to G described with reference to FIG. 4.

In the imaging apparatus 11, light (reflected light) from an object, such as an object to be measured, enters the MS sensors 103 through the lens 101 and the exposure unit 102. The MS of the MS sensors 103 denotes multispectral. As described later, the imaging apparatus 11 can obtain signals at a plurality of different wavelengths from one unit pixel.

The exposure unit 102 controls the exposure by adjusting the amount of opening based on an optical system or an iris (diaphragm) of the lens 101 or the like, the exposure time of the MS sensors 103, the shutter speed, and the like so that the MS sensors 103 perform sensing while the signal charge is in the dynamic range without saturation.

Figure 5:
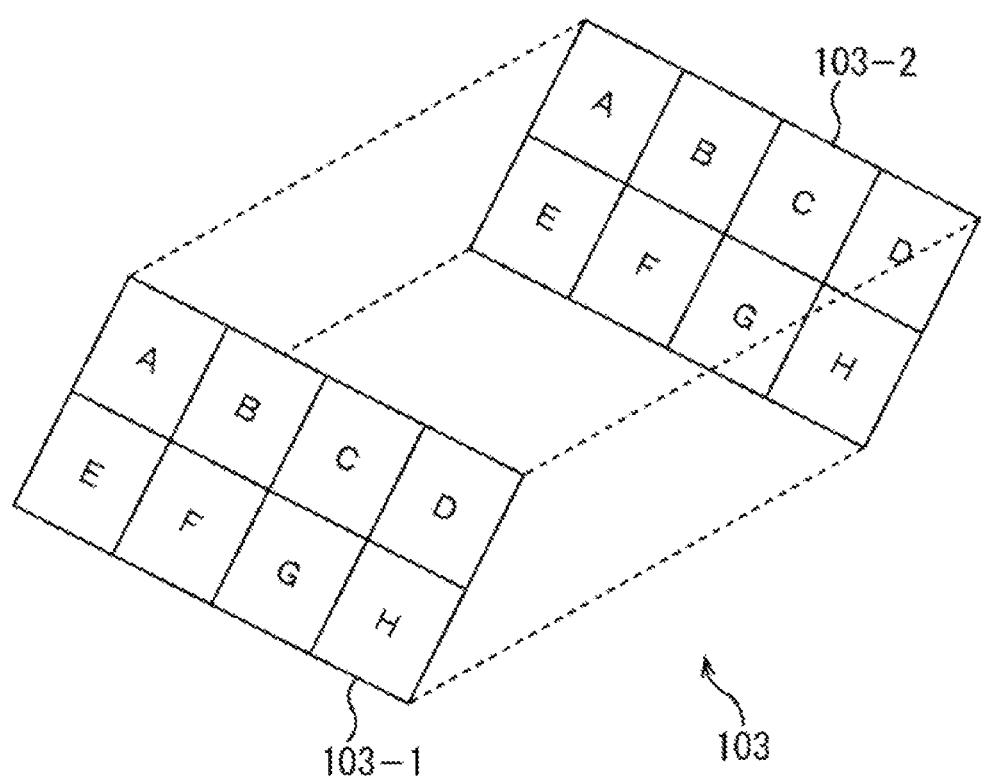
FIG. 5 is a diagram for describing unit pixels.

The MS sensors 103 include MS filters 103-1 and sensors 103-2 as illustrated in FIG. 5. The MS filters 103-1 can be optical filters according to an index of the measurement target, and the filters transmit a plurality of different wavelengths, respectively. The MS filters 103-1 transmit the light entered through the lens 101 to the sensors 103-2 of the MS sensors 103.

The sensors 103-2 are image sensors including, on the surfaces of the sensors, sensing elements with a plurality of pixels two-dimensionally arranged in a repeated pattern. In the MS sensors 103, the sensing elements (sensors 103-2) detect the light passing through the MS filters 103-1, and the MS sensors 103 output measurement signals (measurement data) according to the amount of light to the designated wavelength calculation processing unit 104.

Here, in a case where, for example, the image processing system 50 is used as an apparatus that senses vegetation, photosynthetic photon flux density (PPFD) may be sensed. The photosynthesis of a plant is affected by the number of quanta (photons) that are particles of light. The number of light quanta at wavelengths of 400 to 700 nm, which are absorption wavelengths of chlorophyll, entered per unit area in a unit time is indicated by a PPFD value.

In a case of calculating the PPFD value, RGB signals are necessary, and filters that transmit wavelengths of R (red), G (green), B (blue), IR (infrared light), and the like are combined in the MS filters 103-1. For example, as illustrated in FIG. 3, one unit pixel includes height×width=2×4=8 pixels, and the pixels receive light at wavelengths A to H, respectively. The MS filters 103-1 include filters that transmit the light at the wavelengths A to H, respectively, and the pixels of the MS sensors 103 are sensors that receive the transmitted light.

In the following description, the description will be continued by assuming that one unit pixel includes eight pixels as illustrated in FIG. 5, and each pixel is a pixel that receives light at a different wavelength. Furthermore, in the following description, the description will be continued by assuming that a simple mention of a pixel denotes one pixel in one unit pixel, and a mention of a unit pixel denotes pixels (group) including eight pixels.

In addition, one unit pixel includes the sensors that receive the light at the wavelengths A to H, and for example, the sensors can receive light at 400 to 750 nm. The wavelength A can be 400 nm. The wavelength B can be 450 nm. The wavelength C can be 500 nm. The wavelength D can be 550 nm. The wavelength E can be 600 nm. The wavelength F can be 650 nm. The wavelength G can be 700 nm. The wavelength H can be 750 nm.

Note that the number of pixels included in one unit pixel here is an example and does not indicate a limitation. For example, one unit pixel may include 4 pixels (2×2) or 16 pixels (4×4). In addition, the range of the wavelength of the light received by one unit pixel and the wavelength received by each pixel are not limited to the examples. A wavelength that allows to appropriately sense the measured object to be sensed can be set. In addition, the wavelength is not limited to visible light, and the wavelength may be infrared light, ultraviolet light, or the like.

The MS filters 103-1 that transmit light at a plurality of wavelengths in such a way are optical filters that transmit narrow-band light in a predetermined narrow wavelength band (narrow band).

A camera using such a narrow-band filter or the like is called a multispectral camera or the like in some cases, and the multispectral camera can also be used in the present technique. Here, the multispectral camera will be further described.

Figure 6:
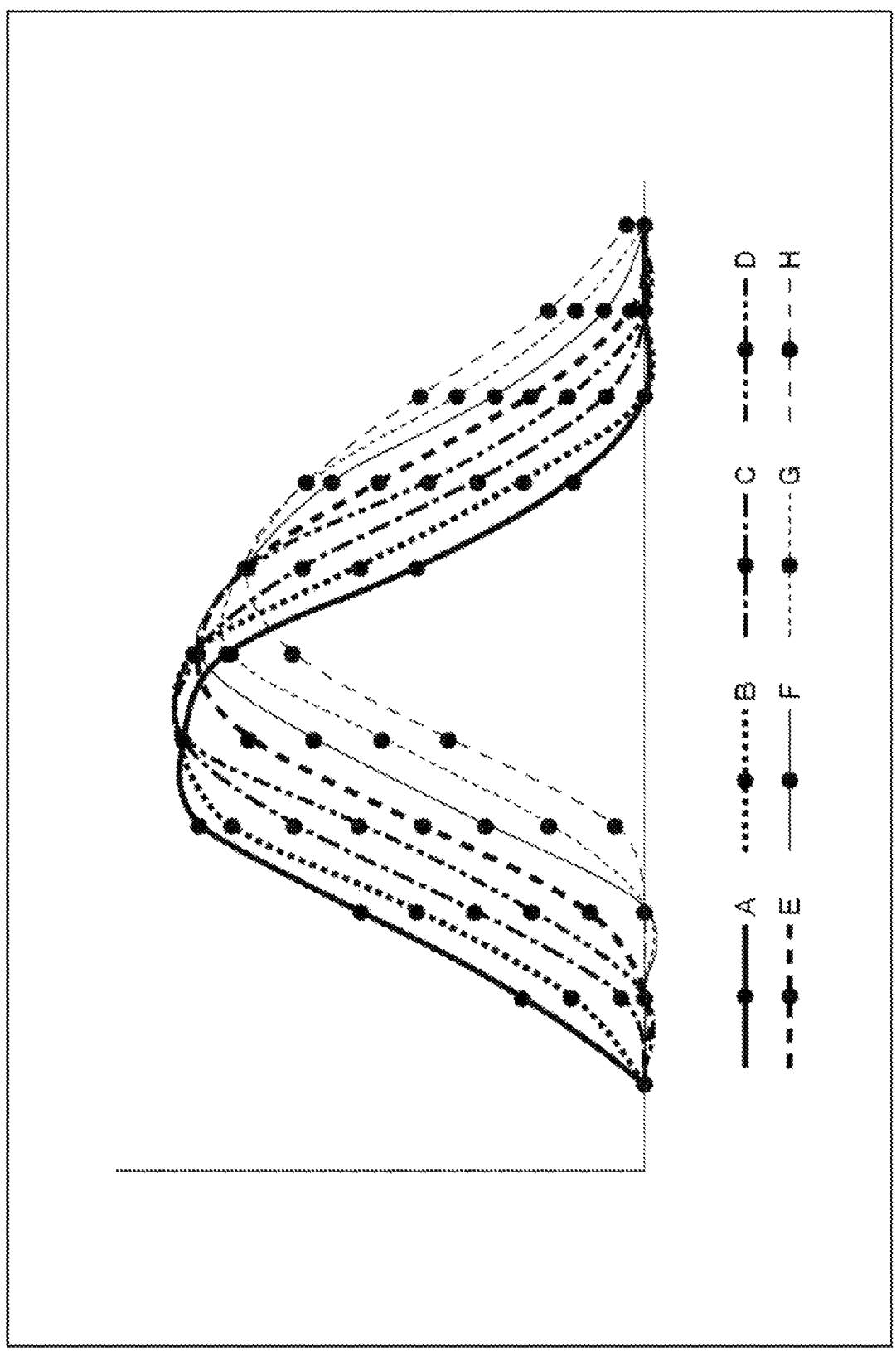
FIG. 6 is a diagram for describing characteristics of filters.

In a case where the wavelengths of the light passing through the MS filters 103-1 overlap with each other as illustrated in FIG. 6, an inverse matrix described later can be solved to extract information of an arbitrary wavelength of the subject.

Figure 7:
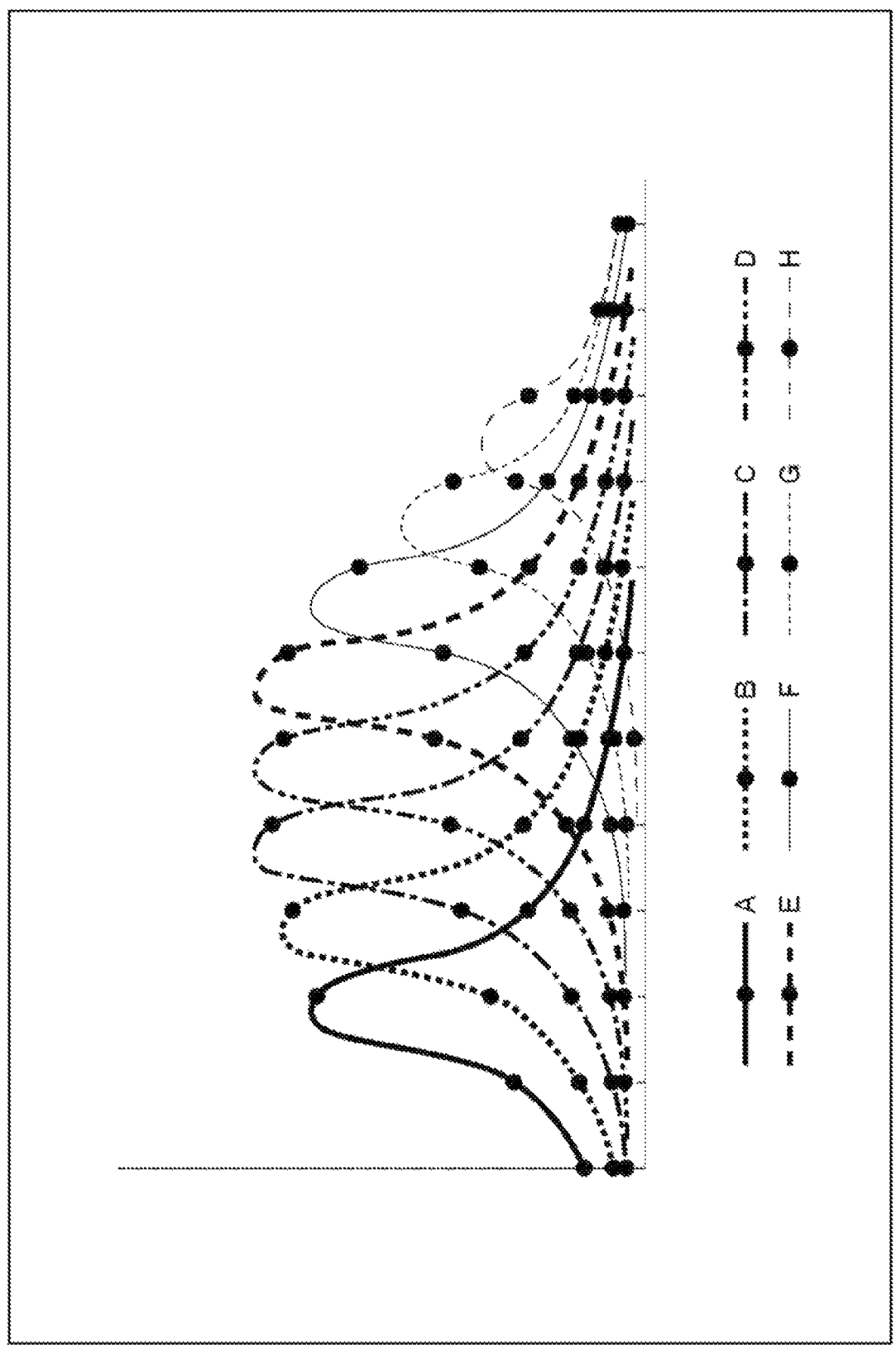
FIG. 7 is a diagram for describing characteristics of filters.

In a case where the range of the overlapping wavelengths of the light passing through the MS filters 103-1 is reduced as illustrated in FIG. 7, narrow-band filters independent from each other can be provided. In this case, although it is difficult to extract the information of an arbitrary wavelength of the subject (information can be predicted by interpolation or extrapolation from a specific wavelength), there is an advantage that the sensor output can be predicted without solving the inverse matrix.

The optical filters of the case in which the wavelengths of the light passing through the MS filters 103-1 overlap with each other as illustrated in FIG. 6 can be a kind of metal thin-film filters using metallic thin films, such as aluminum, and filters using the principle of surface plasmon resonance can be applied.

The optical filters of the case in which the range of the overlapping wavelengths of the light passing through the MS filters 103-1 is reduced as illustrated in FIG. 7 can be filters including thin films formed on the sensor surfaces, and filters using the principle of Fabry-Perot resonance can be applied.

In addition, multispectral sensors can be provided on the basis of pixels of the MS sensors 103-2.

Figure 8:
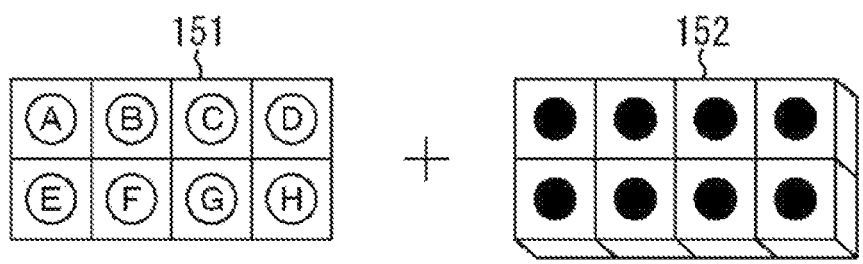
FIG. 8 is a diagram for describing a configuration of an example of multi-cameras.

In addition, as illustrated in FIG. 8, multi-filters 151 and multi-cameras 152 can be combined to provide a multispectral camera.

The multi-filters 151 are filters that transmit different light for each pixel group, instead of each pixel. For example, each of the regions A to H has a size of a group of a×b pixels, and the regions corresponding to the multi-cameras 152 have the same size as the size of the corresponding regions A to H (group of a×b pixels is arranged).

Figure 9:
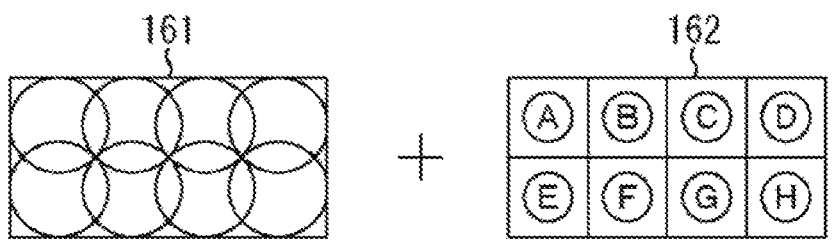
FIG. 9 is another diagram for describing a configuration of an example of multi-cameras.

Furthermore, as illustrated in FIG. 9, a multi-lens array 161 (corresponding to the lens 101 in FIG. 3) and multi-filters 162 can be combined to provide a multispectral camera.

Convex lenses are two-dimensionally arranged in the multi-lens array 161, and a luminous flux incident on the multi-lens array 161 two-dimensionally forms light source images on the multi-filters 162 (forms a light source image on each lens included in the multi-lens array 161).

The multi-filters 162 are filters divided into a plurality of regions as in the multi-filters 151 of FIG. 8, and in this case, the filters are divided into regions, each corresponding to one lens of the multi-lens array 161. Alternatively, the multi-filters 162 are filters that transmit a predetermined wavelength in each pixel as in the MS filters 103-1 of FIG. 5.

In the case of the multi-cameras illustrated in FIG. 8 or FIG. 9, the multi-filters 151 (162) may be filters with the characteristics as illustrated in FIG. 6 or may be filters with the characteristics as illustrated in FIG. 7. Furthermore, the filters may be the very narrow-band multi-filters 151 (162) with the characteristics as illustrated in FIG. 10.

Figure 10:
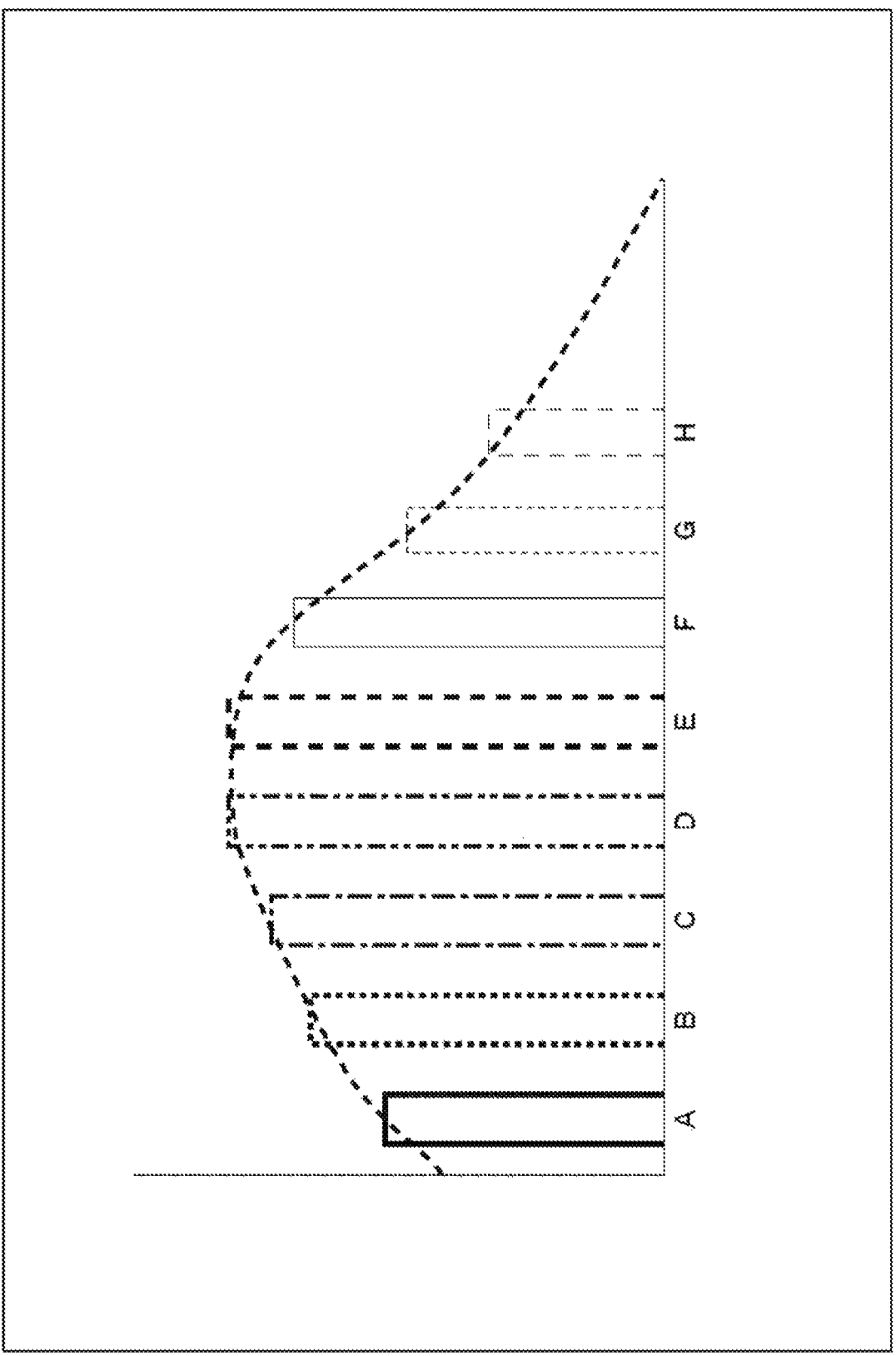
FIG. 10 is a diagram for describing characteristics of filters.

The filters with the characteristics as illustrated in FIG. 10 are called dichroic filters or the like, and the filters can include dielectric multilayer films with different refractive indices.

The present technique can be applied to (used for) any of the multi-cameras. An example of the case of using the filters with the characteristics as illustrated in FIG. 6 will be illustrated here, and the description will be continued by illustrating an example of the case of using the multi-cameras including the MS filters 103-1 and the MS sensors 103-2 as illustrated in FIG. 5.

The configuration of the image processing system 50 illustrated in FIG. 3 will be further described. Signals (image signals) from the MS sensors 103 are supplied to the designated wavelength calculation processing unit 104. The designated wavelength calculation processing unit 104 uses the supplied image signals to execute a process of generating images with desirable wavelengths of light. The MS sensors 103 are sensors that receive light at a plurality of different wavelengths, respectively, as described above, and the images obtained from the respective sensors are supplied to the designated wavelength calculation processing unit 104.

For example, in the case where the unit pixel of the MS sensors 103 includes the sensors that receive the light at the wavelengths A to H, respectively, as described with reference to FIG. 5, an image (referred to as image A) provided by output from the pixel that receives the light at the wavelength A, an image (referred to as image B) provided by output from the pixel that receives the light at the wavelength B, an image (referred to as image C) provided by output from the pixel that receives the light at the wavelength C, an image (referred to as image D) provided by output from the pixel that receives the light at the wavelength D, an image (referred to as image E) provided by output from the pixel that receives the light at the wavelength E, an image (referred to as image F) provided by output from the pixel that receives the light at the wavelength F, an image (referred to as image G) provided by output from the pixel that receives the light at the wavelength G, and an image (referred to as image H) provided by output from the pixel that receives the light at the wavelength H are supplied to the designated wavelength calculation processing unit 104.

In such a way, according to the imaging apparatus 11 of the present technique, the light at a plurality of different wavelengths is received, and as a result, a plurality of images is obtained at once. The images obtained at once will be appropriately referred to as multispectral images. The multispectral images include a plurality of spectral images extracted according to the characteristics of the multispectral filters (the MS filters 103-1).

The designated wavelength calculation processing unit 104 uses, without change, the multispectral images supplied from the MS sensors 103, performs inverse matrix calculation using the multispectral images to extract (generate) and use images at an arbitrary wavelength, or uses the multispectral images as well as images at an arbitrary wavelength generated by the calculation. The images used by the designated wavelength calculation processing unit 104 are supplied to the reference image generation processing unit 105 or the inspection wavelength image extraction unit 106.

The reference image generation processing unit 105 generates a reference image. The reference image is an image used to generate information as a source of the stitching process (stitch reference information 303 described later). In addition, the reference image is the most characteristic image according to the features of the subject. The generation of the reference image and the stitching process as a process after the generation will be described later. The reference image generated by the reference image generation processing unit 105 is supplied to the reference image stitch processing unit 107.

The inspection wavelength image extraction unit 106 generates an inspection image. For example, in a case of generating an image for checking the growth condition of a plant, an image at a wavelength (inspection wavelength) suitable for sensing the vegetation is generated (extracted). The inspection image extracted by the inspection wavelength image extraction unit 106 is supplied to the inspection image stitch processing unit 108.

The reference image stitch processing unit 107 applies a stitching process to the reference image. An image generated by the stitching process of the reference image (information of the image) is used for the stitching process of the inspection image. Here, the image (information) generated by the stitching process of the reference image is referred to as a stitching reference map or stitch reference information.

The generated stitch reference information is supplied to the inspection image stitch processing unit 108. The inspection image is also supplied to the inspection image stitch processing unit 108 from the inspection wavelength image extraction unit 106. The inspection image stitch processing unit 108 stiches the inspection images on the basis of the stitch reference information and generates inspection images after stitching.

<Operation of Image Processing System>

An operation of the image processing system illustrated in FIGS. 1 to 3 will be described with reference to FIGS. 11 and 12.

At time T1 (FIG. 11), a flight plan is made. For example, in a case where a mobile measurement apparatus 201 moves above a predetermined field 211 to image a measurement target, such as a plant in the field 211, a flight plan as illustrated in the part of time T1 in FIG. 11 is made.

The mobile measurement apparatus 201 is, for example, an unmanned aerial vehicle (UAV). The mobile measurement apparatus 201 flies based on rotation of a propeller rotary wing 202 and senses (takes an aerial photograph of) an object to be measured, such as a plant in the field 211, from the sky. The illuminance sensor 12 (FIG. 1) is attached on the surface of the mobile measurement apparatus 201 that can receive the sunlight during aerial photography, and the illuminance value can be sensed. In addition, the imaging apparatus 11 is attached on the surface of the mobile measurement apparatus 201 facing the field 211 during aerial photography.

The mobile measurement apparatus 201 is wirelessly controlled on the basis of the flight plan to take an aerial photograph, or the flight plan is stored in advance as coordinate data, and the mobile measurement apparatus 201 uses position information of a GPS (Global Positioning System) or the like to autonomously fly to take an aerial photograph. Note that although the mobile measurement apparatus 201 is a rotary-wing aircraft including the rotary wing 202 in the description here, the mobile measurement apparatus 201 may be a fixed-wing aircraft.

At time T2, actual aerial photography of the field 211 is performed on the basis of the flight plan. The aerial photography is performed such that the photographed images overlap. At time T3 (FIG. 12), aerial photography results are obtained. As illustrated in FIG. 12, the photographed images include overlapping parts. The overlapping parts are trimmed and stitched by, for example, deleting one of the overlapping parts and leaving the other or by combining the overlapping parts. As a result, images are generated such that a plurality of images is arranged without overlapping parts as illustrated in time T4 (FIG. 12).

For example, in a case where 500 images are photographed at time T2, the 500 images are used to perform trimming and stitching, and the images are ultimately mapped on a map.

The imaging apparatus 11 according to the present technique includes the MS sensors 103 as described with reference to FIG. 5 and receives the light at the wavelengths A to H to generate the images A to H. The case in which the MS sensors 103 photograph 500 images as described above will be described with reference to FIG. 13.

The aerial photography is performed, and 500 images including images 301A-1 to 301A-500 are obtained as aerial photography results from the pixel of the MS sensors 103 that receives the light at the wavelength A (referred to as pixel A, the other pixels will be similarly described hereinafter).

Similarly, 500 images including images 301B-1 to 301B-500 are obtained as aerial photography results from the pixel B that receives the light at the wavelength B of the MS sensors 103. 500 images including images 301C-1 to 301C-500 are obtained as aerial photography results from the pixel C that receives the light at the wavelength C. 500 images including images 301D-1 to 301D-500 are obtained as aerial photography results from the pixel D that receives the light at the wavelength D.

Furthermore, similarly, 500 images including images 301E-1 to 301E-500 are obtained as aerial photography results from the pixel E that receives the light at the wavelength E. 500 images including images 301F-1 to 301F-500 are obtained as aerial photography results from the pixel F that receives the light at the wavelength F. 500 images including images 301G-1 to 301G-500 are obtained as aerial photography results from the pixel G that receives the light at the wavelength G. 500 images including images 301H-1 to 301H-500 are obtained as aerial photography results from the pixel H that receives the light at the wavelength H.

In this case, 500 images are obtained from each of the pixels A to H. Examples of the aerial photography results generated at time T3 (FIG. 12) include an image of the field 211 including the images 301A-1 to 301A-500, an image of the field 211 including the images 301B-1 to 301B-500, and the like. If the image to be ultimately obtained is an image based on the wavelength A, the images 301A-1 to 301A-500 are used to perform trimming and stitching.

Therefore, if the image to be ultimately obtained is an image based on each of the wavelengths A to H, the images 301A-1 to 301A-500 are used to perform trimming and stitching, the images 301B-1 to 301B-500 are used to perform trimming and stitching, and so on. In such a way, a process using each of the images 301A to 301H is executed.

Such a process is an enormous process, and a large amount of data is handled. If the image processing system 10 as illustrated in FIG. 1 is constructed by a configuration that is not the image processing system 50 as illustrated in FIG. 3, the amount of data transferred from the imaging apparatus 11 to the calculation apparatus 14 may become large, and the time required for the transfer may become long. In addition, the amount of calculation by the calculation apparatus 14 may become large, and the processing time of the calculation apparatus 14 may become long. In other word, it is likely that the transfer of data and the processing time will become long according to the configuration that is not the image processing system 50 as illustrated in FIG. 3.

However, the configuration of the image processing system 50 as illustrated in FIG. 3 is provided in the present embodiment, and the transfer of data and the processing time can be shortened.

Figure 14:
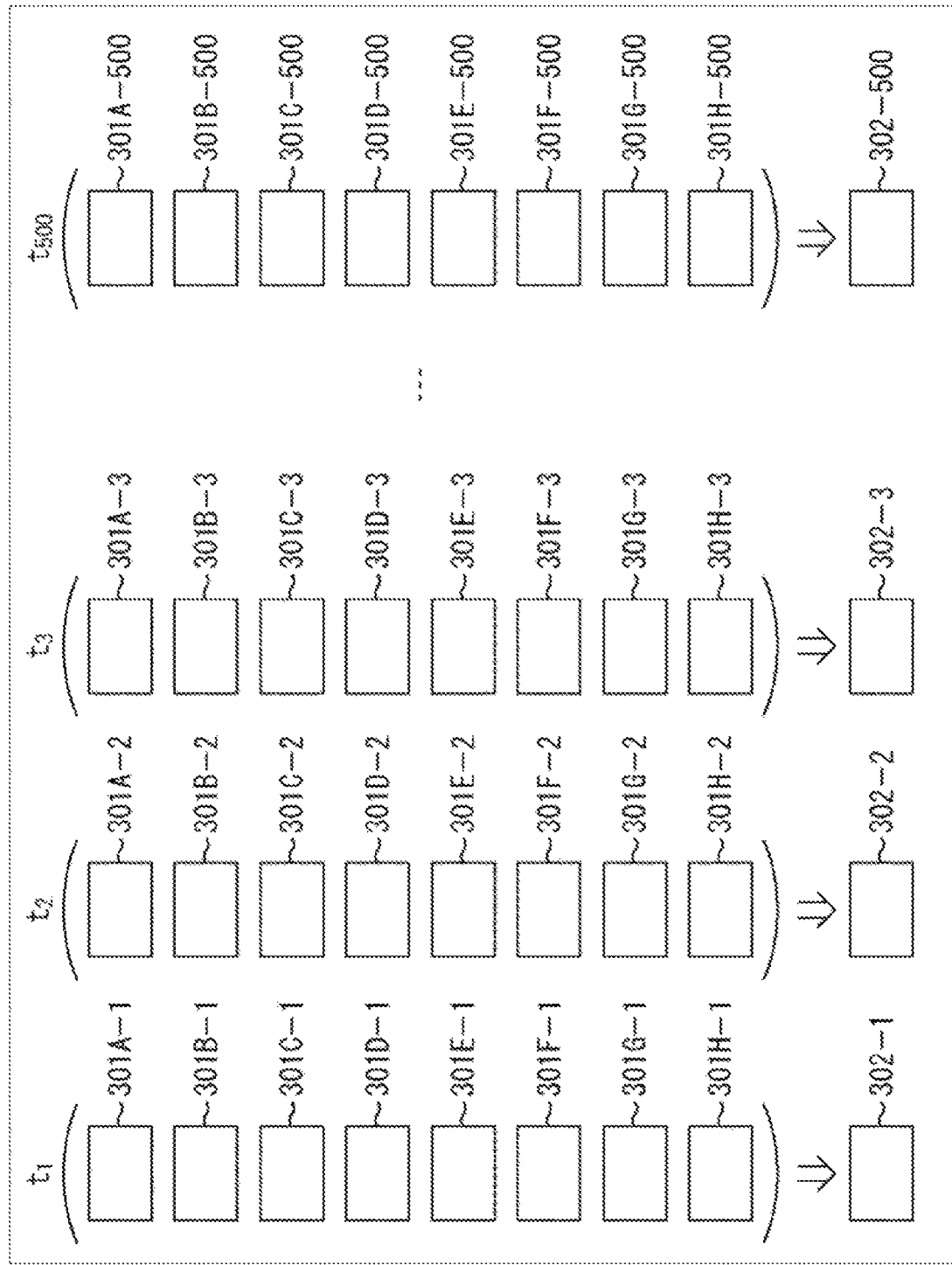
FIG. 14 is a diagram for describing generation of reference images.

The details will be sequentially described, but first, an outline will be described. As illustrated in FIG. 14, 4000 (=8×500) images 301 obtained from the pixels A to H are used to generate reference images 302. First, a reference image 302-1 is generated from the images 301A-1 to 301H-1 photographed at the same time (referred to as time t1).

Note that in this case, the images photographed at the same time are images photographed by the MS sensors 103 at the same time, and the images are obtained by photographing the same section. That is, for example, the images 301A-1 to 301H-1 photographed at time t1 are images obtained by photographing the same section and are images at different wavelengths. In such a way, the reference images 302 are generated from the plurality of images 301 obtained by photographing the same section.

A reference image 302-2 is generated from the images 301A-2 to 301H-2 photographed at time t2, and a reference image 302-3 is generated from the images 301A-3 to 301H-3 photographed at time t3. Similar processes are repeated to generate reference images up to a reference image 302-500. That is, reference images 302-1 to 302-500 are generated.

The reference image 302 is an image that is the most characteristic image according to the feature of the subject. For example, in an image obtained by photographing a structure as a subject, the structure is characteristic in the image, that is, for example, the part of the structure is extracted as an edge in the image. Therefore, the images with matching characteristic parts can be placed on top of each other to perform stitching.

For example, with reference again to FIG. 12, the images overlap with each other as illustrated in the part of time T3. In the case where the images are the reference images 302, matching characteristic parts (for example, regions where edges are detected, hereinafter, appropriately referred to as feature regions) between the reference images 302 adjacent to each other can be placed on top of each other, that is, for example, parts with a structure can be placed on top of each other, to perform stitching.

Figure 15:
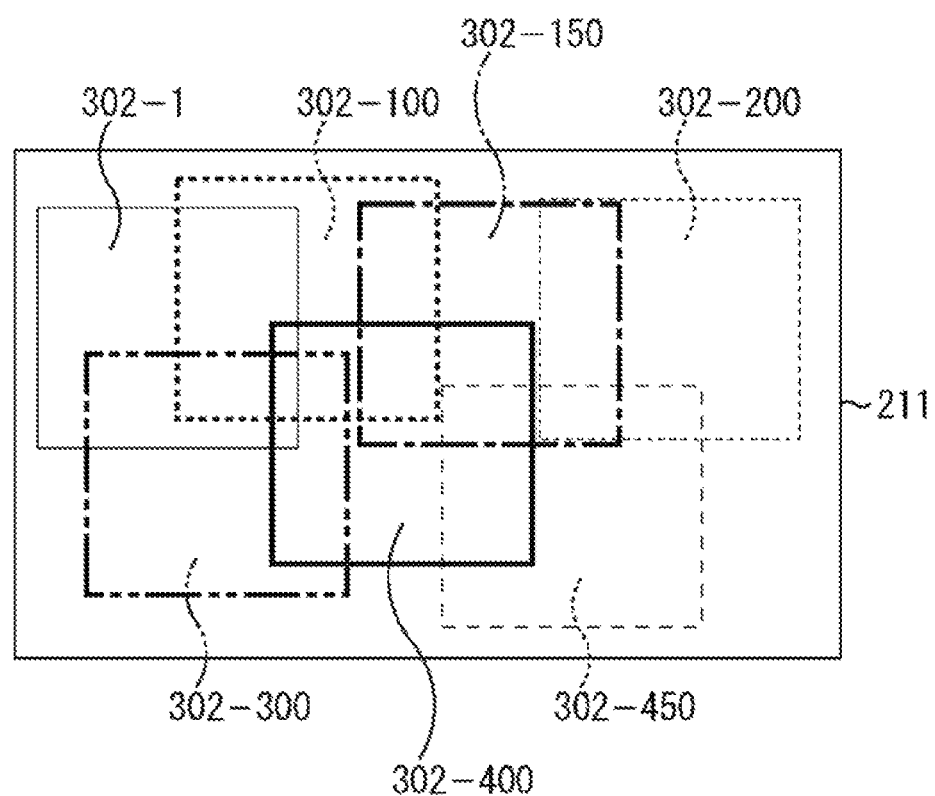
FIG. 15 is a diagram for describing a stitching process of the reference images.

For example, it is assumed that the reference images 302 are stitched (in the overlapping state) as illustrated in FIG. 15. FIG. 15 illustrates the same state as the aerial photography results illustrated in time T3 of FIG. 12.

With reference to FIG. 15, the reference image 302-100 is arranged in the overlapping state on the right of the reference image 302-1. The reference image 302-150 is arranged in the overlapping state on the right of the reference image 302-100. The reference image 302-200 is arranged in the overlapping state on the right of the reference image 302-150.

The reference image 302-300 is arranged in the overlapping state below the reference image 302-1. The reference image 302-400 is arranged in the overlapping state on the right of the reference image 302-300. The reference image 302-450 is arranged in the overlapping state on the right of the reference image 302-400.

Figure 16:
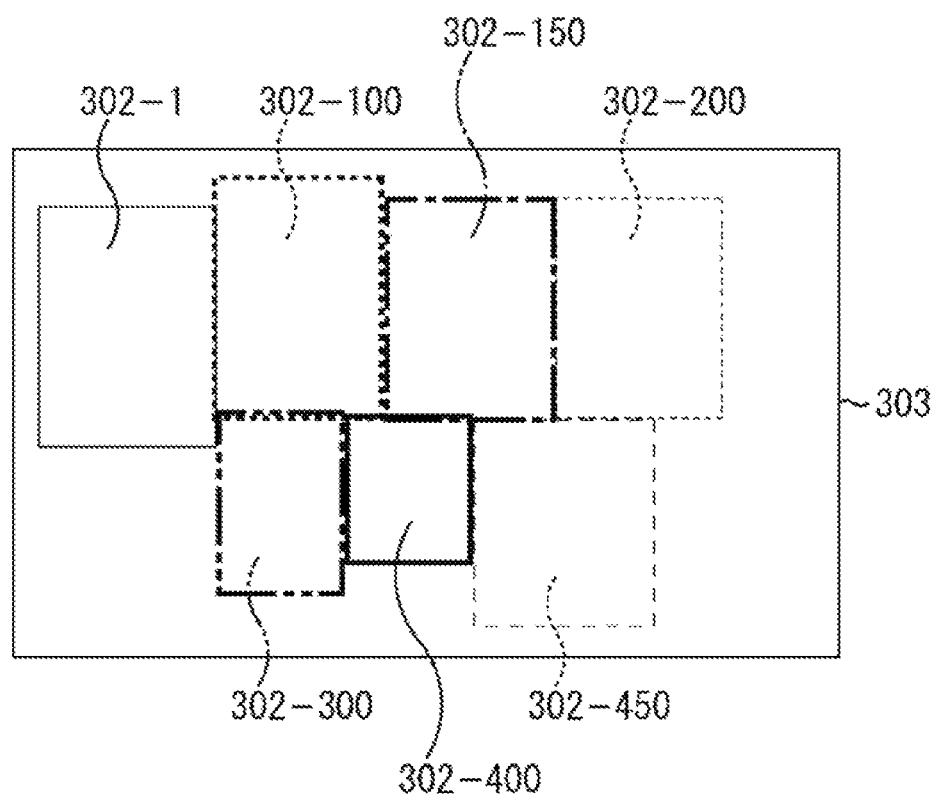
FIG. 16 is another diagram for describing the stitching process of the reference images.

In the case where the images in the state as illustrated in FIG. 15 are obtained by placing on top of each other the matching feature regions of the reference images 302 adjacent to each other, the overlapping parts can be deleted to obtain a stitching reference map 303 as illustrated in FIG. 16.

With reference to FIG. 16, part of the reference image 302-1 is arranged on the upper right of the stitching reference map 303, and part of the reference image 302-100 is arranged on the right of the reference image 302-1. Similarly, part of the reference image 302-150 is arranged on the right of the reference image 302-100, and part of the reference image 302-200 is arranged on the right of the reference image 302-150.

Furthermore, similarly, part of the reference image 302-300 is arranged below the reference image 302-100. Part of the reference image 302-400 is arranged on the right of the reference image 302-300. Part of the reference image 302-450 is arranged on the right of the reference image 301-400.

Such a stitching reference map 303 (stitch reference information 303) is generated. The stitching reference map 303 (stitch reference information 303) is information for positioning the reference images 302. In addition, the reference images 302 are, for example, images generated from the plurality of images 301 as described with reference to FIG. 14.

For example, in the example described in FIG. 14, the reference image 302-1 is generated from the images 301A-1 to 301H-1, and the reference image 302-2 is generated from the images 301A-2 to 301H-2.

In addition, the images 301A-1 to 301H-1 are, for example, images obtained by photographing a predetermined imaging region A, and the images 301A-2 to 301H-2 are, for example, images obtained by photographing a predetermined imaging region B. Here, the imaging region A and the imaging region B are regions at least partially overlapping with each other.

That is, summarizing the process so far, the reference image 302-1 regarding the imaging region A is generated on the basis of the plurality of images 301A-1 to 301H-1 regarding the imaging region A, and the reference image 302-2 regarding the imaging region B is generated on the basis of the plurality of images 301A-2 to 301H-2 regarding the imaging region B at least partially overlapping with the imaging region A.

Subsequently, the stitching reference map 303 (stitch reference information 303) as positioning information indicating the correspondence between the imaging region A and the imaging region B is generated on the basis of the reference image 302-1 and the reference image 302-2.

Note that although the stitching reference map is generated as positioning information in the example described here, the positioning information may be information indicating relative misalignment when the reference image 302-1 and the reference image 302-2 are placed on top of each other.

After the stitching reference map 303 (stitch reference information 303) is generated, inspection images at a desirable wavelength are mapped on the basis of the stitching reference map 303.

For example, a case in which inspection images at the wavelength A are mapped on the basis of the stitching reference map 303 will be described with reference to FIG. 17. The images 301A-1 to 301A-500 are acquired as the images at the wavelength A as described with reference to FIG. 13.

Part of the image 301A-1 is arranged on the section where the reference image 302-1 is arranged in the stitching reference map 303. The reference image 302-1 is a reference image 302 generated from the images 301A-1 to 301H-1 photographed at time t1 at which the image 301A-1 is photographed.

In such a way, the images 301 used to generate the reference images 302 are mapped. In addition, when the image 301 is mapped, the corresponding region is cut out and arranged in the same shape as the reference image 302 in the stitching reference map 303.

Information that allows to recognize the time of photographing of the image 301, the location of arrangement of the image 301, and the shape (size) of the image 301 to be cut out is written in the stitching reference map 303 (stitch reference information 303).

Figure 17:
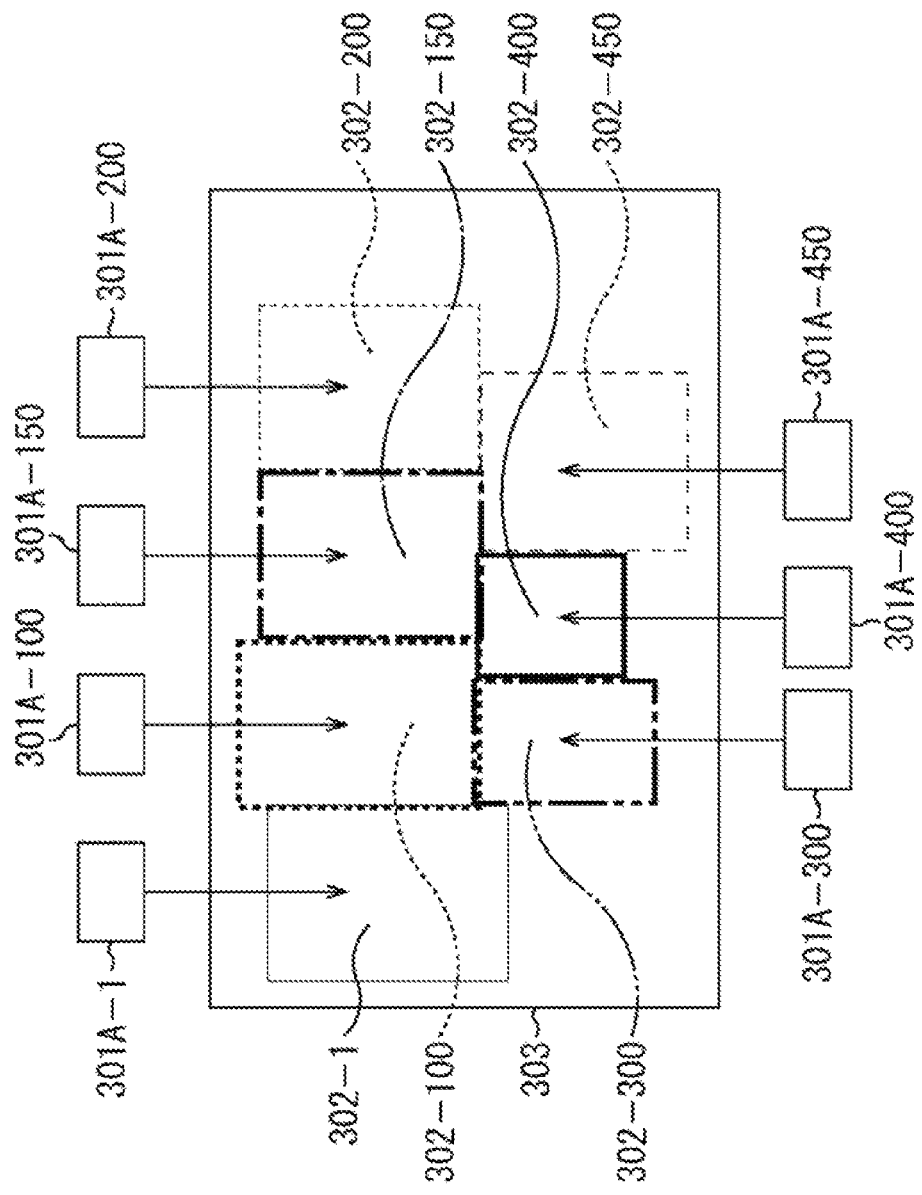
FIG. 17 is a diagram for describing a stitching process of inspection images.

With reference to FIG. 17, part of the image 301A-100 is arranged on the section where the reference image 302-100 is arranged in the stitching reference map 303. Part of the image 301A-150 is arranged on the section where the reference image 302-150 is arranged in the stitching reference map 303. Part of the image 301A-200 is arranged on the section where the reference image 302-200 is arranged in the stitching reference map 303.

In addition, part of the image 301A-300 is arranged on the section where the reference image 302-300 is arranged in the stitching reference map 303. Part of the image 301A-400 is arranged on the section where the reference image 302-300 is arranged in the stitching reference map 303. Part of the image 301A-450 is arranged on the section where the reference image 302-450 is arranged in the stitching reference map 303.

In such a way, the stitching reference map 303 (stitch reference information 303) can be created, and the inspection images at the desirable wavelength can be mapped on the basis of the stitching reference map 303 to generate a final inspection image at the desirable wavelength (appropriately referred to as final inspection image).

Although the example of the case of generating the final inspection image at the wavelength A is illustrated here, the same stitching map 303 (stitch reference information 303) can also be used to generate a final inspection image at the wavelength B as described above. Furthermore, the same stitching reference map 303 (stitch reference information 303) can be used to generate final inspection images at the wavelengths C to H as described above.

That is, when the stitching reference map 303 (stitch reference information 303) is generated, the stitching reference map 303 (stitch reference information 303) can be used to generate a final inspection image at a desirable wavelength.

In addition, inspection images can also be generated from images other than the images acquired as the multispectral images, and a final inspection image can be generated from the inspection images. In other words, although the MS sensors 103 including the pixels that receive the light at the wavelengths A to H, respectively, are used to acquire the images A to B (images 301A to 301H) corresponding to the wavelengths A to H in the description here, images X at a wavelength (referred to as wavelength X) not directly generated from the MS sensors 103 may be generated, and the images X can be set as the inspection images to generate the final inspection image.

<Generation of Images Using Inverse Matrix Calculation>

Figure 18:
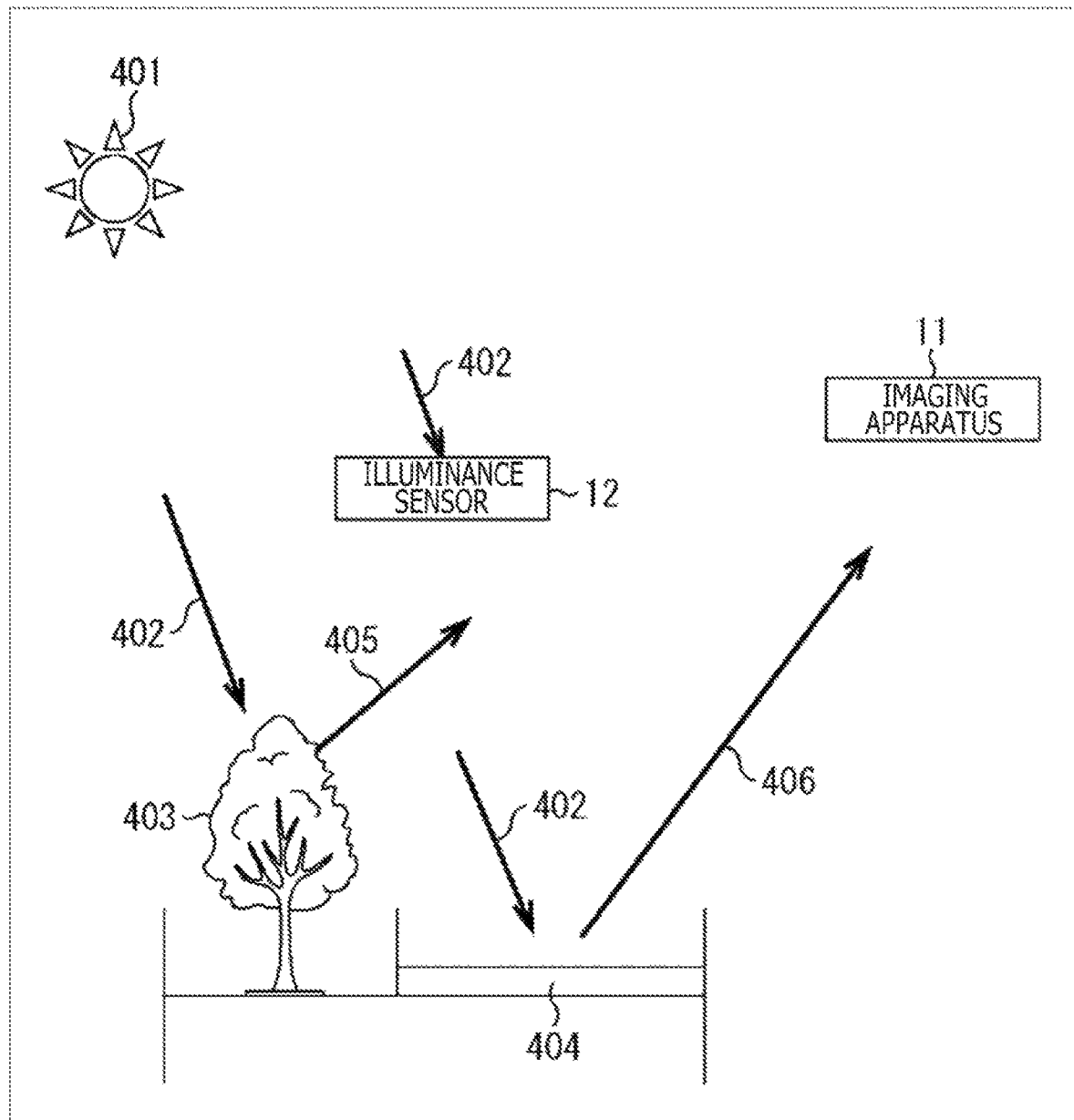
FIG. 18 is a diagram for describing an operation of the image processing system.

Here, the generation of the images X at a wavelength (referred to as wavelength X) other than the wavelength of the multispectral images generated from the signals from the MS sensors 103 will be additionally described. The images at the desirable wavelength X can be generated by performing the inverse matrix calculation using the multispectral images obtained from the MS sensors 103. To describe this, an outline of the operation of the imaging apparatus 11 will be described again first with reference to FIG. 18.

Sunlight 402 from the sun 401 is applied to a plant 403 and a road 404 and is also applied to the illuminance sensor 12. The illuminance sensor 12 measures the illuminance of the applied sunlight 402.

Figure 19:
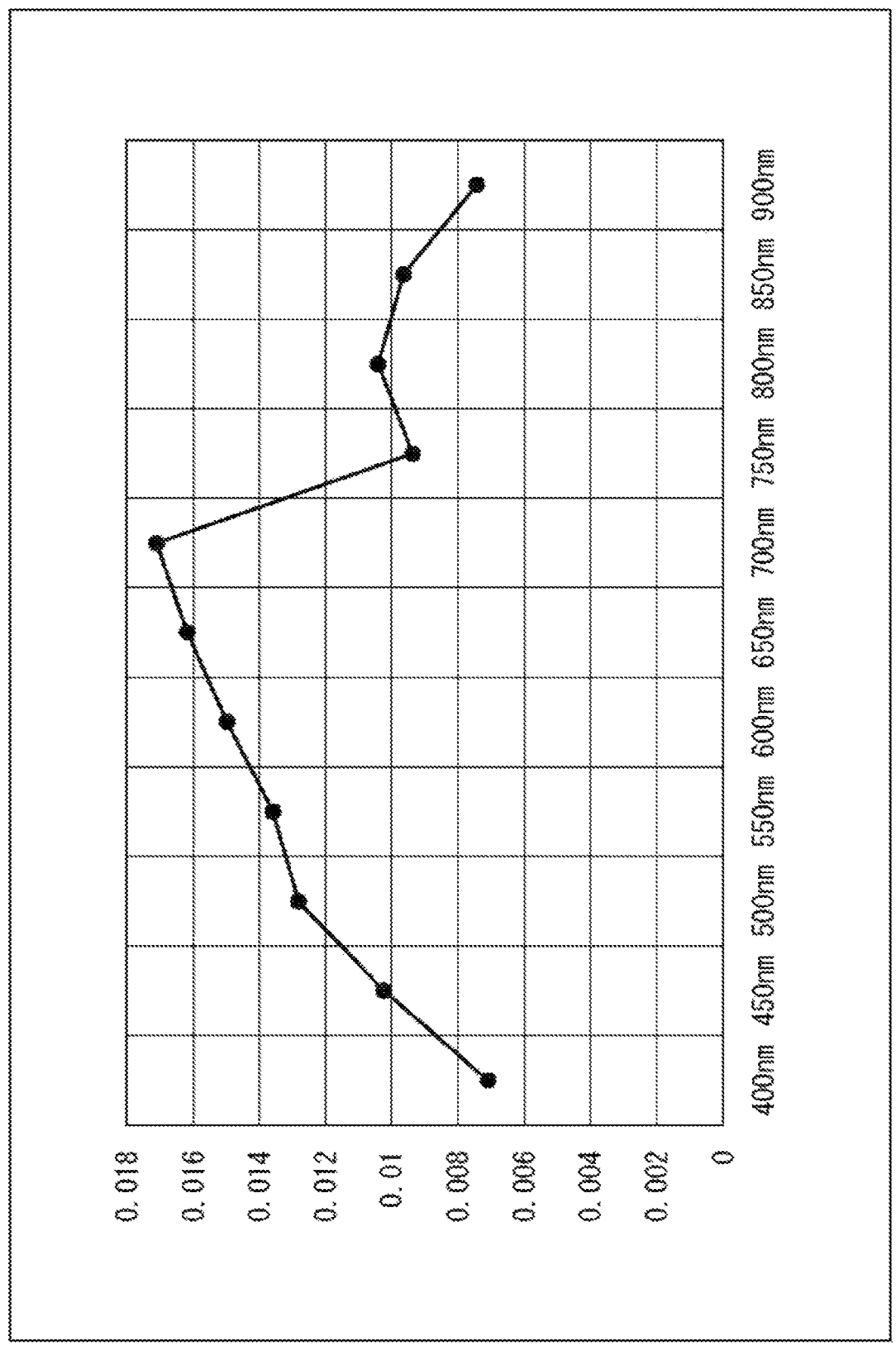
FIG. 19 is a diagram for describing light source information.

The illuminance sensor 12 measures the illuminance of the applied sunlight 402 and acquires illuminance values. The acquired illuminance values have, for example, spectral characteristics of the sunlight 402 as illustrated in FIG. 19. The graph illustrated in FIG. 19 indicates the spectral characteristics of the sunlight 402. The horizontal axis indicates the wavelength of light, and the vertical axis indicates the intensity of light.

Note that although the description will be continued here by illustrating the example of using the illuminance sensor 12, the illuminance values obtained from the illuminance sensor 12 may not be used to perform the calculation in the inverse matrix calculation using the multispectral images described later. Therefore, the present technique can also be applied to a configuration without the illuminance sensor 12.

Part of the sunlight 402 applied to the plant 403 is reflected by the plant 403, and reflected light 405 is received by the imaging apparatus 11. In addition, part of the sunlight 402 applied to the road 404 is reflected by the road 404, and reflected light 406 is received by the imaging apparatus 11.

Figure 20:
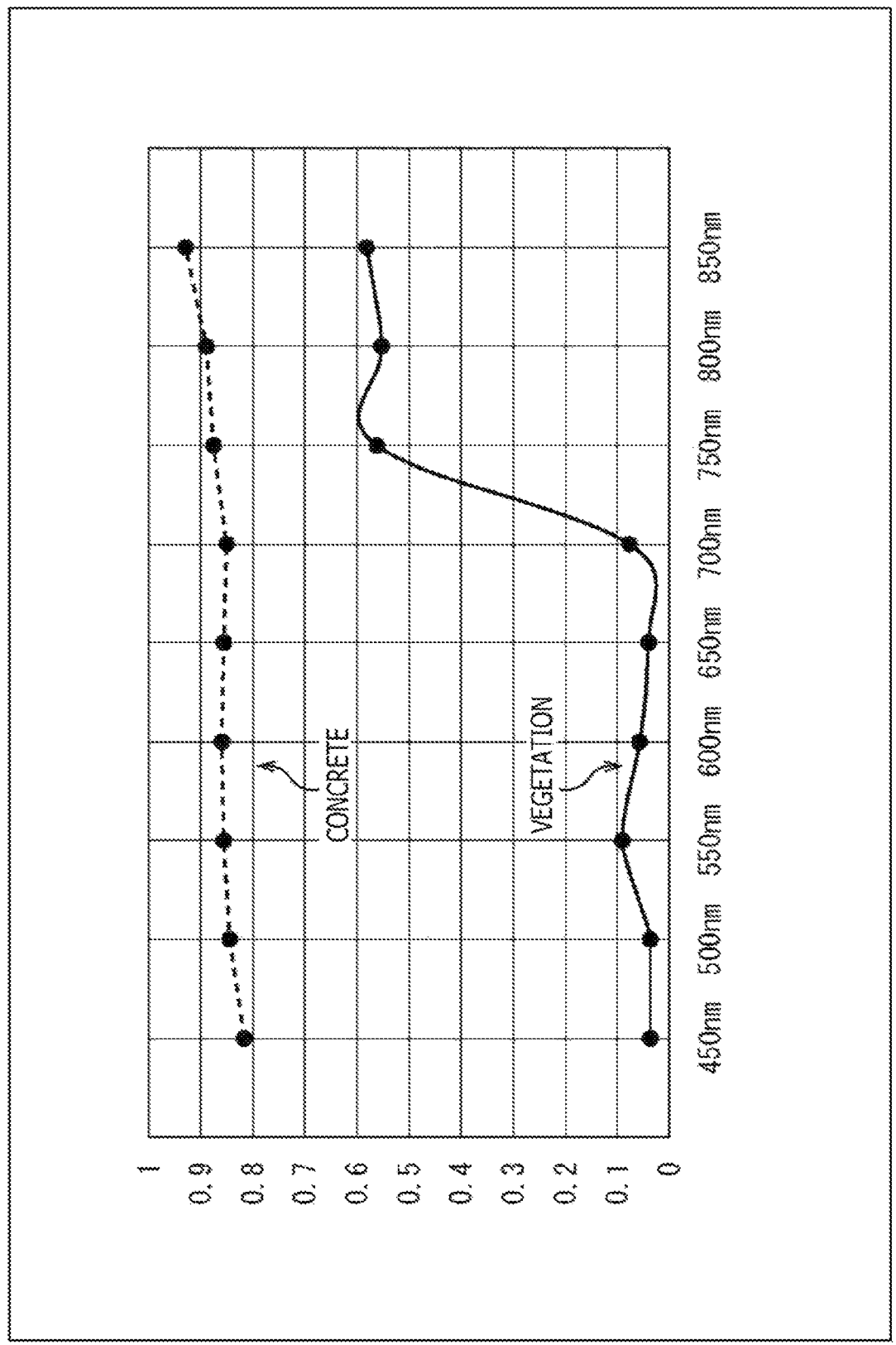
FIG. 20 is a diagram for describing that reflectance varies between objects.

Here, FIG. 20 will be referenced. FIG. 20 illustrates a graph indicating a relationship between the wavelength and the reflectance when vegetation and concrete are set as measurement targets. In FIG. 20, the horizontal axis indicates the wavelength, and the vertical axis indicates the reflectance. In addition, a graph indicated by a solid line represents results obtained when the measurement target is vegetation, and a graph indicated by a dotted line represents results when the measurement target is concrete (here, a structure such as the road 404).

As illustrated in FIG. 20, the reflectance when the light at the same wavelength is applied varies between the plant 403 and the road 404 (concrete). For example, in FIG. 20, the reflectance of the concrete indicated by the dotted line is higher than the reflectance of the vegetation indicated by the solid line.

In addition, although the reflectance of the concrete indicated by the dotted line in FIG. 20 is substantially constant reflectance regardless of the wavelength of light, the reflectance of the vegetation indicated by the solid line steeply changes at a specific wavelength of light. It can be recognized from FIG. 20 that the reflectance becomes high if the light has a wavelength equal to or higher than 700 nm in the case where the plant is the measurement target.

In such a way, even when the same sunlight 402 is applied, the reflected light 405 from the plant 403 and the reflected light 406 from the road 404 are different, and results are obtained in the case where the reflectance is measured.

Furthermore, even in a case where the same plant is the measurement target, the wavelength of light with the highest reflectance varies depending on the growth condition.

For example, there may be a case in which images obtained in imaging at the wavelength X suitable for an object as a measurement target need to be generated in a case where the wavelength X suitable for the object as a measurement target is not in the wavelengths A to H set in the MS sensors 103. In this case, the images at the desirable wavelength X are generated by performing the inverse matrix calculation using the multispectral images obtained from the MS sensors 103.

The images at the desirable wavelength X can be expressed by spectral reflection characteristics of the subject as a measurement target. In general, the following relational expression (1) holds between spectral characteristics of a light source (referred to as $L(\lambda)$), spectral characteristics of a subject (referred to as $P(\lambda)$), spectral characteristics of an imaging system (referred to as $S(\lambda)$), and a photographed image (referred to as $O(\lambda)$).

(spectral characteristics $L(\lambda)$ of light source)×(spectral characteristics $P(\lambda)$ of subject)×(spectral characteristics $S(\lambda)$ of imaging system)=(image ($O(\lambda)$)) (1)

The spectral characteristics of the light source are spectral characteristics obtained from the illuminance sensor 12 and are, for example, spectral characteristics of the sunlight 402 as illustrated in FIG. 19. Note that arbitrary values may be used for the spectral characteristics of the light source. In other words, preset spectral characteristics may be used instead of the spectral characteristics obtained from the illuminance sensor 12.

The spectral characteristics of the subject are spectral characteristics obtained from the reflected light from the subject and are, for example, spectral characteristics of the reflected light when the sunlight is applied to the plant or the concrete and reflected as illustrated in FIG. 20.

Figure 21:
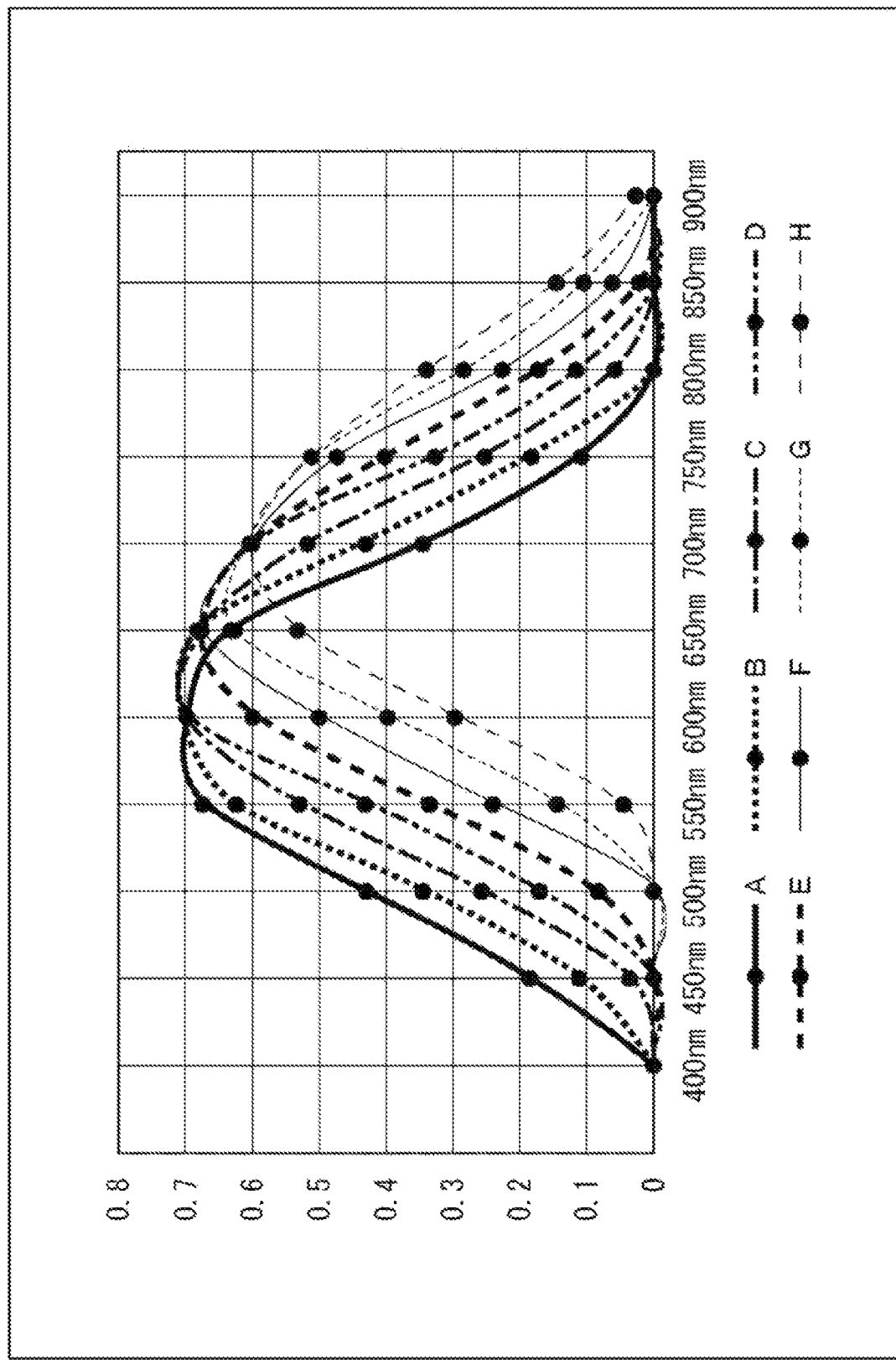
FIG. 21 is a diagram for describing spectral characteristics of MS sensors.

The spectral characteristics of the imaging system are spectral characteristics of the MS sensors 103 and are, for example, spectral characteristics as illustrated in FIG. 21. The MS sensors 103 are sensors that receive signals at, for example, eight types of wavelengths in one unit pixel as described above.

The MS sensors 103 are sensors with a combination of the MS filters 103-1 and the sensors 103-2. Therefore, the spectral characteristics of the MS sensors 103 are characteristics affected by the transmittance of the MS filters 103-1 and the sensitivity of the sensors 103-2. Specifically, the spectral characteristics are values obtained by multiplying the transmittance of the MS filters 103-1 by the sensitivity of the sensors 103-2. In addition, the sensitivity of the sensors 103-2 is sensitivity with respect to the sensitivity set as a standard, and normalized sensitivity is used.

The spectral characteristics of the MS sensors 103 are spectral characteristics of each wavelength of the wavelengths A to H as illustrated in FIG. 21.

Expression (1) can be transformed to obtain Expression (2) for calculating the spectral characteristics of the subject.

[Math. 1]

$$P(\lambda)=O(\lambda) \times L^{-1}(\lambda) \times S^{-1}(\lambda) \qquad (2)$$

In such a way, Expression (2), that is, the inverse matrix calculation, can be used to calculate the spectral reflection characteristics of the subject. In other words, z can be set to the wavelength X to perform the inverse matrix calculation based on Expression (2), and the multispectral images obtained from the MS sensors 103 can be used to generate the images at the desirable wavelength X.

In such a way, the images at the desirable wavelength can be generated, and the images can be set as the inspection images and mapped on the basis of the stitching reference map 303 to generate the final inspection image.

<First Generation Process of Final Inspection Image>

An operation of the image processing system 50 (FIG. 3) will be described with reference to a flow chart of FIG. 22.

Note that the description of first to sixth generation processes will be sequentially added below. Each generation process is based on assumption that the imaging unit 61 (lens 101, exposure unit 102, and MS sensors 103) acquires the multispectral images (acquires the images 301 at the wavelengths A to H), and the process during aerial photography will not be described.

Furthermore, in the following description, the description will be continued by illustrating the example in which 500 images 301 are photographed as the multispectral images at each of the eight wavelengths as described with reference to FIGS. 13 to 21. In addition, the description of the parts already described will be appropriately skipped.

In step S11, the reference image generation processing unit 105 executes a feature value calculation process. The multispectral images are supplied to the reference image generation processing unit 105 from the designated wavelength calculation processing unit 104. In the first generation process, the multispectral images (images 301) acquired by the MS sensors 103 are used without change to execute the process.

Figure 13:
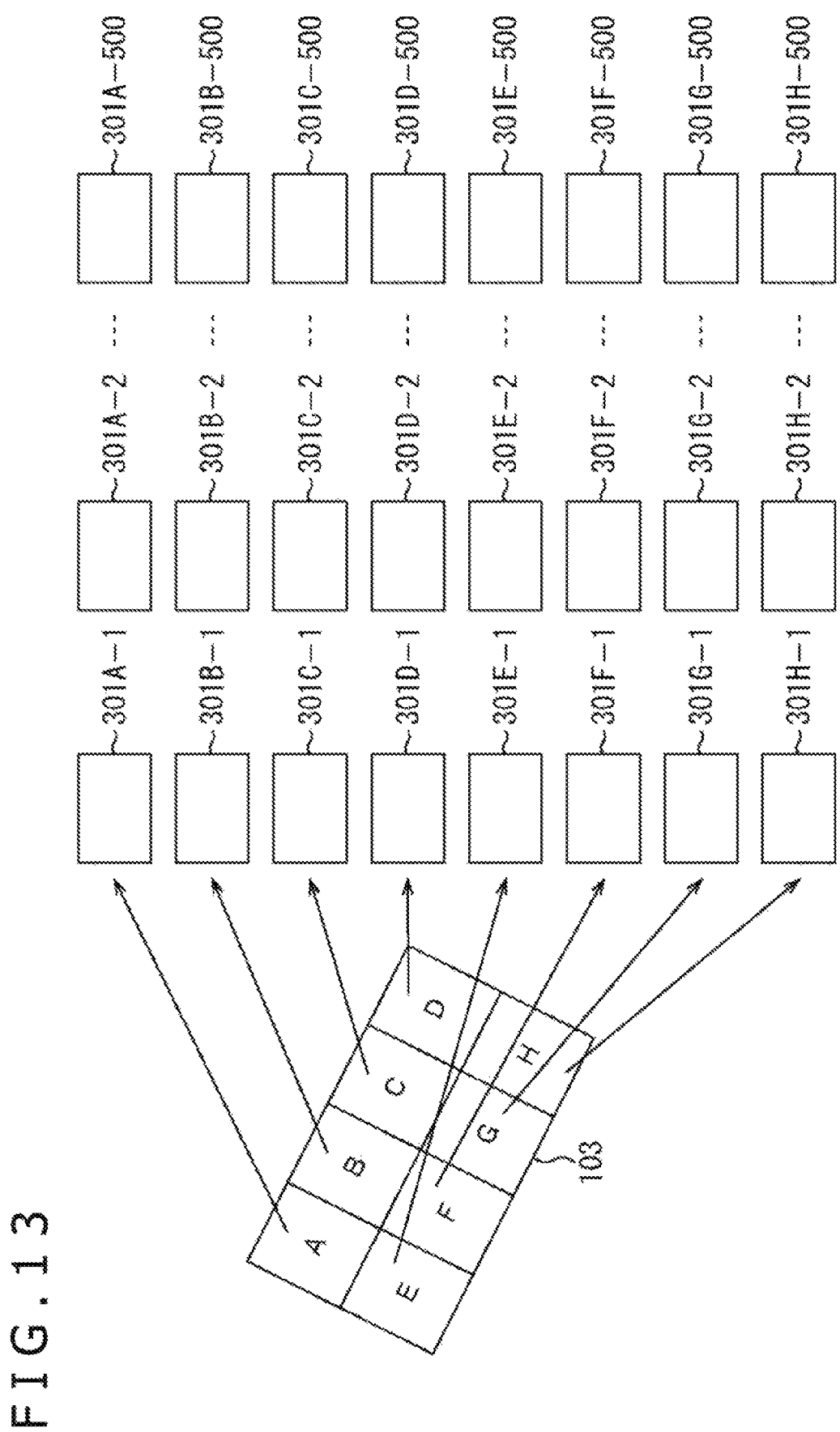
FIG. 13 is a diagram for describing multispectral images.

In a case where the image processing system 50 generates the final inspection image in the first generation process, the designated wavelength calculation processing unit 104 supplies the multispectral images from the MS sensors 103, such as the images 301 described with reference to FIG. 13, to the reference image generation processing unit 105.

In this case, the multispectral images may be directly supplied from the MS sensors 103 to the reference image generation processing unit 105 without the involvement of the designated wavelength calculation processing unit 104.

The feature value calculation process in step S11 (first feature value calculation process) will be described with reference to a flow chart of FIG. 23. In step S31, the reference image generation processing unit 105 extracts feature values of the multispectral images.

The feature value is an index indicating the size of the features of the image as described later. For example, the feature value is an index indicating the degree of existence of the feature regions in the image (characteristic parts of image as described above). The feature values are used for selecting the reference images, and the feature regions are used during the stitching process described later.

For example, the feature value (index indicating the size of the features of the image) can be a spatial amount of change in the pixel value. The spatial amount of change in the pixel value can be the difference between the pixel values of close pixels. In this case, for example, an edge region can be extracted by extracting a region in which the difference value between the pixel values of the pixels is equal to or greater than a threshold.

The spatial amount of change in the pixel value can be used as an index indicating the size of the feature of the image, and the amount of change can be set as the feature value to perform the calculation in step S31.

In addition, examples of the method of extracting the edge region from the image include a method using a differential operation and a method using a high-pass filter. The edge region can be defined as a region with a sharp change in color or the like, and in other words, it can be stated that the slope of the graph is sharp in the edge region. There is a method of using this to obtain a slope based on a differential and extracting the edge region by assuming that the region is an edge in a case where the slope is greater than a predetermined threshold.

In addition, a region with an edge includes high frequency components, and there is a method of using a high-pass filter to extract the high frequency components to thereby extract the region with the edge.

When the reference images are generated in a process of a latter stage (for example, step S51 of FIG. 24), the feature values of the images are compared. In the case where the spatial amount of change in the pixel value is calculated as the feature value in step S31, the feature value used in step S51 can be, for example, a sum total of the differences between the pixel values of close pixels calculated from one image.

Furthermore, in the case where the high frequency components are extracted to extract the region (=feature region) with an edge in step S31, the size (proportion) of the region extracted as the edge in one image is calculated as the feature value.

In addition, for example, a feature point may be extracted, and the feature point may be used as the index indicating the size of the feature of the image. The feature point can be obtained by dividing the image into a plurality of regions and using a calculation method called, for example, mean square error, to calculate the difference between the average value of the pixel values in the region and the pixel value in the region. The value (difference) can be compared with the pixel values of surrounding pixels to determine that the pixel with a large difference is a feature point.

In the case where the feature point is used as the index indicating the size of the feature of the image, the feature value can be, for example, the total number, the proportion, or the like of the feature points extracted from one image.

In addition, for example, statistics (for example, variance value) may be used as the index indicating the size of the feature of the image. For the variance value, the image can be divided into a plurality of regions, and the variance in the regions can be obtained to calculate representative statistics of each region. The value (statistics) can be used as the variance value.

The variance value when the variance in the region is calculated indicates the complexity of the pixel distribution of the region, and the variance value is large in a region, such as an edge, including an image in which the pixel value rapidly changes. Therefore, the variance in the region can be obtained as the index indicating the size of the feature of the image, and the variance value can be used as the feature value.

In the case where the statistics are used as the index indicating the size of the feature of the image, the feature value can be, for example, the sum total, the average value, or the like of the statistics calculated from one image.

In the example of the case illustrated and described here, an edge is extracted from the image, and the feature value is a proportion of the extracted edge region in one image. In addition, the description will be continued by illustrating an example of a case in which the edge is extracted by extracting high frequency components.

Figure 23:
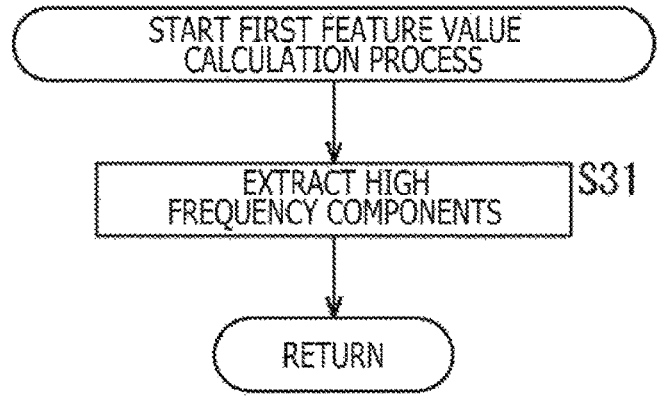
FIG. 23 is a flow chart for describing a first feature value calculation process.

The flow chart illustrated in FIG. 23 will be further described. In step S31, high frequency components are extracted (that is, edges are extracted) from each multispectral image to calculate the feature value. For example, as described with reference to FIG. 13, the MS sensors 103 apply a process of extracting the high frequency components to each of the images 301 that are the multispectral images including the images 301A-1 to 301A-500, the images 301B-1 to 301B-500, the images 301C-1 to 301C-500, the images 301D-1 to 301D-500, the images 301E-1 to 301E-

500, the images 301F-1 to 301F-500, the images 301G-1 to 301G-500, and the images 301H-1 to 301H-500.

The proportion of the extracted high frequency components (edge regions) in one image is used as the feature value, and therefore, the proportion is calculated in step S31. In addition, the feature regions are compared when the stitching process is applied to the reference images as described later. Therefore, while the feature values are calculated, the information regarding the feature regions extracted as the edge regions is appropriately stored.

Figure 22:
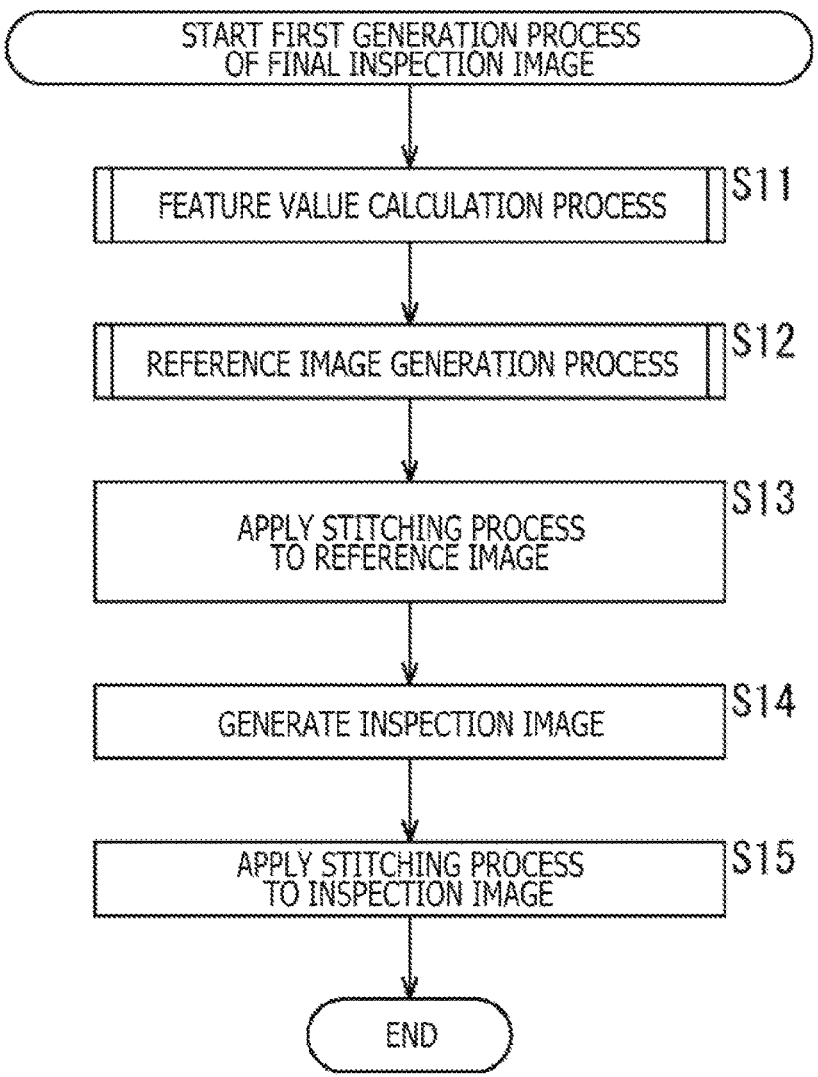
FIG. 22 is a flow chart for describing a first generation process.

Once the high frequency components are extracted from each image 301 to execute the calculation process of the feature value in step S31, the process proceeds to step S12 (FIG. 22).

In step S12, a reference image generation process is executed. The reference image generation process (first reference image generation process) executed in step S12 will be described with reference to a flow chart of FIG. 24.

In step S51, the reference image generation processing unit 105 compares the feature values of the images 301 calculated in the process of step S11. The results of the comparison are used to generate reference images in step S52.

The comparison of the feature values in step S51 is performed in the images photographed at the same time (images obtained by photographing the same section) as described with reference to FIG. 14. Furthermore, the image 301 with the largest feature value (with most features of the subject in the image) is preferentially selected and set as a reference image.

For example, with reference again to FIG. 14, the feature values (proportions of the regions extracted as edges) of the image 301A-1, the image 301B-1, the image 301C-1, the image 301D-1, the image 301E-1, the image 301F-1, the image 301G-1, and the image 301H-1 photographed at time t1 are compared, and the image 301 with the largest feature value is set as the reference image 302-1. For example, in a case where the feature value of the image 301A-1 is larger than the feature values of the other images 301B-1 to 301H-1, the image 301A-1 is set as the reference image 302-1.

Similarly, the process of comparing the feature values and setting, as the reference image 302, the image 301 with the largest feature value as a result of the comparison is also applied to the images 301-2 to 301-500. Once the process is executed to generate the reference images 302-1 to 302-500, the process proceeds to step S13 (FIG. 22).

Note that in a case where the feature value other than the proportion of the edge region in one image is used, such as in a case where the total number of feature points or the sum total of the statistics is used, the image 301 with a large feature value is similarly set as the reference image 302.

In step S13, the stitching process of the reference images is executed. The reference images 302-1 to 302-500 generated by the reference image generation processing unit 105 are supplied to the reference image stitch processing unit 107.

The reference image stitch processing unit 107 uses the supplied reference images 302-1 to 302-500 to execute the stitching process and generates the stitching reference map 303 (stitch reference information 303).

The stitching process using the reference images 302-1 to 302-500 is executed as described with reference to FIGS. 15 and 16. That is, the parts with matching (similar) feature regions in the reference images 302-1 to 302-500 are detected, and the parts are placed on top of each other and trimmed to generate images without overlapping parts (stitching reference map 303).

Note that as described above, the feature value, that is, the feature region extracted to calculate the index indicating the size of the feature of the image, is used for the stitching process, and therefore, a process suitable for the used feature region is executed.

For example, in the case where the results of the extraction of the edge regions are used to calculate the feature values, a process of putting together the extracted edge regions is executed in the stitching process.

Furthermore, in the case where the pixels different from the surrounding pixels are extracted as the feature points to calculate the feature values, a process of putting together the feature points (putting together the sections with matching or similar alignment of the feature points) is executed as the stitching process.

Furthermore, in the case where, for example, the variance values in the regions are calculated as the indices indicating the sizes of the features of the images to calculate the feature values, a stitching process of putting together the variance values (putting together the sections with the same or similar alignment of the regions with variance values) is executed.

In step S14, inspection images are generated. The inspection images are, for example, images photographed at the wavelength suitable for sensing the vegetation (images generated by inverse matrix calculation from the photographed images) in the case of inspecting (sensing) the vegetation.

The designated wavelength calculation processing unit 104 and the inspection wavelength image extraction unit 106 generate the inspection images. In an example of a method of generating the inspection images, the designated wavelength calculation processing unit 104 supplies the multi-spectral images (images at each of a plurality of wavelengths) to the inspection wavelength image extraction unit 106, and the inspection wavelength image extraction unit 106 extracts, from the plurality of supplied images, the images corresponding to the wavelength designated as the inspection wavelength to thereby generate the inspection images.

Furthermore, in another example of the method of generating the inspection images, the designated wavelength calculation processing unit 104 uses the multispectral images to generate images at a predetermined wavelength based on Expression (2) (as described with reference to FIGS. 18 to 21) and supplies the images to the inspection wavelength image extraction unit 106. The inspection wavelength image extraction unit 106 extracts, from the plurality of supplied images, the images corresponding to the wavelength designated as the inspection wavelength to thereby generate the inspection images.

In a case where the designated wavelength calculation processing unit 104 is configured to generate images corresponding to a plurality of preset wavelengths, the inspection wavelength image extraction unit 106 extracts, from the plurality of images generated and supplied by the designated wavelength calculation processing unit 104, the images corresponding to the wavelength designated as the inspection wavelength to thereby generate the inspection images.

In addition, the designated wavelength calculation processing unit 104 can also be configured to generate images at the wavelength to be extracted by the inspection wavelength image extraction unit 106, and in the case where the designated wavelength calculation processing unit 104 is configured in such a way, the inspection wavelength image extraction unit 106 handles the supplied images as images corresponding to the wavelength designated as the inspection wavelength (the supplied images are used without executing the process of extraction or generation).

Furthermore, in another method of generating the inspection images, the inspection wavelength image extraction unit 106, instead of the designated wavelength calculation processing unit 104, may generate the images at the designated wavelength. For example, the multispectral images may be supplied from the designated wavelength calculation processing unit 104 to the inspection wavelength image extraction unit 106, and the inspection wavelength image extraction unit 106 may use the supplied multispectral images to perform the calculation based on Expression (2) to thereby generate the inspection images at the designated wavelength (desirable wavelength).

Once the inspection images are generated in step S14, the process proceeds to step S15. The inspection images extracted by the inspection wavelength image extraction unit 106 are supplied to the inspection image stitch processing unit 108. The stitching reference map 303 (stitch reference information 303) is also supplied to the inspection image stitch processing unit 108 from the reference image stitch processing unit 107.

The inspection image stitch processing unit 108 uses the stitch reference information 303 as described with reference to FIG. 17 to apply the stitching process to the inspection images to generate the final inspection image.

The stitch reference information 303 is information indicating the images, the positions of the images cut out, and how the images are put together. In other words, the stitch reference information 303 is information including at least the information indicating the positional relationship between the images obtained by photographing a predetermined region and images obtained by photographing the regions overlapping with the region and is information that can be used as metadata associated with the images in the execution of the stitching process.

The inspection image stitch processing unit 108 refers to the stitch reference information 303 to determine the inspection image is to be used among the plurality of inspection images and the position (region) to be cut out from the inspection image to be used. The inspection image stitch processing unit 108 determines how the determined region is to be put together with the region cut out in the same way from another inspection image. The inspection image stitch processing unit 108 repeats the process to execute the stitching process of the inspection images and generates the final inspection image.

The final inspection image is, for example, mapped on an already generated map and used.

In such a way, the stitch reference information 303 is generated, and the stitch reference information 303 is used to execute the stitching process of the inspection images. As a result, even when the stitching process is applied to each of the inspection images at a plurality of wavelengths, the time required for the stitching process can be shortened, and the processing load can be reduced.

<Second Generation Process of Final Inspection Image>

Another operation of the image processing system 50 (FIG. 3) will be described. In the example of the first generation process illustrated as a process up to the generation of the final inspection image, the multispectral images acquired by the MS sensors 103 are used without change to calculate the feature values in the feature value calculation process in step S11.

A second generation process up to the generation of the final inspection image will be described by illustrating an example of a case in which the multispectral images are processed to calculate the feature values.

The image processing system 50 executes the second generation process on the basis of the flow chart illustrated in FIG. 22, as in the first generation process.

Figure 25:
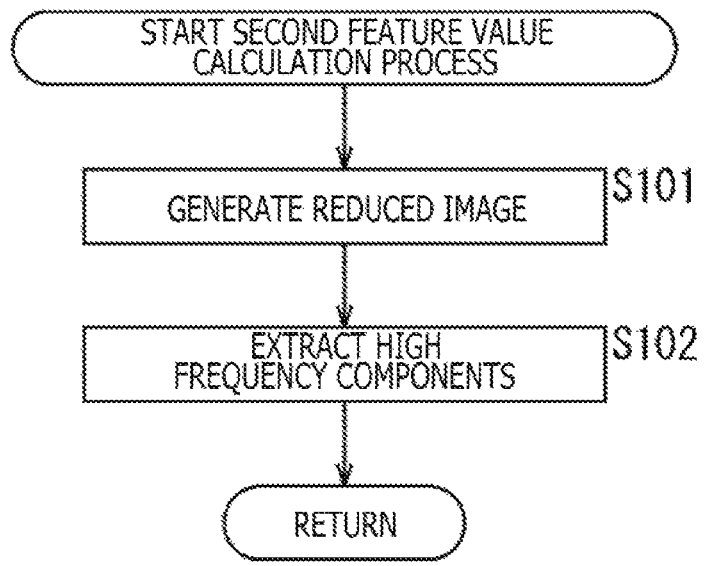
FIG. 25 is a flow chart for describing a second feature value calculation process.

The process is executed as in the flow chart illustrated in FIG. 22 except that the process is executed on the basis of a flow chart of a second feature value calculation process illustrated in FIG. 25 when the feature value calculation process is executed in step S11. Therefore, the description of the different process will be added here, and the process executed similarly will not be described.

Figure 26:
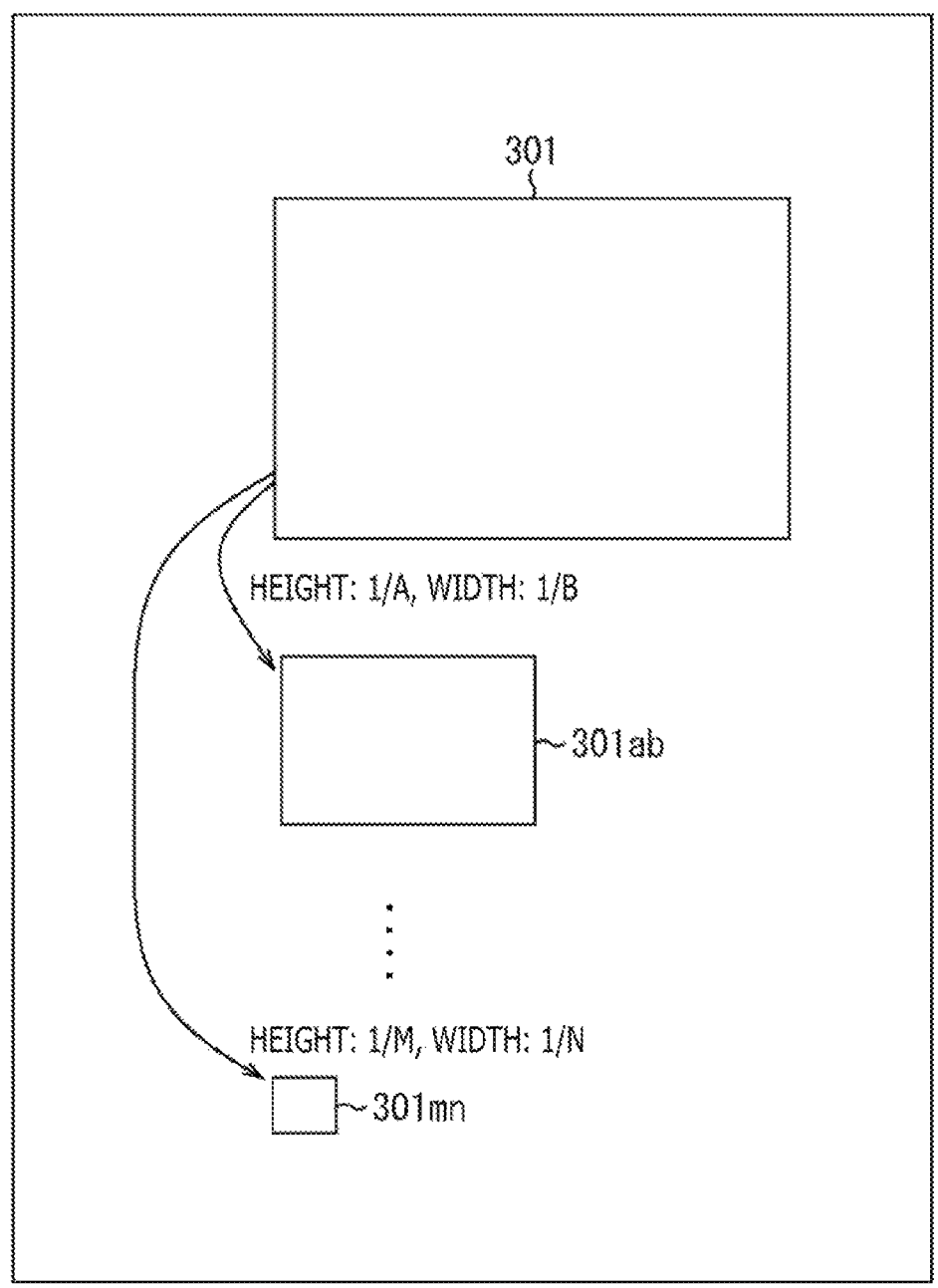
FIG. 26 is a diagram for describing creation of reduced images.

With reference to the flow chart illustrated in FIG. 25, a reduced image is first generated in step S101 when the feature value is calculated. As illustrated in FIG. 26, the image 301 is set as a standard image, and the image 301 is multiplied by 1/A vertically and multiplied by 1/B horizontally to generate a reduced image 301ab. In addition, the image 301 is multiplied by 1/M vertically and multiplied by 1/N horizontally to generate a reduced image 301mn.

For example, in a case where A=B=2 is set, the image 301 is multiplied by ½ vertically and multiplied by ½ horizontally to generate the reduced image 301ab. Similarly, for example, in a case where M=N=5 is set, the image 301 is multiplied by ⅕ vertically and multiplied by ⅕ horizontally to generate the reduced image 301mn.

Although the example of the case in which two reduced images are generated from the standard image 301 (original image) has been described here, a case in which one reduced image is generated and a case in which two or more reduced images are generated are also in the application range of the present technique. Note that in the following description, the description will be continued by illustrating an example of a case in which a total of three images including one original image and two reduced images are used to execute the process.

In addition, although the example of the case where A=B=2 is set and the case where M=N=5 is set is illustrated here, A and B may not be the same value, and M and N may not be the same value.

Once the reduced images are generated in step S101, the process proceeds to step S102. In step S102, the high frequency components are extracted (edges are extracted) (feature values are calculated). The process can be executed as in the process of step S31 in the flow chart illustrated in FIG. 23, and the process will not be described.

However, in step S102, the images 301 from which the high frequency components are extracted are the original image and the reduced images. For example, each of the image 301, the image 301ab, and the image 301mn as illustrated in FIG. 26 is the processing target. The high frequency components are extracted from each, and the feature value (such as proportion of edge region) is calculated on the basis of the extraction result.

Note that in comparing the feature values, a process such as multiplying the feature value of the reduced image by a predetermined coefficient to provide the same condition as the original image may be appropriately executed.

For example, in the case where the sum total of the feature points or the sum total of the statistics is used as the feature value, the number of target pixels (the number of regions) varies between the original image and the reduced image. Therefore, if the feature value of the original image and the feature value of the reduced image are simply compared, a wrong comparison result may be output.

Therefore, for example, after the feature value of the reduced image is calculated, the calculated feature value may be multiplied by a predetermined coefficient, such as a reduction rate. In such a way, a process of converting the feature value into a feature value that allows to handle the feature value as a feature value calculated in the same condition as the original image (calculated in the same number of pixels and the same number of regions as the original image) may be included.

Here, the description will be continued by assuming that the calculation process of the feature value in step S102 (process of calculating the feature value by extracting the high frequency components) includes the process that allows to handle the feature value calculated from the original image and the feature value calculated from the reduced image as feature values calculated in the same condition.

In such a way, when the feature value calculation process (step S11 of FIG. 22) is finished, the process proceeds to step S12. In step S12, a reference image generation process is executed.

Figure 24:
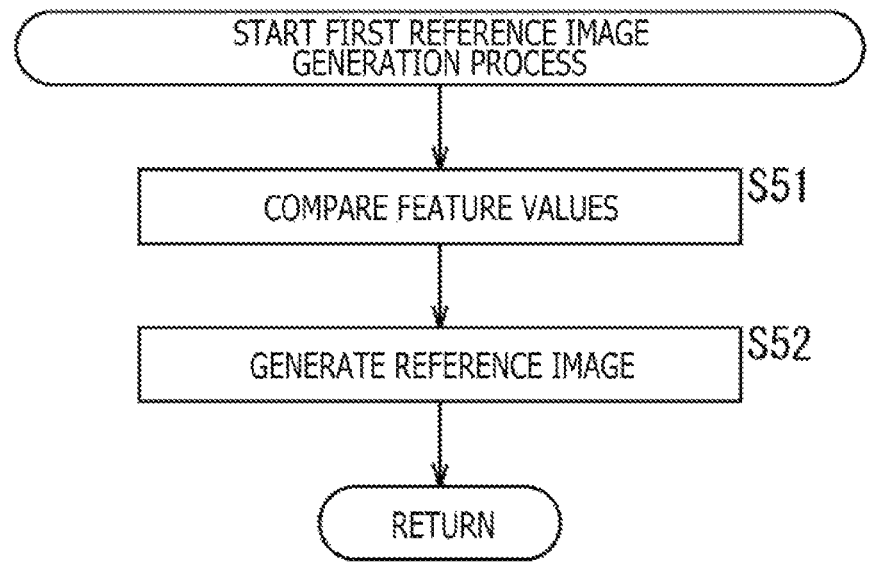
FIG. 24 is a flow chart for describing a reference image generation process.

The reference image generation process executed in step S12 is executed on the basis of the flow chart of the first reference image generation process illustrated in FIG. 24. The process is already described, and the process will not be described here. However, although the feature values are compared in step S51, the images in which the feature values are compared are different from the first generation process (first reference image generation process), and this will be additionally described with reference to FIG. 27.

Figure 27:
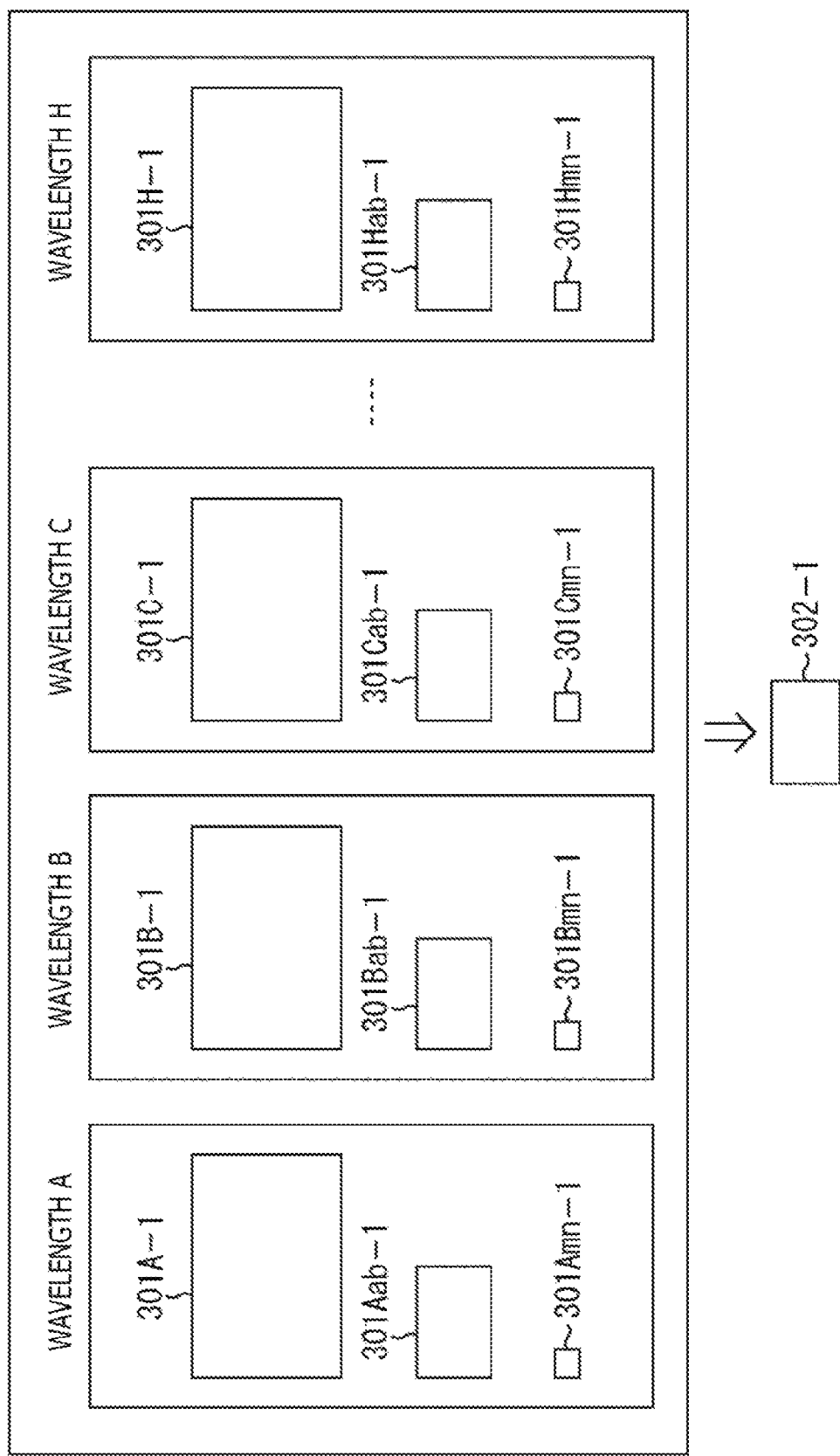
FIG. 27 is a diagram for describing generation of the reference images.

For example, in the case where the reference image 302-1 is generated from the image 301-1 photographed at time t1, the feature value is calculated from each of the image 301A-1 at the wavelength A and reduced images 301Aab-1 and 301Amn-1 of the image 301A-1 as illustrated in FIG. 27.

Similarly, the feature value is calculated from each of the image 301B-1 at the wavelength B and reduced images 301Bab-1 and 301Bmn-1 of the image 301B-1. In addition, the feature value is calculated from each of the image 301C-1 at the wavelength C and reduced images 301Cab-1 and 301Cmn-1 of the image 301C-1.

In addition, the feature value is calculated from each of the image 301D-1 at the wavelength D and reduced images 301Dab-1 and 301Dmn-1 of the image 301D-1. In addition, the feature value is calculated from each of the image 301E-1 at the wavelength E and reduced images 301Eab-1 and 301Emn-1 of the image 301E-1.

In addition, the feature value is calculated from each of the image 301F-1 at the wavelength F and reduced images 301Fab-1 and 301Fmn-1 of the image 301F-1. In addition, the feature value is calculated from each of the image 301G-1 at the wavelength G and reduced images 301Gab-1 and 301Gmn-1 of the image 301G-1.

In addition, the feature value is calculated from each of the image 301H-1 at the wavelength H and reduced images 301Hab-1 and 301Hmn-1 of the image 301H-1.

The image with the largest feature value among the feature values of the images is detected. That is, in the second generation process, the reduced images are also set as the processing targets to execute the process. The original image of the detected image with the largest feature value is set as the reference image 302-1.

For example, in a case where the image with the largest feature value is the reduced image 301Amn-1, the image 301A-1 as the original image of the reduced image 301Amn-1 is set as the reference image 302-1.

In addition, for example, in a case where the image with the largest feature value is the reduced image 301A-1, the image 301A-1 is set as the reference image 302-1.

In such a way, the reduced images can be generated, and the reduced images can also be included in the process. As a result, more characteristic images can be extracted and set as the reference images.

Once the reference images are generated in such a way, the process proceeds to step S13 (FIG. 22). The process from step S13 is already described, and the process will not be described.

<Third Generation Process of Final Inspection Image>

Another operation of the image processing system 50 (FIG. 3) will be described. In the examples of the first generation process and the second generation process illustrated as processes up to the generation of the final inspection image, the feature values are calculated by using, without change, the multispectral images acquired by the MS sensors 103 or by generating the reduced images in the feature value calculation process of step S11.

A third generation process up to the generation of the final inspection image will be described by illustrating an example of a case in which the original image and the reduced images are further divided into blocks to calculate the feature values to generate the reference images.

In the third generation process, the image processing system 50 executes the process on the basis of the flow chart illustrated in FIG. 22, as in the first generation process or the second generation process.

Figure 28:
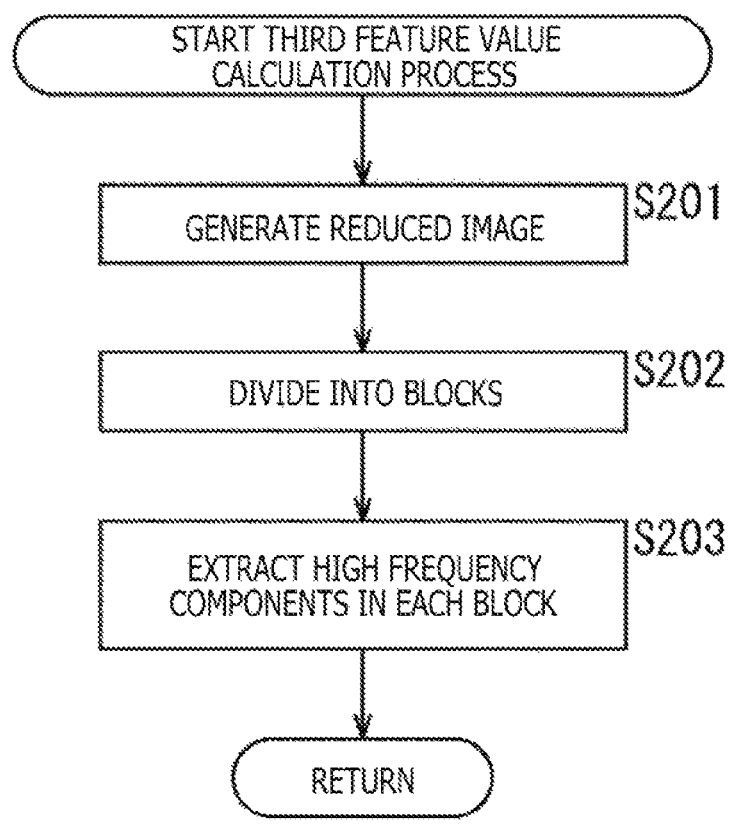
FIG. 28 is a flow chart for describing a third feature value calculation process.

The third generation process is different from the first or second generation process in that in the feature value calculation process of step S11, the process is executed on the basis of the flow chart of the third feature value calculation process illustrated in FIG. 28. Therefore, the process will be further described.

In step S201, the reduced images are generated. The process can be similar to the process of step S101 in the second generation process in the flow chart illustrated in FIG. 25. Although the example of the case where the reduced images are generated, that is, the case where the third generation process is executed in combination with the second generation process, is described here, the third generation process may be combined with the first generation process.

The third generation process may be combined with the first generation process, and the reduced images may not be generated in step S201. The multispectral images (original images) supplied from the MS sensors 103 may be used without change.

Figure 29:
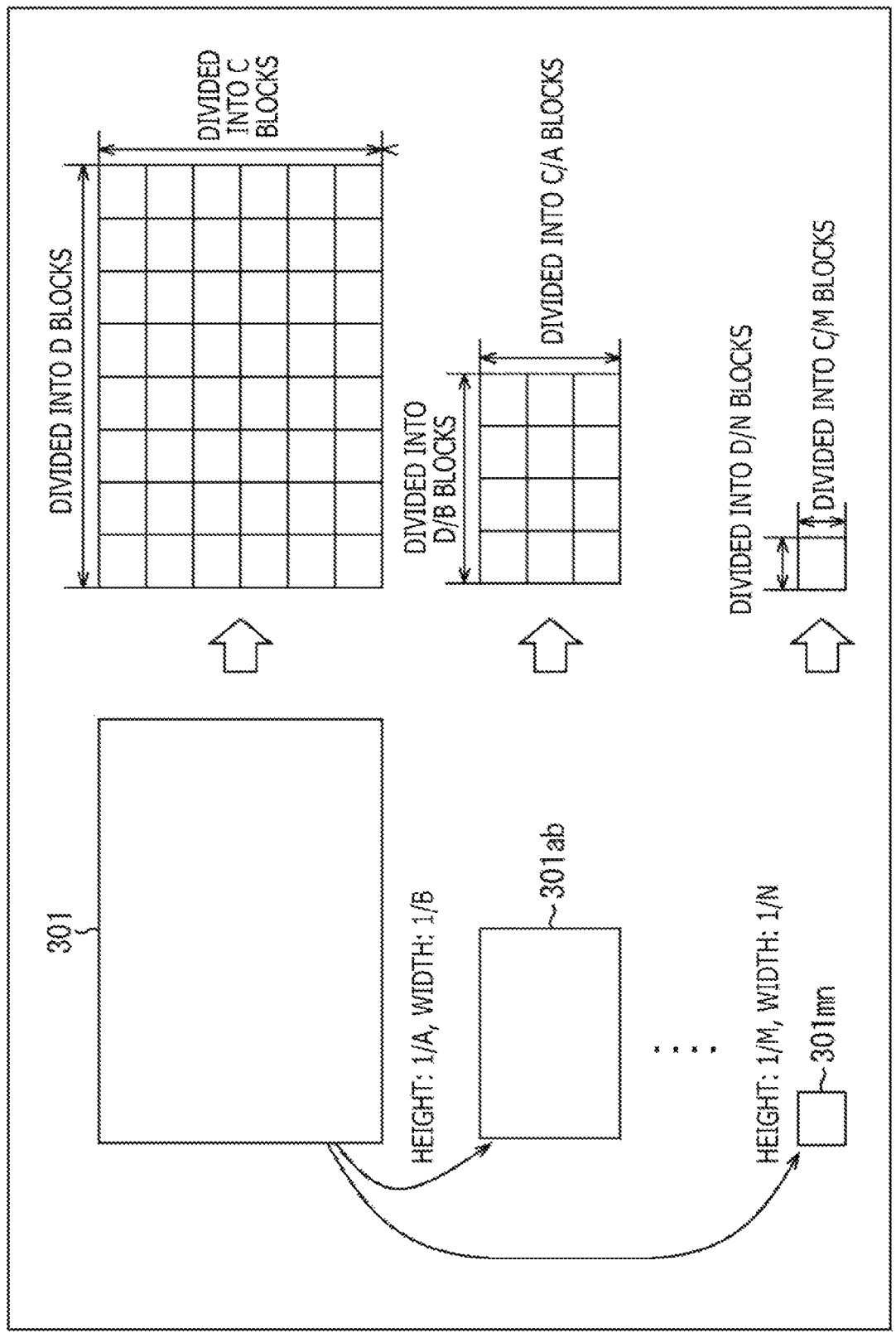
FIG. 29 is a diagram for describing a process of dividing the images into blocks.

In step S202, a process of dividing the images into blocks is executed. The process of dividing the images into blocks will be described with reference to FIG. 29. The diagram on the left in FIG. 29 is similar to the diagram illustrated in FIG. 26 and is a diagram describing a method of generating the reduced images. With the original image 301 as a standard, the original image 301 is multiplied by 1/A vertically and multiplied by 1/B horizontally to generate the reduced image 301ab. In addition, with the original image 301 as a standard, the original image is multiplied by 1/m vertically and multiplied by 1/n horizontally to generate the reduced image 301mn.

The process of dividing the images into blocks is applied to both the original image and the reduced images. The original image 301 is divided into C blocks vertically and divided into D blocks horizontally, and as a result, the original image 301 is divided into C×D blocks.

The reduced image 301ab is divided into C/A blocks vertically and divided into D/B blocks horizontally, and as a result, the reduced image 301ab is divided into (C/A)× (D/B) blocks. The reduced image 301mn is divided into C/M blocks vertically and divided into D/N blocks horizontally, and as a result, the reduced image 301mn is divided into (C/M)×(D/N) blocks.

The images are divided in such a way, and the numbers of pixels of the height and the width become the same in each block. The feature values can be easily extracted and compared in a process of a latter stage.

For example, it is assumed that A=B=2, C=5, and D=10 are set, and the number of pixels of the original image 301 is height×width=500×1000. In this case, the original image 301 is first divided into C blocks vertically, and the number of pixels is 100 (=500/5) pixels. The original image 301 is divided into D blocks horizontally, and the number of pixels is 100 (=1000/10). In this case, the number of pixels of one block of the original image 301 is 100×100 pixels.

Since the reduced image 301ab is reduced, the number of pixels is height× width=250×500 pixels. When the reduced image 301ab with such a number of pixels is divided, the reduced image 301ab is divided into (C/A)=(5/2)=2.5 blocks vertically (although the reduced image 301ab is divided into 2.5 blocks for the description, the value of C is set to divide the reduced image 301ab by a natural number in the actual division), and the number of pixels is 100 (=250/2.5) pixels. The reduced image 301ab is divided into (D/B)=(10/2)=5 blocks horizontally, and the number of pixels is 100 (=500/5) pixels. In this case, the number of pixels of one block of the reduced image 301ab is 100×100 pixels.

In such a way, the number of pixels of one block after dividing the original image 301 is 100×100 pixels. In addition, the number of pixels of one block after dividing the reduced image 301ab is also 100×100 pixels. That is, the numbers of pixels of one block of the original image 301 and the reduced image 301ab are the same. Therefore, as described above, the numbers of pixels become the same in each block, and the feature values can be easily extracted and compared in the process of a latter stage.

In step S202 (FIG. 28), the dividing process is executed for each multispectral image. In this case, the dividing process is applied to the images of each of the eight wavelengths including the wavelengths A to H.

Note that in the case where the dividing process is combined with the first generation process, and the reduced images are not generated, the dividing process is applied to only the original images 301 (images 301A to 301H) of the multispectral images.

When the dividing process in step S202 is finished, the process proceeds to step S203. In step S203, the high frequency components are extracted in each block. Although the process can be basically executed as in step S31 (first generation process) of the flow chart illustrated in FIG. 23 or step 102 (second generation process) of the flow chart illustrated in FIG. 25, the process is different in that the process is executed for each block.

The process of extracting the high frequency components from each block executed in step S203 will be described with reference to FIG. 30.

Figure 30:
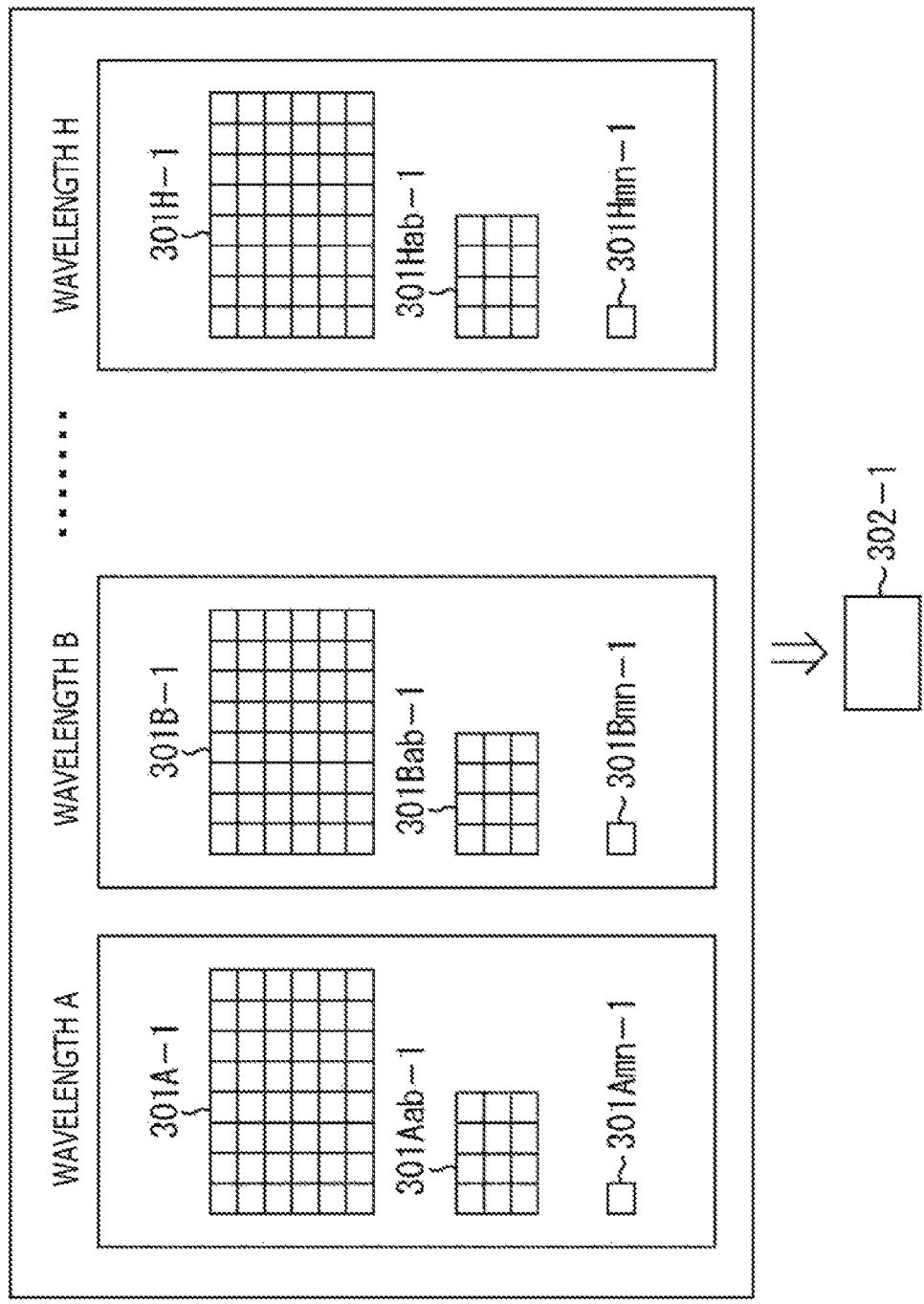
FIG. 30 is a diagram for describing generation of the reference images.

For example, in the case where the reference image 302-1 is generated from the images 301-1 photographed at time t1, the feature values are first calculated from the blocks of each of the image 301A-1 at the wavelength A, the reduced image 301Aab-1, and the reduced image 301Amn-1 as illustrated in FIG. 30.

For example, in the case where the division as illustrated in FIG. 29 is performed, the feature value is calculated for each of the C×D blocks of the image 301A-1 at the wavelength A. The feature value is calculated for each of the (C/A)×(D/B) blocks of the reduced image 301Aab-1. The feature value is calculated for each of the (C/M)×(D/N) blocks of the reduced image 301Amn-1.

(C×D)+((C/A)×(D/B))+((C/M)×(D/N))=X feature values are calculated from the images at the wavelength A.

Similarly, X feature values are calculated from the blocks of each of the image 301B-1 at the wavelength B, the reduced image 301Bab-1, and the reduced image 301Bmn-1. X feature values are calculated from the blocks of each of the image 301C-1 at the wavelength C, the reduced image 301Cab-1, and the reduced image 301Cmn-1. X feature values are calculated from the blocks of each of the image 301D-1 at the wavelength D, the reduced image 301Dab-1, and the reduced image 301Dmn-1.

Furthermore, similarly, X feature values are calculated from the blocks of each of the image 301E-1 at the wavelength E, the reduced image 301Eab-1, and the reduced image 301Emn-1. X feature values are calculated from the blocks of each of the image 301F-1 at the wavelength F, the reduced image 301Fab-1, and the reduced image 301Fmn-1. X feature values are calculated from the blocks of each of the image 301G-1 at the wavelength G, the reduced image 301Gab-1, and the reduced image 301Gmn-1. X feature values are calculated from the blocks of each of the image 301H-1 at the wavelength H, the reduced image 301Hab-1, and the reduced image 301Hmn-1.

In this case, X feature values are calculated from the images of each of the eight wavelengths including the wavelengths A to H, and (8×X) feature values are calculated.

The process regarding the calculation of the feature values is applied to all of the multispectral images supplied from the MS sensors 103.

In such a way, the feature values are calculated for each block. The size of each block (the number of pixels included in one block) is the same, as described above. Therefore, the feature values calculated from each block can be compared without change.

Once the process of the flow chart illustrated in FIG. 28 is executed to calculate the feature values, the process proceeds to step S12 (FIG. 22). In step S12, a reference image generation process is executed. The reference image generation process executed in step S12 (third reference image generation process executed in the third generation process) will be described with reference to a flow chart of FIG. 31.

In step S231, the feature values of all blocks are compared. Furthermore, the feature values are sorted in descending order in step S232. For example, as described with reference to FIG. 30, X feature values are calculated from the images of each of the eight wavelengths including the wavelengths A to H, and (8×X) feature values are calculated in total. The (8×X) feature values are compared, and the feature values are sorted in descending order.

After the sort, the feature image is reconfigured in step S233, and the reference image is generated. The reconfiguration of the feature image (generation of the reference image) will be described with reference to FIG. 32.

Figure 32:
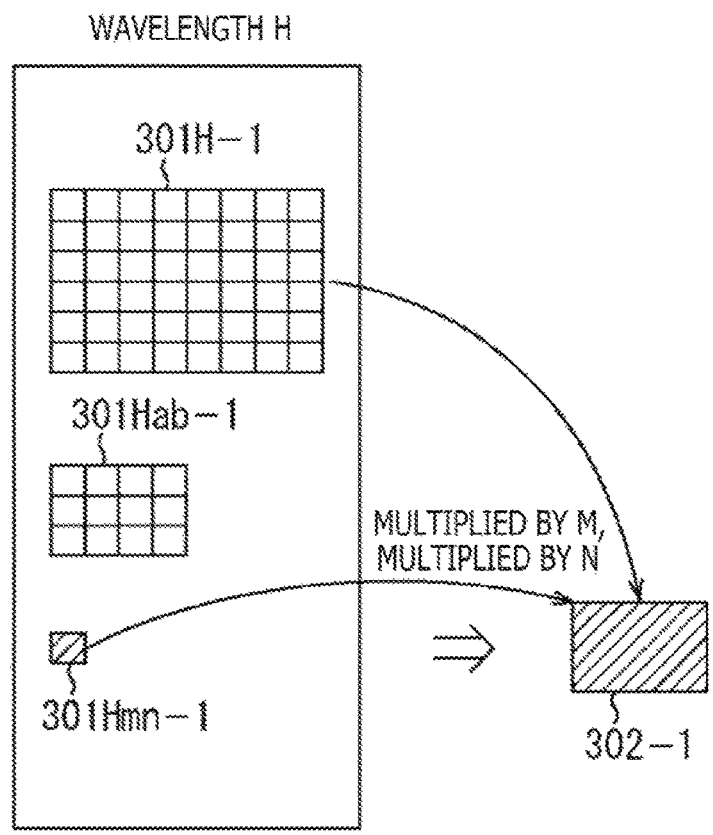
FIG. 32 is a diagram for describing reconfiguration of a feature image.

FIG. 32 is a diagram for describing the reconfiguration of the feature image in a case where the block with the highest feature value is the reduced image 301Hmn-1 when the blocks are sorted in descending order of feature value.

The reduced image 301Hmn-1 is the smallest reduced image among the reduced images generated from the original image 301H-1. In a case where the feature value of the reduced image 301Hmn-1 is the largest among the (8×X) feature values, the reduced image 301Hmn-1 is set as the reference image 302-1.

Since the reduced image Hmn-1 is reduced, the reduced image 301Hmn-1 is returned to the original size, that is, returned to the original image 301H-1 in this case, in the case where the reduced image 301Hmn-1 is set as the reference image 302-1. The returned image is set as the reference image 302-1.

To return the reduced image Hmn-1 to the original size, the reduced image 301Hmn-1 is multiplied by M in the vertical direction and multiplied by N in the horizontal direction to return the reduced image 301Hmn-1 to the original size, and the image is set as the reference image 302-1. Alternatively, the original image of the reduced image 301Hmn-1, that is, the original image 301H-1 in this case, may be set as the reference image 302-1.

Figure 33:
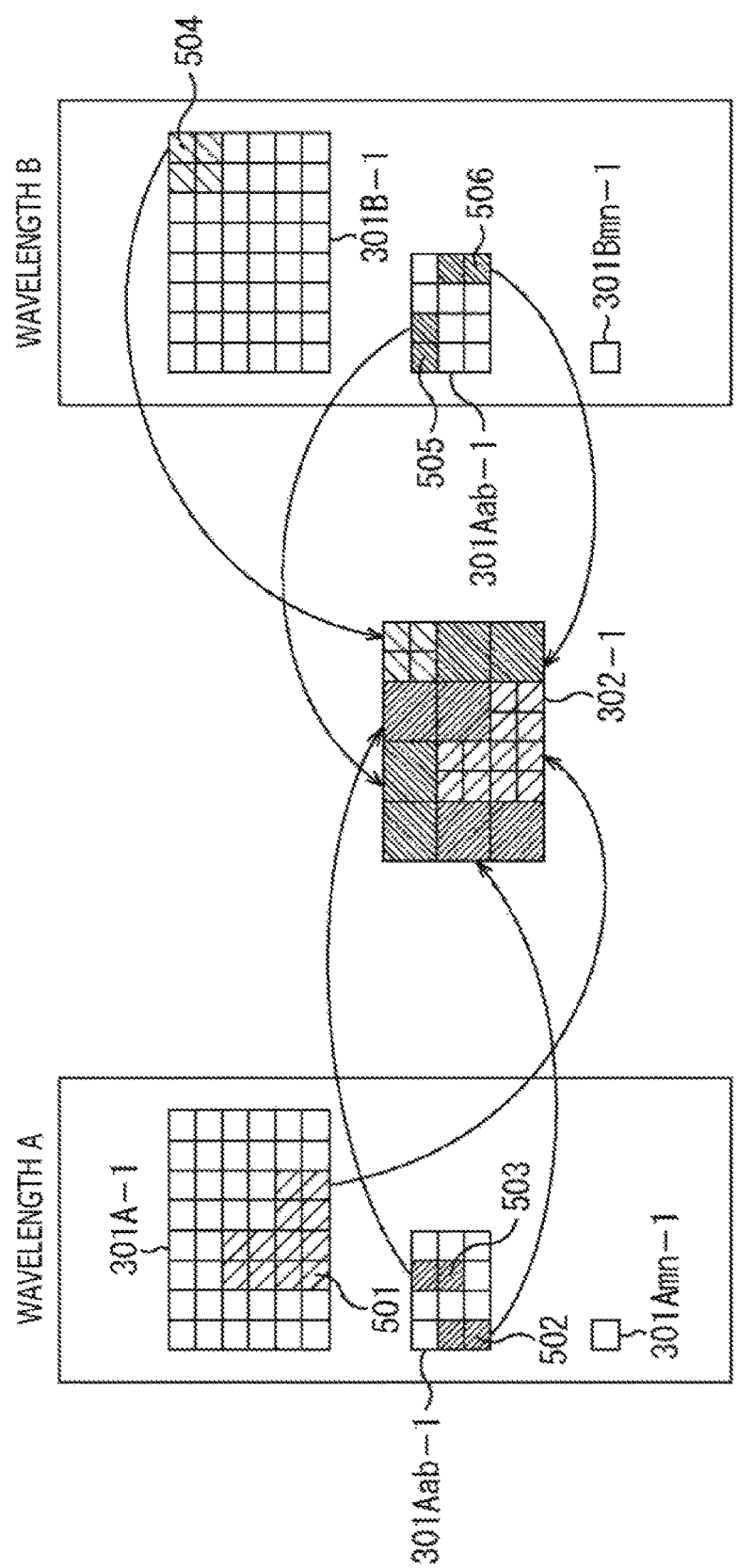
FIG. 33 is another diagram for describing reconfiguration of the feature image.

The example illustrated in FIG. 32 is an example in which one block can be used to generate the original image 301 that will be the reference image 302. FIG. 33 describes a case in which a plurality of blocks is used to reconfigure the original image 301 that will be the reference image 302.

In the example illustrated in FIG. 33, the feature values extracted from each of the images at the wavelength A and the images of the wavelength B are high, and the regions with the high feature values are cut out from each of the images at the wavelength A and the images at the wavelength B. The cut regions are positioned on the corresponding regions and put together to generate an image (reference image) with high feature values.

Each of twelve blocks positioned substantially at the center part of the image 301A-1 at the wavelength A is cut out as a block with a high feature value from the image 301A-1. Here, the description will be continued by assuming that the twelve blocks form a region 501 as illustrated in FIG. 33. The region 501 is cut out from the image 301A-1.

The image 301A-1 is an image not reduced, and the region 501 is cut out without change. The region 501 is set as a region at the position of the reference image 302-1 corresponding to the position where the region 501 is positioned in the image 301A-1.

Each of two blocks positioned on the lower left of the reduced image 301Aab-1 reduced from the image 301A-1 at the wavelength A is cut out as a block with a high feature value from the reduced image 301Aab-1. Here, the description will be continued by assuming that the two blocks form a region 502 as illustrated in FIG. 33. The region 502 is cut out from the reduced image 301Aab-1.

Since the reduced image 301Aab-1 is an image that is reduced, the region 502 is not cut out from the reduced image 301Aab-1 without change, and a region at the position of the image 301A-1 (original image 301A-1) corresponding to the position where the region 502 is positioned in the reduced image 301Aab-1 is cut out. In this case, the region 502 is positioned on the lower left in the reduced image 301Aab-1, and the region 502 is positioned on the lower left in the image 301A-1. The size corresponding to the region 502 (in this case, eight blocks) is cut out.

Alternatively, the region 502 may be multiplied by A in the vertical direction and multiplied by B in the horizontal direction to convert the region, and the converted region 502 may be cut out (used).

The region 502 returned to the original size is set as a region at the position of the reference image 302-1 corresponding to the position where the region 502 is positioned in the image 301A-1. In this case, the region 502 is set in the region on the lower left of the reference image 302-1.

Similarly, each of two blocks positioned substantially at the center right of the reduced image 301Aab-1 reduced from the image 301A-1 at the wavelength A is cut out as a block with a high feature value from the reduced image 301Aab-1. Here, the description will be continued by assuming that the two blocks form a region 503 as illustrated in FIG. 33. The region 503 is cut out from the reduced image 301Aab-1 and set as a region at the corresponding position of the reference image 302-1.

Since the reduced image 301Aab-1 is an image that is reduced, the region 503 is also converted into the original size as in the region 502, and the region 503 is set as part of the reference image 302-1.

Each of four blocks positioned on the upper right of the image 301B-1 at the wavelength B is cut out as a block with a high feature value from the image 301B-1. As illustrated in FIG. 33, the description will be continued here by assuming that the four blocks form a region 504. The region 504 is cut out from the image 301B-1.

Since the image 301B-1 is an image not reduced, the region 504 is cut out without change. The region 504 is set as a region at the position (in this case, upper right) of the reference image 302-1 corresponding to the position (in this case, upper right) where the region 504 is positioned in the image 301B-1.

Each of two blocks positioned on the upper left of the reduced image 301Bab-1 reduced from the image 301B-1 at the wavelength B is cut out as a block with a high feature value from the reduced image 301Bab-1. Here, the description will be continued by assuming that the two blocks form a region 505 as illustrated in FIG. 33. The region 505 is cut out from the reduced image 301Bab-1 and set as a region at the corresponding position of the reference image 302-1.

Since the reduced image 301Bab-1 is an image that is reduced, the region 505 is converted into the original size as in the region 502 and the like, and the region 505 is set as part of the reference image 302-1.

Similarly, each of two blocks positioned on the lower right of the reduced image 301Bab-1 reduced from the image 301B-1 at the wavelength B is cut out as a block with a high feature value from the reduced image 301Bab-1. Here, the description will be continued by assuming that the two blocks form a region 506 as illustrated in FIG. 33. The region 506 is cut out from the reduced image 301Bab-1 and set as a region at the corresponding position of the reference image 302-1.

Since the reduced image 301Bab-1 is an image that is reduced, the region 506 is converted into the original size as in the region 502 and the like, and the region 506 is set as part of the reference image 302-1.

In such a way, the blocks with high feature values are preferentially selected, and the reference image 302-1 including the blocks with high feature values is generated. The reference image 302 can be generated in such a way to provide an image with more features of the subject than in the reference image 302 generated in the first generation process or the second generation process.

In addition, the reduced images can be generated, and the reduced images can also be included in the process. As a result, more characteristic images can be extracted and set as the reference images.

Once the reference images are generated in such a way, the process proceeds to step S13 (FIG. 22). The process from step S13 is already described, and the process will not be described.

<Fourth Generation Process of Final Inspection Image>

Another operation of the image processing system 50 (FIG. 3) will be described. In the examples of the first to third generation processes illustrated as processes up to the generation of the final inspection image, the feature values are calculated by using, without change, the multispectral images acquired by the MS sensors 103, by generating the reduced images, or by dividing the images into blocks in the feature value calculation process of step S11.

A fourth generation process up to the generation of the final inspection image will be described by illustrating a process in which the multispectral images acquired by the MS sensors 103 are used to calculate the feature values, and images at another wavelength are further generated to use a plurality of images including the generated images.

Figure 34:
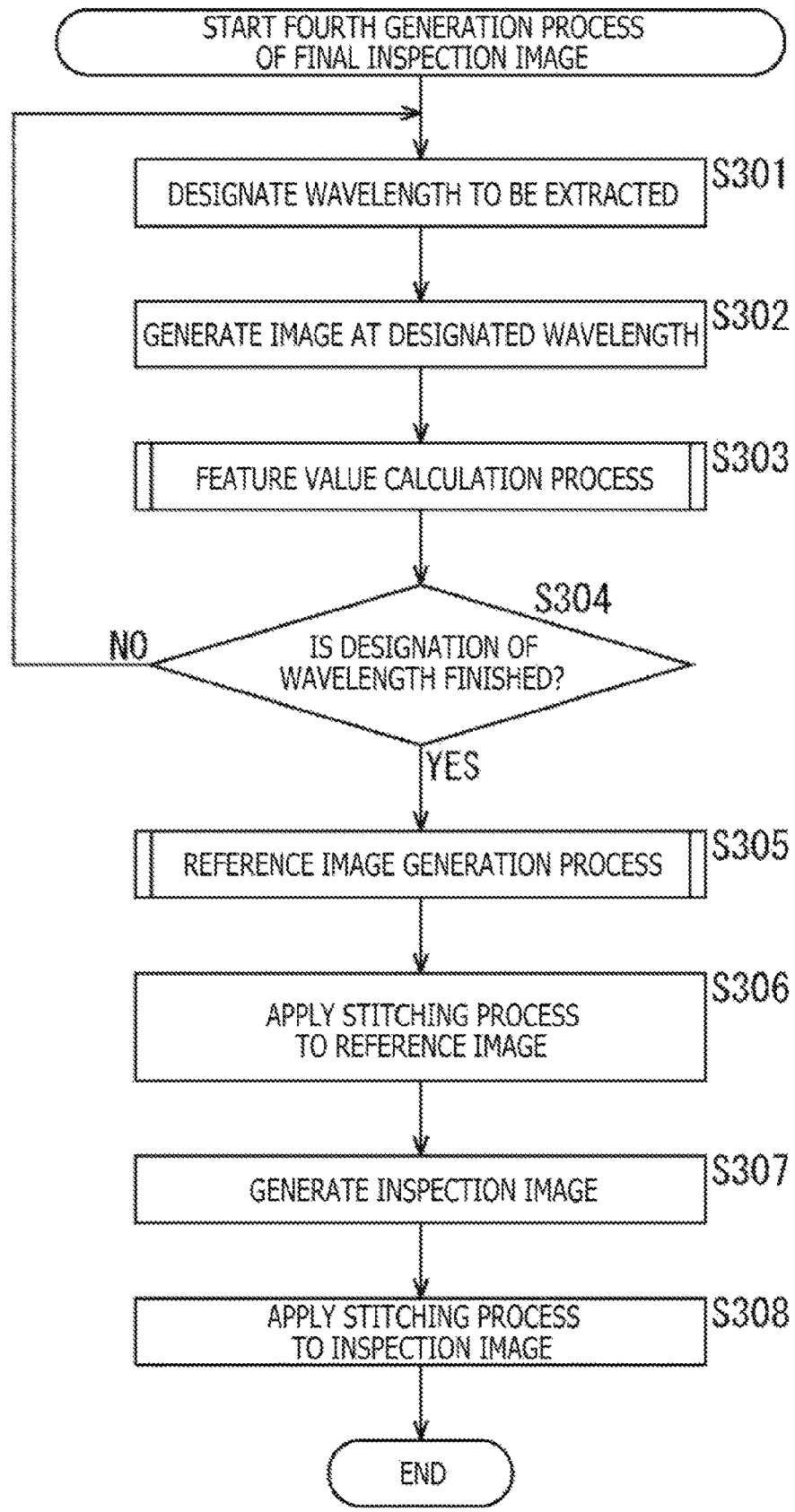
FIG. 34 is a flow chart for describing a fourth generation process.

FIG. 34 is a flow chart for describing the fourth generation process of the final inspection image.

In step S301, a wavelength to be extracted is designated. The designated wavelength calculation processing unit 104 designates the wavelength of the images to be generated. The designated wavelength may be a preset wavelength or a wavelength that is set with reference to the illuminance value, the mode, or the like. In the case where the wavelength is preset, for example, wavelengths at every 50 nm from 400 to 900 nm (400 nm, 450 nm, 500 nm, . . . , 900 nm) can be sequentially designated.

In addition, when, for example, the images photographed in the mode of sensing the vegetation are to be processed, wavelengths of light suitable for sensing the vegetation, such as wavelengths from 650 to 850 nm, may be designated in detail.

Once the designated wavelength calculation processing unit 104 designates (sets) a predetermined wavelength in step S301, the designated wavelength calculation processing unit 104 generates images at the designated wavelength in step S302. In the case where the designated wavelength indicates the multispectral images obtained from the MS sensors 103, the images 301 corresponding to the designated wavelength are extracted and supplied to the reference image generation processing unit 105.

In addition, in a case where the designated wavelength is a wavelength other than the wavelength of the multispectral images obtained from the MS sensors 103, the images 301 corresponding to the designated wavelength are generated by assigning the data of the multispectral images to Expression (2) and performing the calculation, and the images 301 are supplied to the reference image generation processing unit 105.

In step S303, the feature value calculation process is executed by the reference image generation processing unit 105. The feature value calculation process executed in step S303 can be similar to the feature value calculation process executed in step S11 of the flow chart illustrated in FIG. 22, as in the first to third generation processes.

The feature value calculation process in the first generation process may be applied, and the feature values may be calculated on the basis of the flow chart of the first feature value calculation process illustrated in FIG. 23. Alternatively, the feature value calculation process in the second generation process may be applied, and the feature values may be calculated on the basis of the flow chart of the second feature value calculation process illustrated in FIG. 25.

Furthermore, the feature value calculation process in the third generation process may be applied, and the feature values may be calculated on the basis of the flow chart of the third feature value calculation process illustrated in FIG. 28.

In any case, the images from which the feature values are calculated are images supplied from the designated wavelength calculation processing unit 104 to the reference image generation processing unit 105, and the images include the multispectral images and images at the predetermined wavelength generated from the multispectral images.

Once the feature values are calculated in step S303, the process proceeds to step S304. In S304, whether or not the designation of the wavelength is finished is determined. For example, in the case where the wavelengths to be designated are set in advance, the designated wavelength calculation processing unit 104 determines whether or not all of the set wavelengths are instructed to thereby execute the determination process in step S304.

In a case where it is determined that the instruction of the wavelength is not finished in step S304, the process returns to step S301, and the subsequent process is repeated. That is, the process of steps S301 to S304 is repeated until all of the wavelengths to be designated are designated, all of the images to be designated are extracted or generated, and the feature values are extracted from all of the images to be designated.

On the other hand, in a case where it is determined that the instruction of the wavelength is finished in step S304, the process proceeds to step S305. In step S305, the reference image generation processing unit 105 executes the reference image generation process.

The reference image generation process executed in step S305 can be similar to the reference image generation process executed in step S12 of the flow chart illustrated in FIG. 22, as in the first to third generation processes.

The reference image generation process in the first generation process may be applied, and the reference images may be generated on the basis of the flow chart of the reference image generation process illustrated in FIG. 24. Alternatively, the reference image generation process in the second generation process may applied, and the reference image generation process corresponding to the case in which the feature values are calculated may be executed on the basis of the flow chart of the feature value calculation process illustrated in FIG. 25.

Figure 31:
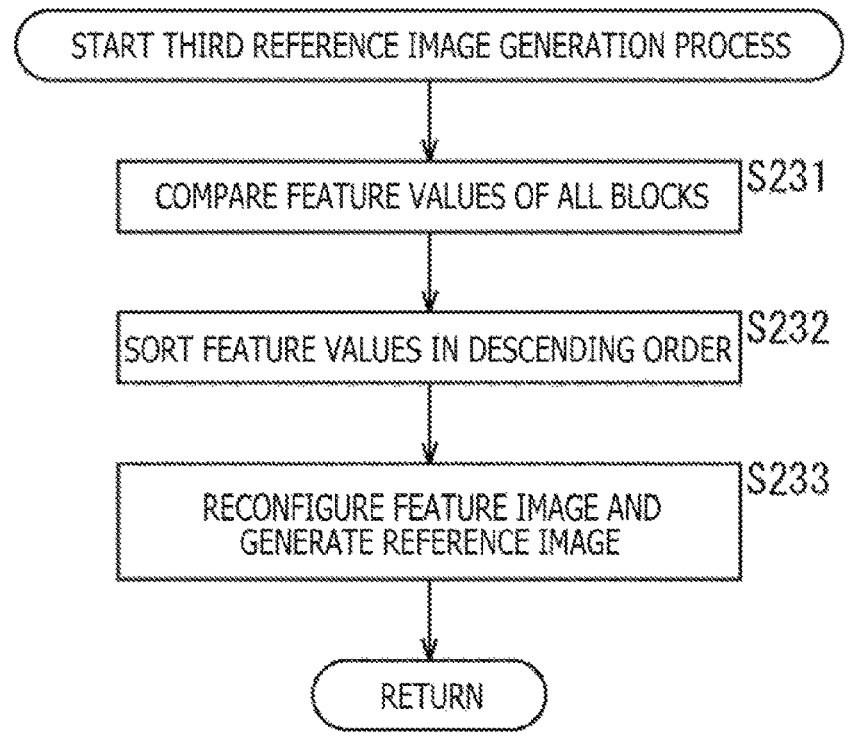
FIG. 31 is a flow chart for describing a third reference image generation process.

Furthermore, the reference image generation process in the third generation process may be applied, and the reference images may be generated on the basis of the flow chart of the third reference image generation process illustrated in FIG. 31.

In any case, the reference images are images generated from an image group including the multispectral images supplied from the designated wavelength calculation processing unit 104 to the reference image generation processing unit 105 and the images at the predetermined wavelength generated from the multispectral images.

Once the reference images are generated in step S305, the process proceeds to step S306. The process of steps S306 to S308 can be executed as in the process of steps S13 to S15 of the flow chart illustrated in FIG. 22 (first to third generation processes). That is, the process after the generation of the reference images can be executed as in the first to third generation processes, and the process will not be described here.

In the fourth generation process, the images from which the feature values are calculated, in other words, the original images for generating the reference images, are generated by designating the wavelength. For example, as described with reference to FIG. 20, the reflectance of the reflected light from the subject varies depending on the wavelength of the applied light. For example, even when the images of the same subject are photographed, the subject is clearly photographed in some cases and blurrily photographed in other cases when the images are photographed at different wavelengths.

It is easy to extract the subject as a feature region and calculate the feature value from the image in which the subject is clearly photographed. However, it is difficult to extract the subject as a feature region and calculate the feature value from the image in which the subject is blurrily photographed.

This means that if an image at a wavelength suitable for the subject is generated, the subject can be easily detected in the image, that is, the feature region can be easily extracted in the image. In the fourth generation process, a plurality of wavelengths can be designated, and a plurality of images can be generated to generate an image at a wavelength suitable for the subject to be detected.

According to the fourth generation process, the feature regions can be more appropriately extracted, and the feature values can be easily calculated. In addition, the reference images can be generated from the feature values calculated by extracting the appropriate feature regions. In addition, the reference images with large feature values can be generated, and in the stitching process of the reference images, the process of, for example, detecting the regions with matching feature regions and sorting the reference images based on the detection can be more accurately executed.

<Fifth Generation Process of Final Inspection Image>

Another operation of the image processing system 50 (FIG. 3) will be described.

A process including an orthorectification process will be described as a fifth generation process up to the generation of the final inspection image. The fifth generation process is a process combining any one of the first to fourth generation processes and the orthorectification process.

For example, as described with reference to FIG. 11, in the case where the aerial photography is performed according to a flight plan, and the images obtained from the aerial photography are used to execute the process, the aerial images are photographed in, for example, distorted shapes due to the influence of the elevation of the terrain because the aerial images are centrally projected. The positional relationship may not coincide with the actual terrain when the images are compared with the actual terrain.

Therefore, the orthorectification process (also called ortho correction or the like) is applied to the obtained images. The images after the orthorectification process are images in which the unevenness of the terrain and the slopes of the photographs are corrected, and for example, the images can be handled as images similar to a topographic map.

Figure 11:
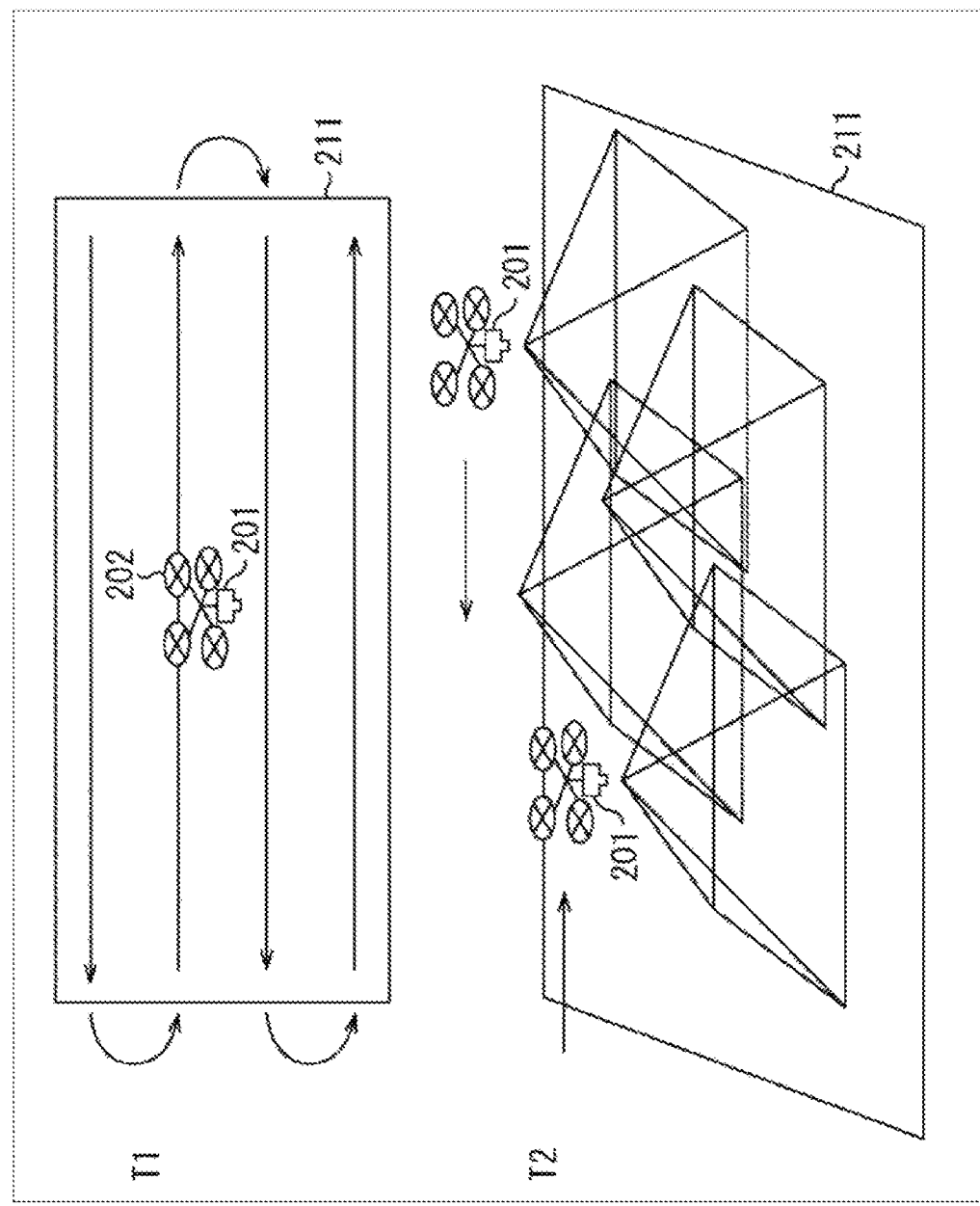
FIG. 11 is a diagram for describing a process during aerial photography.
Figure 12:
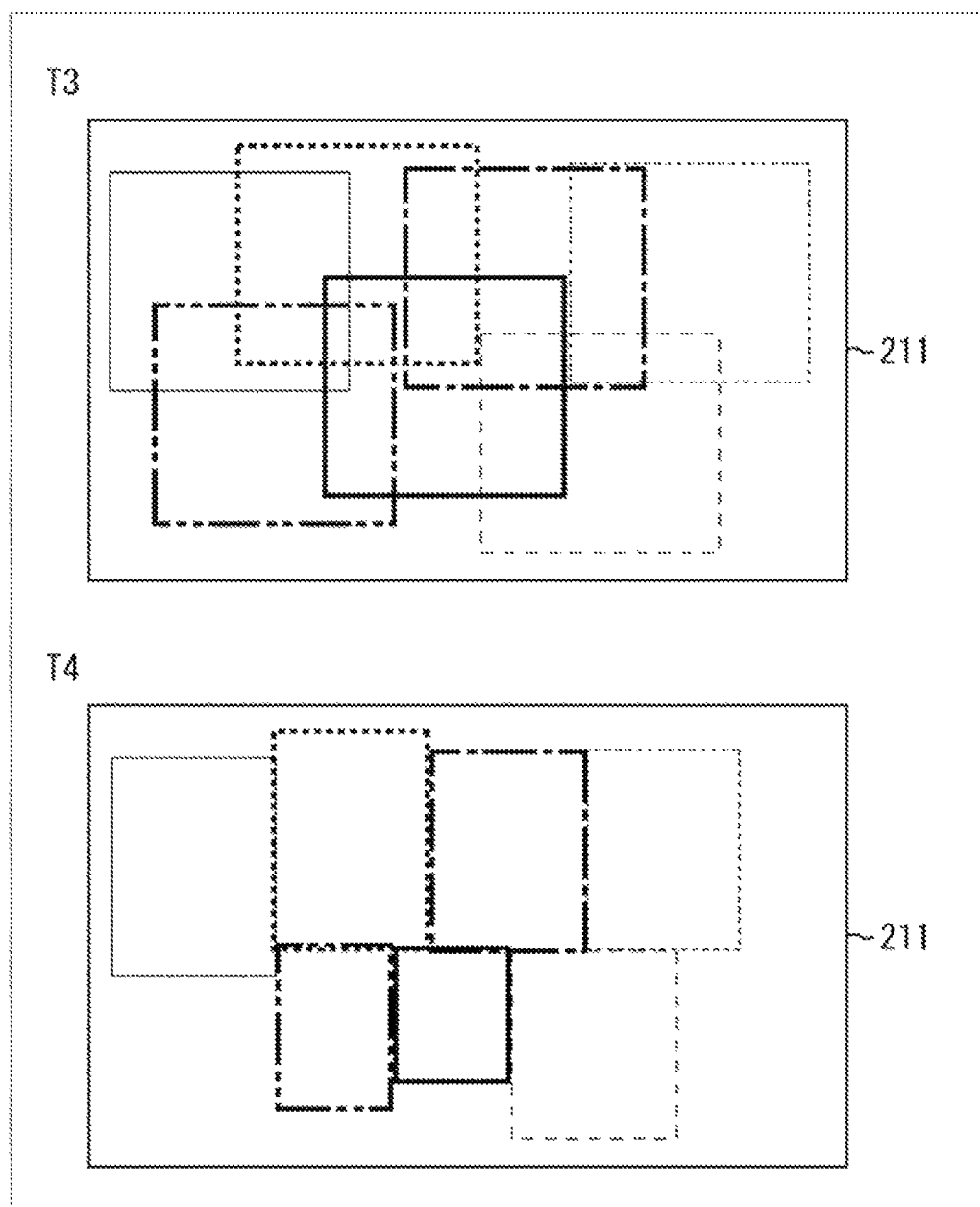
FIG. 12 is a diagram for describing images obtained by the aerial photography.

In the orthorectification, the images are photographed in the overlapping state as described in the parts of time T2 in FIG. 11 and time T3 in FIG. 12. The overlapping region may have a high overlap rate of, for example, 80% to 90%. The orthorectification process is a process of using this to recognize a 3D image from a plurality of parallax images and converting the images into images as viewed from directly above.

To execute the orthorectification process, position information obtained from a GPS (Global Positioning System), posture information from an IMU (Inertial Measurement Unit), and the like are used. In the case of executing the orthorectification process, it is also necessary to generate and record "orthorectification information" indicating which image is orthorectified and how the image is calculated for the orthorectification. The information is stored in a storage in association with the photographed images.

Figure 35:
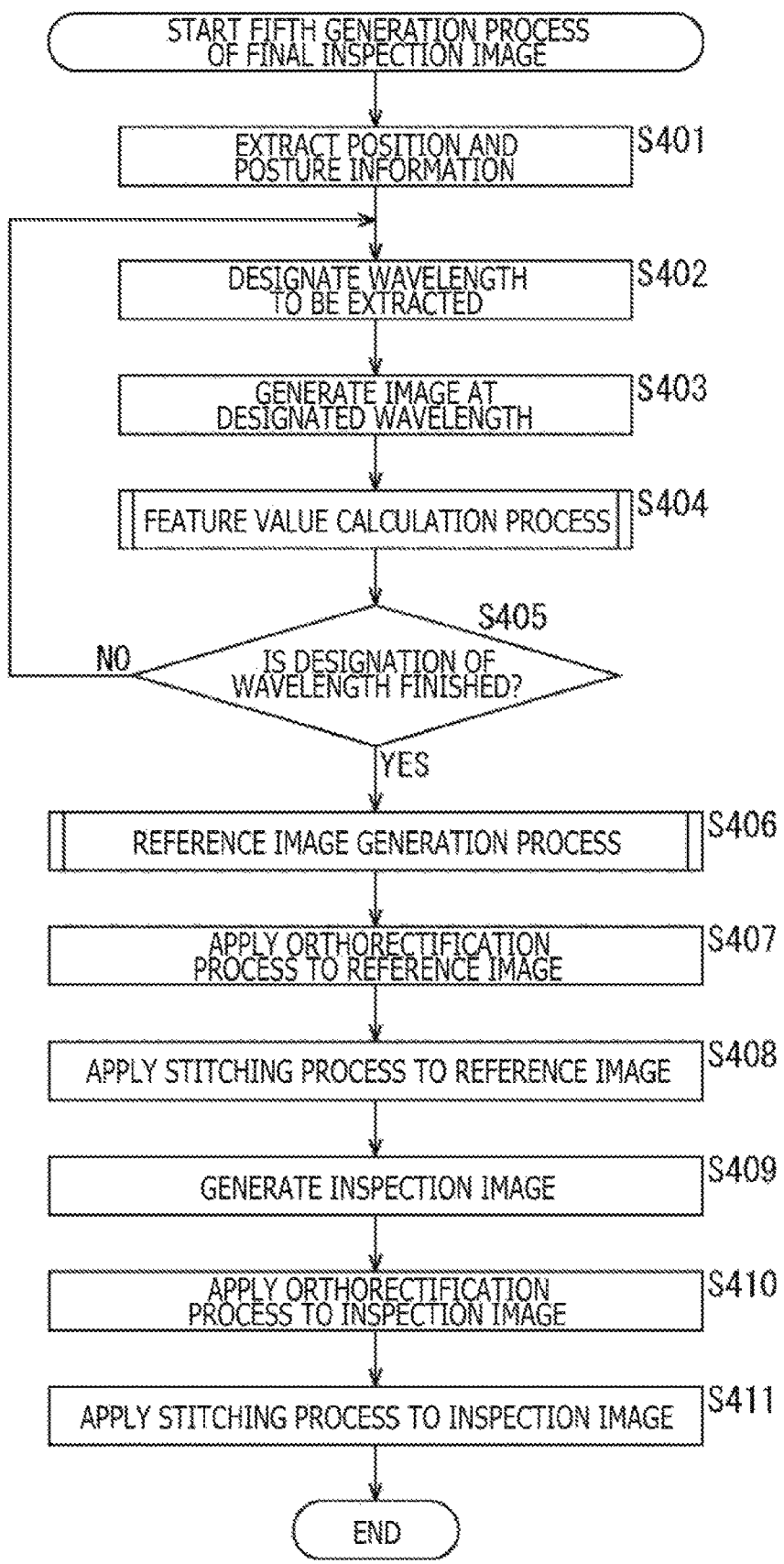
FIG. 35 is a flow chart for describing a fifth generation process.

FIG. 35 is a flow chart for describing the fifth generation process of the final inspection image. The process based on the flow chart illustrated in FIG. 35 represents a case in which the orthorectification process is included in the fourth generation process, and here, an example of the case in which the orthorectification process is included in the fourth generation process will be described.

The orthorectification process can be included in any of the first to third generation processes, and with which generation process the orthorectification process will be combined can be appropriately set according to the situation of using the image processing system 50 or the like.

In step S401, the position information and the posture information are extracted. For example, the GPS and the IMU are installed on the imaging apparatus 11 or the mobile measurement apparatus 201 provided with the imaging apparatus 11, and the position information and the posture information are recorded every time the imaging apparatus 11 performs imaging. In addition, the photographed images (multispectral images) are associated with the position information and the posture information acquired when the images are photographed, and the images and the information are managed so that the information of one of them can be used to read the information of the other.

For example, the multispectral images, the position information, and the posture information are associated and stored in a storage not illustrated. The storage can be provided in the imaging apparatus 11 or the mobile measurement apparatus 201.

In step S401, for example, the position information and the posture information associated with the multispectral images to be processed are read from the storage.

In step S402, the wavelength to be extracted is designated. The process of steps S402 to S406 is executed as in steps S301 to S305 (fourth generation process) of the flow chart illustrated in FIG. 34, and the process will not be described here.

Note that as described above, the process can also be combined with the first to third generation processes, and in the case where the process is combined with the first to third generation processes, the process of steps S402 to S406 is a process executed as in the process of steps S11 and S12 of the flow chart illustrated in FIG. 22.

Once the reference image generation process is finished, and the reference images are generated in step S406, the process proceeds to step S407. In step S407, the orthorectification process is applied to the reference images. The orthorectification process can be executed by a general process, such as by orthographically converting the aerial images.

The orthographic conversion is an example of a process, that is, orthorectification process, of using a digital elevation model (elevation data) representing the three-dimensional shape of the surface of the earth and eliminating the misalignment of the subject on the image. The aerial image is converted into an image as viewed from directly above without a slope as in a map, and the image is displayed in the correct size and position.

The image after the orthorectification process (ortho image) is an image in which the aerial image without the misalignment of the subject on the image is converted into an image as viewed from directly above without a slope as in a map, displayed in the correct size and position.

In step S407, the orthogonal rectification process is applied to the reference image to generate an ortho image of the reference image. In this case, information, such as the position where the original image of the reference image is photographed and the posture of the imaging apparatus 11, is necessary. Therefore, the position information and the posture information are read in step S401 and used in the orthorectification process.

The orthorectification information when the reference image is orthorectified can be stored and used in the orthorectification of the inspection image.

In step S408, the process of using the ortho image of the reference image to execute the stitching process in step S408 is executed as in the process of step S306 of FIG. 34 (step S13 of FIG. 22). However, this case is different in that the stitching process is applied to the orthorectified reference image.

Once the reference image after stitching, that is, the stitching reference map 303 (stitch reference information 303), is generated in step S408, the process proceeds to step S409.

The process of generating the inspection image in step S409 is executed as in the process of step S307 of FIG. 34 (step S14 of FIG. 22), and the process will not be described here.

In step S410, the orthorectification process is applied to the generated inspection image. The orthorectification process for the inspection image can be executed as in the orthorectification process for the reference image. In addition, the orthorectification information at the time of the orthorectification of the reference image can be used in the orthorectification process for the inspection image.

The orthorectified inspection image is used, and the stitching process is applied to the inspection image in step S411. The stitching process for the inspection image in step S411 is executed as in the process of step S308 in FIG. 34 (step S15 in FIG. 22) except that the inspection image is an ortho image, and the process will not be described here.

In such a way, the final inspection image is generated. In addition, the orthorectified inspection image is used to generate the final inspection image in the fifth generation process, and therefore, the generated final inspection image can also be an orthorectified inspection image.

Furthermore, in the process of orthorectifying the inspection image (process in step S410), the orthorectification information used in the process of orthorectifying the reference image (process in step S407) can be used, and the process regarding the orthorectification can be easily executed.

The generated final inspection image can be mapped on the map. Since the final inspection image is orthorectified, the shape of the photographed subject is correct, and the position is also correctly arranged in the image. Therefore, the image can be easily superimposed on another map and used.

<Sixth Generation Process of Final Inspection Image>

Another configuration and operation of the image processing system 50 (FIG. 3) will be described.

The image processing system 50 (FIG. 3) that executes any one of the first to fifth generation processes has been described by illustrating the example of the case in which the process is executed without referring to the illuminance value from the illuminance sensor 12.

An operation of the image processing system 50 including the process of referring to the illuminance value from the illuminance sensor 12 will be described as a sixth generation process. First, a configuration example of an image processing system 51 that executes the sixth generation process will be described with reference to FIG. 36.

Figure 36:
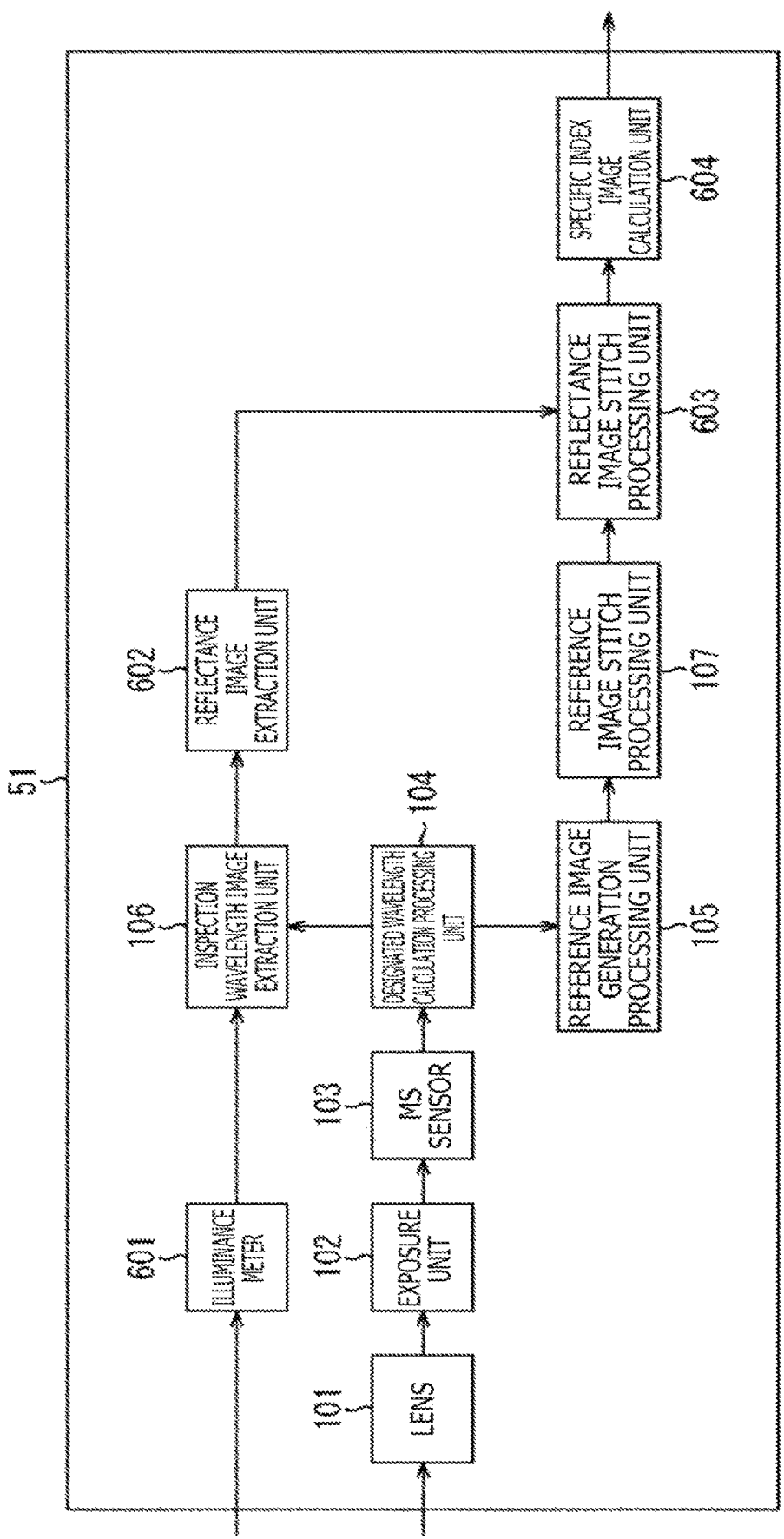
FIG. 36 is a diagram for describing another configuration of the image processing system.

Although the basic configuration of the image processing system 51 illustrated in FIG. 36 is similar to the image processing system 50 illustrated in FIG. 3, the difference is that the image processing system 51 includes an illuminance meter 601, a reflectance image generation unit 602, a reflectance image stitch processing unit 603, and a specific index image calculation unit 604.

Although the illuminance meter 601 is included in the image processing system 51 in FIG. 36, the illuminance meter 601 corresponds to the illuminance sensor 12 (FIG. 1) and is configured to calculate the illuminance value and supply the illuminance value to the inspection wavelength image extraction unit 106. The illuminance meter 601 acquires, for example, the spectral characteristics of the light source as illustrated in FIG. 19, just like the illuminance sensor 12.

The inspection wavelength image extraction unit 106 generates inspection images as in the embodiments. The inspection images from the inspection wavelength image extraction unit 106 are supplied to the reflectance image generation unit 602. The reflectance image generation unit 602 generates reflectance images by converting the supplied inspection images into images based on the reflectance and supplies the reflectance images to the reflectance image stitch processing unit 603.

The reflectance image stitch processing unit 603 is a processing unit corresponding to the inspection image stitch processing unit 108 of FIG. 3. The images as targets of the stitching process are the reflectance images from the reflectance image generation unit 602, and the reflectance image stitch processing unit 603 applies the stitching process to the reflectance images. The image generated by the reflectance image stitch processing unit 603 will be referred to as a final reflectance image here.

The specific index image calculation unit 604 uses the final reflectance image to calculate an image regarding a specific index, such as a normalized difference vegetation index (NDVI).

Here, the description will be continued by illustrating an example of the case in which the image processing system 51 is a system that performs vegetation inspection. In the case of generating an image based on the normalized difference vegetation index (NDVI) in the vegetation inspection, a red (wavelength of red) image and an infrared (wavelength of infrared) image are used as inspection images.

Note that the NDVI is an index indicating the distribution condition and the activity of the vegetation, and the description will be continued here by illustrating the example of the NDVI. However, the present technique can also be applied to cases in which other indices are used.

The value of the NDVI (NDVI value) can be calculated on the basis of the following Expression (3).

$$\text{NDVI value} = (Dp(IR) - Dp(R))/(Dp(IR) + Dp(R)) \qquad (3)$$

In Expression (3), Dp(IR) represents the reflectance of the infrared region, and Dp(R) represents the reflectance of red (R) in the visible region. The reflectance can be obtained by (inspection image/light source information).

That is, in the image processing system 51 illustrated in FIG. 36, the reflectance image generation unit 602 divides the inspection image from the inspection wavelength image extraction unit 106 by the light source information from the illuminance meter 601 to obtain the reflectance and generates the reflectance image. Note that the illuminance value from the illuminance meter 601 may be directly supplied to the reflectance image generation unit 602.

The reflectance image generated by the reflectance image generation unit 602 is supplied to the reflectance image stitch processing unit 603. The reflectance image stitch processing unit 603 executes the stitching process of the reflectance image to generate a final reflectance image and supplies the final reflectance image to the specific index image calculation unit 604.

In the case of, for example, generating the image regarding the normalized difference vegetation index, the specific index image calculation unit 604 uses the final reflectance image in the infrared region after the stitching process and the red reflectance image in the visible region to perform the calculation based on Expression (3) described above to generate an image on the basis of the NDVI value.

Figure 37:
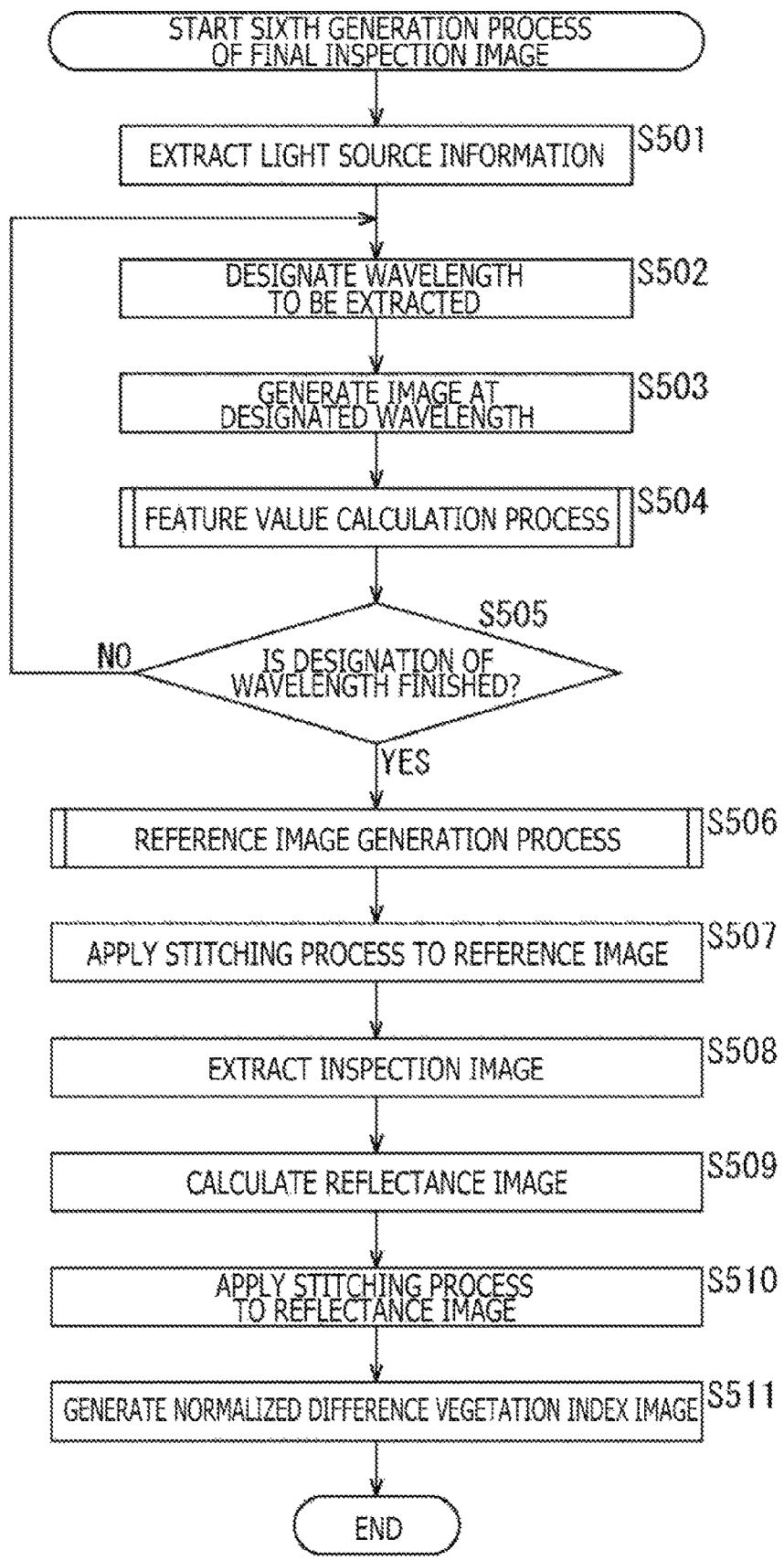
FIG. 37 is a flow chart for describing a sixth generation process.

An operation of the image processing system 51 that executes the process will be described with reference to a flow chart of FIG. 37.

In step S501, the light source information is extracted. The illuminance value when the multispectral image to be processed is photographed is extracted as the light source information.

In step S502, the wavelength to be extracted is generated. The process of steps S502 to S508 is executed as in the process of steps S301 to S307 of the flow chart illustrated in FIG. 34, and the process will not be described here.

In step S509, the reflectance image is calculated. The reflectance image generation unit 602 performs the operation (inspection image/light source information) as described above to calculate the reflectance and uses the reflectance to generate the reflectance image.

In step S510, the reflectance image stitch processing unit 603 uses the reflectance image generated by the reflectance image generation unit 602 to execute the stitching process. The stitching process in step S510 can be executed as in, for example, the stitching process in step S15 of FIG. 22, and the process will not be described here.

In step S511, the specific index image calculation unit 604 generates a specific index image, such as a normalized difference vegetation index image.

As described above, in the case of generating the normalized difference vegetation index image, the specific index image calculation unit 604 acquires the reflectance image in the infrared region and the red reflectance image in the visible region to perform the calculation based on Expression (3) described above. Furthermore, the specific index image calculation unit 604 assigns the acquired reflectance image in the infrared region and the red reflectance image in the visible region to Expression (3) to generate the normalized difference vegetation index image.

In such a way, the present technique can also be applied to the case of generating an image of a specific index, such as a normalized difference vegetation index image.

In addition, according to the present technique, the stitching reference map 303 for stitching (stitch reference information 303) is generated, and the specific index image is generated on the basis of the stitching reference map 303 (stitch reference information 303). Therefore, in a case of, for example, generating images of different specific indices, the specific index images can be easily generated on the basis of the stitching reference map 303 (stitch reference information 303).

Note that although the sixth generation process described with reference to FIGS. 36 and 37 has been described by illustrating the example of the case of the process executed without referring to the illuminance value in the processes of generating the reference images and applying the stitching process to the reference images to generate the stitching reference map 303 (stitch reference information 303), the illuminance value may be referenced to execute the processes.

According to the present technique, the MS sensors 103 can acquire images at a plurality of wavelengths (multispectral images). Furthermore, the multispectral images can be used to further acquire images at other wavelengths.

For example, even if there are a plurality of types of multispectral images supplied from the imaging unit 61 (FIG. 4) to the image generation unit 62, the image generation unit 62 can generate images at an arbitrary wavelength. Therefore, the amount of data supplied from the imaging unit 61 to the image generation unit 62 can be reduced.

In addition, according to the present technique, the processes in the image generation unit 62, the first stitch processing unit 63, and the second stitch processing unit 64 can also be reduced.

As described above, the stitching reference map 303 (stitch reference information 303) is generated, and the stitching process is applied to the images at a desirable wavelength on the basis of the stitching reference map 303 (stitch reference information 303). Therefore, even in the case of, for example, generating the images at a plurality of wavelengths (a plurality of specific index images), the stitching process does not have to be executed for each of the plurality of specific index images from the beginning. The stitching process can be executed on the basis of the stitching reference map 303 (stitch reference information 303), and the process can be significantly reduced.

Furthermore, according to the present technique, the amount of data handled in the image processing system 50 (51) can be reduced, and the processing load can be reduced. Therefore, the processing time in the image processing system 50 (51) can also be reduced.

<Recording Medium>

The series of processes can be executed by hardware or can be executed by software. In the case where the series of processes are executed by software, a program included in the software is installed on a computer. Here, examples of the computer include a computer incorporated into dedicated hardware and a general-purpose personal computer that can execute various functions by installing various programs.

FIG. 38 is a block diagram illustrating a configuration example of hardware of the computer that uses the program to execute the series of processes. In the computer, a CPU (Central Processing Unit) 1001, a ROM (Read Only Memory) 1002, and a RAM (Random Access Memory) 1003 are connected to each other through a bus 1004. An input-output interface 1005 is further connected to the bus 1004. An input unit 1006, an output unit 1007, a storage unit 1008, a communication unit 1009, and a drive 1010 are connected to the input-output interface 1005.

The input unit 1006 includes a keyboard, a mouse, a microphone, and the like. The output unit 1007 includes a display, a speaker, and the like. The storage unit 1008 includes a hard disk, a non-volatile memory, and the like. The communication unit 1009 includes a network interface and the like. The drive 1010 drives a removable medium 1011, such as a magnetic disk, an optical disk, a magneto-optical disk, and a semiconductor memory.

In the computer configured in such a way, the CPU 1001 loads the program stored in the storage unit 1008 on the RAM 1003 through the input-output interface 1005 and the bus 1004 and executes the program to execute the series of processes, for example.

The program executed by the computer (CPU 1001) can be provided by, for example, recording the program in the removable medium 1011 as a packaged medium or the like. In addition, the program can be provided through a wired or wireless transmission medium, such as a local area network, the Internet, and digital satellite broadcasting.

In the computer, the removable medium 1011 can be installed on the drive 1010 to install the program on the storage unit 1008 through the input-output interface 1005. Furthermore, the program can be received by the communication unit 1009 through a wired or wireless transmission medium and installed on the storage unit 1008. In addition, the program can be installed in advance in the ROM 1002 or the storage unit 1008.

Note that the program executed by the computer may be a program in which the processes are executed in chronological order described in the present specification, or the program may be a program for executing the processes in parallel or at necessary timing such as when the processes are invoked.

In addition, the system in the present specification represents the entire apparatus including a plurality of apparatuses.

Note that the advantageous effects described in the present specification are illustrative only, and the advantageous effects are not limited. There may also be other advantageous effects.

Note that the embodiments of the present technique are not limited to the embodiments described above, and various changes can be made without departing from the scope of the present technique.

Note that the present technique can also be configured as follows.

(1)

An image processing apparatus including:

an image generation unit that generates a first reference image regarding a first imaging region on the basis of a plurality of first images regarding the first imaging region and that generates a second reference image regarding a second imaging region at least partially overlapping with the first imaging region on the basis of a plurality of second images regarding the second imaging region; and a processing unit that generates positioning information indicating a correspondence between the first imaging region and the second imaging region on the basis of the first reference image and the second reference image.

(2)

The image processing apparatus according to (1), in which the processing unit executes a stitching process of the first reference image and the second reference image to generate a reference composite image including the positioning information.

(3)

The image processing apparatus according to (1) or (2), in which the processing unit executes a stitching process of any of the plurality of first images and any of the plurality of second images based on the positioning information to acquire a composite image.

(4)

The image processing apparatus according to (1) or (2), in which the processing unit sets, on the basis of the positioning information, a region corresponding to the first imaging region as an image based on the plurality of first images and sets a region corresponding to the second imaging region as an image based on the plurality of second images to acquire the composite image.

(5)

The image processing apparatus according to any one of (1) to (4), in which the plurality of first images includes images based on wavelengths different from each other, or the plurality of second images includes images based on wavelengths different from each other.

(6)

The image processing apparatus according to any one of (1) to (5), in which the image generation unit preferentially acquires, as the first reference image, an image with a large feature value from the plurality of first images and preferentially acquires, as the second reference image, an image with a large feature value from the plurality of second images.

(7)

The image processing apparatus according to any one of (1) to (5), in which the image generation unit acquires, as the first reference image, an image with a largest feature value among the plurality of first images and acquires, as the second reference image, an image with a largest feature value among the plurality of second images.

(8)

The image processing apparatus according to any one of (1) to (7), in which the image generation unit generates a first reduced image by reducing the first image, also uses the first reduced image to generate the first reference image, generates a second reduced image by reducing the second image, and also uses the second reduced image to generate the second reference image.

(9)

The image processing apparatus according to (8), in which, in a case where the first reduced image is set as the first image, an original first image of the first reduced image is set as the first reference image, and in a case where the second reduced image is set as the second image, an original second image of the second reduced image is set as the second reference image.

(10)

The image processing apparatus according to any one of (1) to (7), in which the image generation unit divides the first image into blocks, calculates a feature value in each block, generates the first reference image from a block with a large feature value, divides the second image into blocks, calculates a feature value in each block, and generates the second reference image from a block with a large feature value.

(11)

The image processing apparatus according to (10), in which the image generation unit generates a first reduced image by reducing the first image, also divides the first reduced image into blocks, also uses the blocks of the first reduced image to generate the first reference image, generates a second reduced image by reducing the second image, also divides the second reduced image into blocks, and also uses the blocks of the second reduced image to generate the second reference image.

(12)

The image processing apparatus according to (11), in which, in a case where the block of the first reduced image includes a block with a large feature value, a corresponding block of an original first image of the first reduced image is set as part of the first reference image, and in a case where the block of the second reduced image includes a block with a large feature value, a corresponding block of an original second image of the second reduced image is set as part of the second reference image.

(13)

The image processing apparatus according to any one of (1) to (12), in which the plurality of first images is used to generate a third image at a predetermined wavelength, the image generation unit generates the first reference image from the third image, the plurality of second images is used to generate a fourth image at a predetermined wavelength, and the image generation unit generates the second reference image from the fourth image.

(14)

The image processing apparatus according to any one of (1) to (13), in which an orthorectification process is applied to each of the first reference image and the second reference image, and the processing unit generates the positioning information on the basis of the orthorectified first reference image and second reference image.

(15)

An image processing method including the steps of:

generating a first reference image regarding a first imaging region on the basis of a plurality of first images regarding the first imaging region and generating a second reference image regarding a second imaging region at least partially overlapping with the first imaging region on the basis of a plurality of second images regarding the second imaging region; and generating positioning information indicating a correspondence between the first imaging region and the second imaging region on the basis of the first reference image and the second reference image.

(16)

A program causing a computer to execute a process including the steps of:

generating a first reference image regarding a first imaging region on the basis of a plurality of first images regarding the first imaging region and generating a second reference image regarding a second imaging region at least partially overlapping with the first imaging region on the basis of a plurality of second images regarding the second imaging region; and generating positioning information indicating a correspondence between the first imaging region and the second imaging region on the basis of the first reference image and the second reference image.

REFERENCE SIGNS LIST

10 Image processing system, 11 Imaging apparatus, 12 Illuminance sensor, 13 Hub, 14 Calculation apparatus, 30 Image processing system, 31 Client apparatus, 32 Router, 33 Base station, 34 Network, 35 Server, 36 Storage, 101 Lens, 102 Exposure unit, 103 MS sensor, 104 Designated wavelength calculation processing unit, 105 Reference image generation processing unit, 106 Inspection wavelength image extraction unit, 107 Reference image stitch processing unit, 108 Inspection image stitch processing unit, 601 Illuminance meter, 602 Reflectance image extraction unit, 603 Reflectance image stitch processing unit, 604 Specific index image calculation unit

The invention claimed is:

1. An image processing apparatus comprising: an image generation circuitry configured to generate a first reference image regarding a first imaging region on a basis of a plurality of first images regarding the first imaging region, and generate a second reference image regarding a second imaging region at least partially overlapping with the first imaging region on a basis of a plurality of second images regarding the second imaging region; and a processor configured to generate positioning information indicating a correspondence between the first imaging region and the second imaging region on a basis of the first reference image and the second reference image, wherein the image generation circuitry is configured to generate a first reduced image by reducing the one of the plurality of first images, divide the first reduced image into blocks, generate the first reference image based on the blocks of the first reduced image, generate a second reduced image by reducing the one of the plurality of second images, divide the second reduced image into blocks, and generate the second reference image based on the blocks of the second reduced image.

2. The image processing apparatus according to claim 1, wherein the processor is further configured to execute a stitching process of the first reference image and the second reference image to generate a reference composite image including the positioning information.

3. The image processing apparatus according to claim 1, wherein the processor is further configured to execute a stitching process of any of the plurality of first images and any of the plurality of second images based on the positioning information to acquire a composite image.

4. The image processing apparatus according to claim 1, wherein the processor is further configured to set, on a basis of the positioning information, a region corresponding to the first imaging region as an image based on the plurality of first images and sets a region corresponding to the second imaging region as an image based on the plurality of second images to acquire a composite image.

5. The image processing apparatus according to claim 1, wherein the plurality of first images includes images based on wavelengths different from each other, or the plurality of second images includes images based on wavelengths different from each other, wherein the plurality of first images are captured at a first point in time, and wherein the plurality of second images are captured at a second point in time that is different from the first point in time.

6. The image processing apparatus according to claim 1, wherein the image generation circuitry is further configured to acquire, as the first reference image, an image with a first largest feature value from the plurality of first images, and acquire, as the second reference image, an image with a second largest feature value from the plurality of second images.

7. The image processing apparatus according to claim 1, wherein the image generation circuitry acquires, as the first reference image, an image with a largest feature value among the plurality of first images and acquires, as the second reference image, an image with a largest feature value among the plurality of second images.

8. The image processing apparatus according to claim 1, wherein the image generation circuitry is further configured to generate the first reference image based on the first reduced image that is generated, and generate the second reference image based on the second reduced image that is generated.

9. The image processing apparatus according to claim 8, wherein, in a case where the first reduced image is set as the one of the plurality of first images, an original first image of the first reduced image is set as the first reference image, and in a case where the second reduced image is set as the one of the plurality of second images, an original second image of the second reduced image is set as the second reference image.

10. The image processing apparatus according to claim 1, wherein the image generation circuitry is further configured to divide the one of the plurality of first images into blocks, calculate a feature value in each block, generate the first reference image from a block with a largest feature value, divide the one of the plurality of second images into blocks, calculate a feature value in each block, and generate the second reference image from a block with a largest feature value.

11. The image processing apparatus according to claim 1, wherein, in a case where the block of the first reduced image includes a block with a largest feature value, a corresponding block of an original first image of the first reduced image is set as part of the first reference image, and in a case where the block of the second reduced image includes a block with a largest feature value, a corresponding block of an original second image of the second reduced image is set as part of the second reference image.

12. The image processing apparatus according to claim 1, wherein the plurality of first images is used to generate a third image at a first predetermined wavelength, the image generation circuitry is further configured to generate the first reference image from the third image, the plurality of second images is used to generate a fourth image at a second predetermined wavelength, and the image generation circuitry is further configured to generate the second reference image from the fourth image.

13. The image processing apparatus according to claim 1, wherein an orthorectification process is applied to each of the first reference image and the second reference image, and the processor is further configured to generate the positioning information on a basis of the orthorectified first reference image and the second reference image.

14. An image processing method comprising: generating, with an image generation circuitry, a first reduced image by reducing one of a plurality of first images; dividing, with the image generation circuitry, the first reduced image into blocks; generating, with the image generation circuitry, a first reference image regarding a first imaging region on a basis of the blocks of the first reduced image generating, with the image generation circuitry, a second reduced image by reducing one of a plurality of second images; dividing, with the image generation circuitry, the second reduced image into blocks; generating, with the image generation circuitry, a second reference image regarding a second imaging region at least partially overlapping with the first imaging region on a basis of the blocks of the second reduced image; and generating, with a processor, positioning information indicating a correspondence between the first imaging region and the second imaging region on a basis of the first reference image and the second reference image.

15. The image processing method according to claim 14, further comprising: executing a stitching process of the first reference image and the second reference image to generate a reference composite image including the positioning information.

16. A non-transitory computer readable medium storing a program for image processing, the program, when executed by an electronic processor, causes the electronic processor to perform a set of operations comprising: generating a first reduced image by reducing one of a plurality of first images; dividing the first reduced image into blocks; generating a first reference image regarding a first imaging region on a basis of the blocks of the first reduced image; generating a second reduced image by reducing one of a plurality of second images; dividing the second reduced image into blocks; generating a second reference image regarding a second imaging region at least partially overlapping with the first imaging region on a basis of the blocks of the second reduced image; and generating positioning information indicating a correspondence between the first imaging region and the second imaging region on a basis of the first reference image and the second reference image.

17. The non-transitory computer readable medium according to claim 16, wherein the set of operations further include executing a stitching process of the first reference image and the second reference image to generate a reference composite image including the positioning information.

18. The non-transitory computer readable medium according to claim 16, wherein the set of operations further include executing a stitching process of any of the plurality of first images and any of the plurality of second images based on the positioning information to acquire a composite image.

19. The non-transitory computer readable medium according to claim 16, wherein the set of operations further include applying an orthorectification process to each of the first reference image and the second reference image, and generating the positioning information on a basis of the orthorectified first reference image and the second reference image.

* * * * *